US012213130B2

(12) United States Patent
Ly et al.

(10) Patent No.: US 12,213,130 B2
(45) Date of Patent: Jan. 28, 2025

(54) DEMODULATION REFERENCE SIGNAL BUNDLING AND FREQUENCY HOPPING

(71) Applicant: QUALCOMM Incorporated, San Diego, CA (US)

(72) Inventors: Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/586,553

(22) Filed: Jan. 27, 2022

(65) Prior Publication Data
US 2022/0248430 A1    Aug. 4, 2022

Related U.S. Application Data

(60) Provisional application No. 63/171,513, filed on Apr. 6, 2021, provisional application No. 63/143,711, filed on Jan. 29, 2021.

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0092* (2013.01); *H04W 72/23* (2023.01); *H04W 72/535* (2023.01)

(58) Field of Classification Search
CPC ............. H04W 72/1268; H04W 72/23; H04W 72/535; H04W 72/0446; H04L 5/0092;
(Continued)

(56) References Cited

U.S. PATENT DOCUMENTS

| 2013/0242889 A1* | 9/2013 | Khoryaev | H04W 72/541 370/329 |
| 2014/0198664 A1* | 7/2014 | Chen | H04L 1/0015 370/336 |

(Continued)

OTHER PUBLICATIONS

ERICSSON: "Remaining User Plane Issues for Rel-13 LC and CE UEs", 3GPP Draft, Tdoc R2-156776—Remaining User Plane Issues for REL-13 LC and CE UES, 3rd Generation Partnership Project (3GPP), Mobile Competence Centre, 650, Route Des Lucioles, F-06921 Sophia-Antipolis Cedex, vol. RAN WG2, No. Anaheim, USA, Nov. 16, 2015-Nov. 20, 2015, 4 Pages, Nov. 16, 2015 (Nov. 16, 2015), XP051006087, Retrieved from the Internet: URL: http://www.3gpp.org/ftp/Meetings_3GPP_SYNC/RAN2/Docs/ [retrieved on Nov. 16, 2015] p. 2-p. 3.

(Continued)

*Primary Examiner* — Afshawn M Towfighi
(74) *Attorney, Agent, or Firm* — Holland & Hart / QUALCOMM Incorporated

(57) ABSTRACT

Methods, systems, and devices for wireless communication are described to support phase continuity in uplink transmissions within a bundle interval. In a first example, a user equipment (UE) may determine bundle intervals for an uplink channel transmission based on a transmission time interval (TTI) format pattern and a bundle size. Bundle intervals may start on a next available uplink TTI after an end of a preceding bundle interval, such that each bundle interval may include at least one uplink TTI. In a second example, the UE may use frequency resources for repetitions of the uplink channel transmission within a bundle interval based on an index of the bundle interval. In a third example, the UE may not bundle some repetitions of the uplink channel transmission in a same bundle interval, and may use different frequency resources for the repetitions, based on one or more phase continuity rules.

28 Claims, 28 Drawing Sheets

(51) Int. Cl.
*H04W 72/23* (2023.01)
*H04W 72/50* (2023.01)

(58) Field of Classification Search
CPC ..... H04L 1/1864; H04L 1/1887; H04L 1/189; H04L 5/0044; H04L 5/0094; H04L 1/08
See application file for complete search history.

(56) References Cited

U.S. PATENT DOCUMENTS

| | | | | |
|---|---|---|---|---|
| 2017/0111145 | A1* | 4/2017 | Höglund | H04L 1/1896 |
| 2019/0141499 | A1* | 5/2019 | Wang | H04L 5/0044 |
| 2019/0306867 | A1* | 10/2019 | Cirik | H04W 72/0453 |
| 2019/0319823 | A1* | 10/2019 | Akkarakaran | H04W 76/27 |
| 2020/0053799 | A1* | 2/2020 | Jeon | H04W 16/14 |

OTHER PUBLICATIONS

International Search Report and Written Opinion—PCT/US2022/014358—ISA/EPO—Apr. 21, 2022.

* cited by examiner

DEMODULATION REFERENCE SIGNAL BUNDLING AND FREQUENCY HOPPING

CROSS REFERENCE

The present Application for patent claims the benefit of U.S. Provisional Patent Application No. 63/143,711 by L Y et al., entitled "DEMODULATION REFERENCE SIGNAL BUNDLING AND FREQUENCY HOPPING," filed Jan. 29, 2021, and the benefit of U.S. Provisional Patent Application No. 63/171,513 by L Y et al., entitled "DEMODULATION REFERENCE SIGNAL BUNDLING AND FREQUENCY HOPPING," filed Apr. 6, 2021, each of which is assigned to the assignee hereof, and each of which is expressly incorporated by reference herein.

FIELD OF TECHNOLOGY

The following relates to wireless communication, including demodulation reference signal (DMRS) bundling and frequency hopping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit multiple repetitions of an uplink transmission, for example, to increase communication quality of the uplink transmission.

SUMMARY

The described techniques relate to improved methods, systems, devices, and apparatuses that support demodulation reference signal (DMRS) bundling and frequency hopping. Generally, the described techniques provide for applying phase continuity to uplink transmissions within a bundle interval (e.g., a time interval or time domain window for maintaining phase continuity across one or more transmissions). In a first example, a user equipment (UE) may determine bundle intervals for an uplink channel transmission based on a transmission time interval (TTI) format pattern and a bundle size. For example, bundle intervals may start on a next available uplink TTI (e.g., an uplink or flexible TTI, a TTI configured or available for uplink transmissions) after an end of a preceding bundle interval or from a next set of multiple uplink repetitions that meet one or more conditions for maintaining phase continuity after an end of a preceding bundle interval, such that each bundle interval may include at least one uplink TTI.

In a second example, the UE may use frequency resources (e.g., a frequency hop) for repetitions of the uplink channel transmission within a bundle interval based on an index of the bundle interval or an index of a transmission occasion for one or more repetitions. For example, repetitions transmitted in a first bundle interval or first transmission occasion may use frequency resources (e.g., a first frequency hop) associated with the index of the first bundle interval or first transmission occasion, respectively. Repetitions transmitted in a second bundle interval or second transmission occasion may use frequency resources (e.g., a second frequency hop) associated with the index of the second bundle interval or second transmission occasion, respectively. In a third example, the UE may bundle (e.g., maintain phase continuity for) one or more repetitions of the uplink channel transmission in a first bundle interval, but may not bundle one or more other repetitions of the uplink channel transmission in the same bundle interval, for example, based on one or more phase continuity rules (e.g., a time between repetitions within which the UE is capable of maintaining phase continuity). In such cases, the UE may switch frequency resources (e.g., frequency hops) each time phase discontinuity is experienced (e.g., within a bundle interval or when switching between bundle intervals, or both).

A method for wireless communication at a user equipment (UE) is described. The method may include receiving, from a base station, a control message configuring the UE to transmit a set of multiple repetitions of an uplink channel, transmitting a first repetition of the set of multiple repetitions of the uplink channel in a first available TTI of a first bundle interval of a set of multiple bundle intervals, and transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

An apparatus for wireless communication at a UE is described. The apparatus may include a processor, memory coupled with the processor, and instructions stored in the memory. The instructions may be executable by the processor to cause the apparatus to receive, from a base station, a control message configuring the UE to transmit a set of multiple repetitions of an uplink channel, transmit a first repetition of the set of multiple repetitions of the uplink channel in a first available TTI of a first bundle interval of a set of multiple bundle intervals, and transmit a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Another apparatus for wireless communication at a UE is described. The apparatus may include means for receiving, from a base station, a control message configuring the UE to transmit a set of multiple repetitions of an uplink channel, means for transmitting a first repetition of the set of multiple repetitions of the uplink channel in a first available TTI of a first bundle interval of a set of multiple bundle intervals, and means for transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

A non-transitory computer-readable medium storing code for wireless communication at a UE is described. The code may include instructions executable by a processor to receive, from a base station, a control message configuring the UE to transmit a set of multiple repetitions of an uplink channel, transmit a first repetition of the set of multiple repetitions of the uplink channel in a first available TTI of a first bundle interval of a set of multiple bundle intervals, and transmit a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

In some examples of the method, apparatuses, and non-transitory computer-readable medium described herein, the respective starting time of the respective available TTI may be a starting time of a next available TTI that occurs after an end of a preceding bundle interval of the set of multiple bundle intervals.

Some examples of the method, apparatuses, and non-transitory computer-readable medium described herein may further include operations, features, means, or instructions for receiving radio resource control (RRC) signaling or downlink control information (DCI) indicating a TTI format configuration, where the respective available TTI of each bundle interval of the set of multiple bundle intervals may be identified based on the TTI format configuration.

In some examples of the method, apparatuses, and non-transitory computer-readable medium described herein, each bundle interval of the set of multiple bundle intervals includes two or more TTIs over which transmission of multiple repetitions of the uplink channel satisfy a phase continuity condition.

In some examples of the method, apparatuses, and non-transitory computer-readable medium described herein, the phase continuity condition may be satisfied based on the transmission of multiple repetitions of the uplink channel having a same modulation order, a same frequency allocation, a same transmission power level, a same transmit beam, or any combination thereof.

In some examples of the method, apparatuses, and non-transitory computer-readable medium described herein, the phase continuity condition may be satisfied based on the transmission of multiple repetitions of the uplink channel being consecutive transmissions.

In some examples of the method, apparatuses, and non-transitory computer-readable medium described herein, the phase continuity condition may be satisfied based on the transmission of multiple repetitions of the uplink channel having a non-zero time gap between the multiple repetitions of the uplink channel and downlink reception may be not scheduled in the non-zero time gap, or the phase continuity condition may be satisfied based on the transmission of multiple repetitions of the uplink channel having a zero time gap between the multiple repetitions of the uplink channel.

Some examples of the method, apparatuses, and non-transitory computer-readable medium described herein may further include operations, features, means, or instructions for receiving a control message indicating an unpaired spectrum operation TTI format pattern when operating in an unpaired spectrum operation mode, where the unpaired spectrum operation TTI format pattern indicates a pattern of one or more uplink TTIs, one or more downlink TTIs, or both, over a set of multiple TTIs.

Some examples of the method, apparatuses, and non-transitory computer-readable medium described herein may further include operations, features, means, or instructions for receiving a control message indicating a paired spectrum operation mode for communications with the base station, where the paired spectrum operation mode may be associated with one or more uplink frequency ranges, one or more downlink transmission frequency ranges, or both, over a set of multiple TTIs.

Some examples of the method, apparatuses, and non-transitory computer-readable medium described herein may further include operations, features, means, or instructions for transmitting, in the first bundle interval, a third repetition of the set of multiple repetitions of the uplink channel having phase continuity with the first repetition.

Some examples of the method, apparatuses, and non-transitory computer-readable medium described herein may further include operations, features, means, or instructions for transmitting, in the second bundle interval, a fourth repetition of the set of multiple repetitions of the uplink channel having phase continuity with the second repetition.

Some examples of the method, apparatuses, and non-transitory computer-readable medium described herein may further include operations, features, means, or instructions for receiving control signaling defining a bundle size applicable to each of the set of multiple bundle intervals as a number of consecutive TTIs per bundle interval.

In some examples of the method, apparatuses, and non-transitory computer-readable medium described herein, a bundle size applicable to each of the set of multiple bundle intervals may be based on a quantity of the set of multiple repetitions of the uplink channel, the bundle size defining a number of consecutive TTIs per bundle interval.

In some examples of the method, apparatuses, and non-transitory computer-readable medium described herein, a starting time of the first available TTI may be a starting time of an uplink TTI that may be scheduled for transmitting the first repetition.

In some examples of the method, apparatuses, and non-transitory computer-readable medium described herein, a starting time of the first available TTI may be a starting time of a flexible TTI that may be configured for transmitting the first repetition.

In some examples of the method, apparatuses, and non-transitory computer-readable medium described herein, a starting time of the second bundle interval may be a starting time of a flexible TTI or an uplink TTI that may be configured for transmitting a repetition of the set of multiple repetitions of the uplink channel.

In some examples of the method, apparatuses, and non-transitory computer-readable medium described herein, the respective starting times of the respective available TTIs may be each a starting time of a next available TTI that occurs after a last available TTI of a preceding bundle interval of the set of multiple bundle intervals.

A method for wireless communication at a UE is described. The method may include receiving, from a base station, a control message configuring the UE to transmit a set of multiple repetitions of an uplink channel, transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

An apparatus for wireless communication at a UE is described. The apparatus may include a processor, memory coupled with the processor, and instructions stored in the memory. The instructions may be executable by the processor to cause the apparatus to receive, from a base station, a control message configuring the UE to transmit a set of multiple repetitions of an uplink channel, transmit a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and transmit a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Another apparatus for wireless communication at a UE is described. The apparatus may include means for receiving, from a base station, a control message configuring the UE to transmit a set of multiple repetitions of an uplink channel, means for transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and means for transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

A non-transitory computer-readable medium storing code for wireless communication at a UE is described. The code may include instructions executable by a processor to receive, from a base station, a control message configuring the UE to transmit a set of multiple repetitions of an uplink channel, transmit a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and transmit a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Some examples of the method, apparatuses, and non-transitory computer-readable medium described herein may further include operations, features, means, or instructions for transmitting, in the first bundle interval and at the first frequency hop, a third repetition of the set of multiple repetitions of the uplink channel having with phase continuity with the first repetition.

Some examples of the method, apparatuses, and non-transitory computer-readable medium described herein may further include operations, features, means, or instructions for transmitting, in the second bundle interval and at the second frequency hop, a fourth repetition of the set of multiple repetitions of the uplink channel having phase continuity with the second repetition.

Some examples of the method, apparatuses, and non-transitory computer-readable medium described herein may further include operations, features, means, or instructions for indexing each bundle interval of the set of multiple bundle intervals that includes at least one uplink TTI, at least one flexible TTI configured for transmitting the uplink channel, or both.

Some examples of the method, apparatuses, and non-transitory computer-readable medium described herein may further include operations, features, means, or instructions for identifying a bundle interval configuration that indicates each bundle interval of the set of multiple bundle intervals may have a bundle size defined by a number of consecutive TTIs after a starting time of a respective bundle interval of the set of multiple bundle intervals.

Some examples of the method, apparatuses, and non-transitory computer-readable medium described herein may further include operations, features, means, or instructions for receiving control signaling indicating the bundle interval configuration, the bundle size, or both.

Some examples of the method, apparatuses, and non-transitory computer-readable medium described herein may further include operations, features, means, or instructions for receiving, via the control message, an indication of a value of the first frequency hop and an offset, where the second frequency hop may be based on the value of the first frequency hop and the offset.

Some examples of the method, apparatuses, and non-transitory computer-readable medium described herein may further include operations, features, means, or instructions for receiving, via the control message, a first indication of a value of the first frequency hop, a second indication of a second value of the second frequency hop, or both.

Some examples of the method, apparatuses, and non-transitory computer-readable medium described herein may further include operations, features, means, or instructions for receiving a control message indicating a TDD TTI format pattern when operating in a TDD mode, the TDD TTI format pattern indicating a pattern of one or more uplink TTIs and one or more downlink TTIs for a set of multiple TTIs, where the first bundle interval may have a starting time corresponding to an available uplink TTI in the TDD TTI format pattern.

In some examples of the method, apparatuses, and non-transitory computer-readable medium described herein, the starting time of the first bundle interval may be a starting time of an uplink TTI that may be scheduled for transmitting the first repetition.

In some examples of the method, apparatuses, and non-transitory computer-readable medium described herein, the starting time of the first bundle interval may be a starting time of a flexible TTI that may be configured for transmitting the first repetition.

Some examples of the method, apparatuses, and non-transitory computer-readable medium described herein may further include operations, features, means, or instructions for receiving a control message indicating an FDD mode for communications with the base station, where the FDD mode may be associated with one or more uplink frequency ranges, one or more downlink transmission frequency ranges, or both, over a set of multiple TTIs, where the first bundle interval may have a starting time corresponding to an available uplink TTI in the FDD mode.

Some examples of the method, apparatuses, and non-transitory computer-readable medium described herein may further include operations, features, means, or instructions for indexing each bundle interval of the set of multiple bundle intervals.

In some examples of the method, apparatuses, and non-transitory computer-readable medium described herein, the uplink channel may be a physical uplink shared channel or a physical uplink control channel.

A method for wireless communication at a UE is described. The method may include receiving, from a base station, a control message configuring the UE to transmit a set of multiple repetitions of an uplink channel, transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

An apparatus for wireless communication at a UE is described. The apparatus may include a processor, memory coupled with the processor, and instructions stored in the memory. The instructions may be executable by the processor to cause the apparatus to receive, from a base station, a control message configuring the UE to transmit a set of multiple repetitions of an uplink channel, transmit a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and transmit a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Another apparatus for wireless communication at a UE is described. The apparatus may include means for receiving, from a base station, a control message configuring the UE to transmit a set of multiple repetitions of an uplink channel, means for transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and means for transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

A non-transitory computer-readable medium storing code for wireless communication at a UE is described. The code may include instructions executable by a processor to receive, from a base station, a control message configuring the UE to transmit a set of multiple repetitions of an uplink channel, transmit a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and transmit a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Some examples of the method, apparatuses, and non-transitory computer-readable medium described herein may further include operations, features, means, or instructions for transmitting the second repetition in the second bundle interval at the first frequency hop based on the first transmission occasion index being one of an odd index or an even index.

Some examples of the method, apparatuses, and non-transitory computer-readable medium described herein may further include operations, features, means, or instructions for transmitting the second repetition in the second bundle interval at the second frequency hop based on the first index being one of an odd index or an even index and the second index being an other of the odd index or the even index.

In some examples of the method, apparatuses, and non-transitory computer-readable medium described herein, multiple repetitions of the set of multiple repetitions of the uplink channel in a same bundle interval belong to a same transmission occasion.

In some examples of the method, apparatuses, and non-transitory computer-readable medium described herein, multiple repetitions of the set of multiple repetitions of the uplink channel associated with different bundle intervals may be associated with different transmission occasions.

Some examples of the method, apparatuses, and non-transitory computer-readable medium described herein may further include operations, features, means, or instructions for transmitting, at the first frequency hop or at the second frequency hop, a third repetition of the set of multiple repetitions of the uplink channel via a transmission occasion corresponding to a third transmission occasion index, the transmission occasion occurring outside of transmission occasions associated with the set of multiple bundle intervals.

Some examples of the method, apparatuses, and non-transitory computer-readable medium described herein may further include operations, features, means, or instructions for uplink TTIs corresponding to the third transmission occasion index do not satisfy a phase continuity condition.

In some examples of the method, apparatuses, and non-transitory computer-readable medium described herein, each of the first bundle interval and the second bundle interval includes a respective two or more uplink TTIs over which transmission of multiple repetitions of the uplink channel satisfy a phase continuity condition.

In some examples of the method, apparatuses, and non-transitory computer-readable medium described herein, the phase continuity condition may be satisfied based on the transmission of multiple repetitions of the uplink channel having a same modulation order, a same frequency allocation, a same transmission power level, a same transmit beam, or any combination thereof.

In some examples of the method, apparatuses, and non-transitory computer-readable medium described herein, the phase continuity condition may be satisfied based on the transmission of multiple repetitions of the uplink channel being consecutive transmissions.

In some examples of the method, apparatuses, and non-transitory computer-readable medium described herein, the phase continuity condition may be satisfied based on the transmission of multiple repetitions of the uplink channel having a non-zero time gap between the multiple repetitions of the uplink channel and downlink reception may be not scheduled in the non-zero time gap.

A method for wireless communication at a UE is described. The method may include receiving, from a base station, a control message configuring the UE to transmit a set of multiple repetitions of an uplink channel, transmitting, at a first frequency hop of a set of multiple frequency hops, a first repetition of the set of multiple repetitions of the uplink channel in a first bundle interval of a set of multiple bundle intervals, and transmitting, in the first bundle interval at a second frequency hop of the set of multiple frequency hops, a second repetition of the set of multiple repetitions of the uplink channel that does not have phase continuity with the first repetition.

An apparatus for wireless communication at a UE is described. The apparatus may include a processor, memory coupled with the processor, and instructions stored in the memory. The instructions may be executable by the processor to cause the apparatus to receive, from a base station, a control message configuring the UE to transmit a set of multiple repetitions of an uplink channel, transmit, at a first frequency hop of a set of multiple frequency hops, a first repetition of the set of multiple repetitions of the uplink channel in a first bundle interval of a set of multiple bundle intervals, and transmit, in the first bundle interval at a second frequency hop of the set of multiple frequency hops, a second repetition of the set of multiple repetitions of the uplink channel that does not have phase continuity with the first repetition.

Another apparatus for wireless communication at a UE is described. The apparatus may include means for receiving, from a base station, a control message configuring the UE to transmit a set of multiple repetitions of an uplink channel, means for transmitting, at a first frequency hop of a set of multiple frequency hops, a first repetition of the set of multiple repetitions of the uplink channel in a first bundle interval of a set of multiple bundle intervals, and means for transmitting, in the first bundle interval at a second frequency hop of the set of multiple frequency hops, a second repetition of the set of multiple repetitions of the uplink channel that does not have phase continuity with the first repetition.

A non-transitory computer-readable medium storing code for wireless communication at a UE is described. The code may include instructions executable by a processor to receive, from a base station, a control message configuring the UE to transmit a set of multiple repetitions of an uplink channel, transmit, at a first frequency hop of a set of multiple frequency hops, a first repetition of the set of multiple repetitions of the uplink channel in a first bundle interval of a set of multiple bundle intervals, and transmit, in the first bundle interval at a second frequency hop of the set of multiple frequency hops, a second repetition of the set of multiple repetitions of the uplink channel that does not have phase continuity with the first repetition.

Some examples of the method, apparatuses, and non-transitory computer-readable medium described herein may further include operations, features, means, or instructions for transmitting, in the first bundle interval and at the first frequency hop, a third repetition of the set of multiple repetitions of the uplink channel having phase continuity with the first repetition.

Some examples of the method, apparatuses, and non-transitory computer-readable medium described herein may further include operations, features, means, or instructions for transmitting a fourth repetition of the set of multiple repetitions of the uplink channel in a second bundle interval of the set of multiple bundle intervals and at the first frequency hop.

Some examples of the method, apparatuses, and non-transitory computer-readable medium described herein may further include operations, features, means, or instructions for receiving, via the control message, an indication of a value of the first frequency hop and an offset, where the second frequency hop may be based on the value of the first frequency hop and the offset.

In some examples of the method, apparatuses, and non-transitory computer-readable medium described herein, transmitting the second repetition may include operations, features, means, or instructions for transmitting the second repetition without phase continuity with the first repetition based on one or more phase continuity rules not being satisfied for transmission of the second repetition and the first repetition with phase continuity.

In some examples of the method, apparatuses, and non-transitory computer-readable medium described herein, the uplink channel may be a physical uplink shared channel or a physical uplink control channel.

A method for wireless communication at a UE is described. The method may include receiving, from a base station, a control message configuring the UE to transmit a set of multiple repetitions of an uplink channel over a carrier, transmitting, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and transmitting, based on the control message and the correspondence between the set of multiple bundle intervals and the uplink resources of the carrier, a second repetition of the set of multiple repetitions of the uplink channel in a second bundle interval of the set of multiple bundle intervals.

An apparatus for wireless communication at a UE is described. The apparatus may include a processor, memory coupled with the processor, and instructions stored in the memory. The instructions may be executable by the processor to cause the apparatus to receive, from a base station, a control message configuring the UE to transmit a set of multiple repetitions of an uplink channel over a carrier, transmit, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and transmit, based on the control message and the correspondence between the set of multiple bundle intervals and the uplink resources of the carrier, a second repetition of the set of multiple repetitions of the uplink channel in a second bundle interval of the set of multiple bundle intervals.

Another apparatus for wireless communication at a UE is described. The apparatus may include means for receiving, from a base station, a control message configuring the UE to transmit a set of multiple repetitions of an uplink channel over a carrier, transmitting, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and transmitting, based on the control message and the correspondence between the set of multiple bundle intervals and the uplink resources of the carrier, a second repetition of the set of multiple repetitions of the uplink channel in a second bundle interval of the set of multiple bundle intervals.

A non-transitory computer-readable medium storing code for wireless communication at a UE is described. The code may include instructions executable by a processor to receive, from a base station, a control message configuring the UE to transmit a set of multiple repetitions of an uplink channel over a carrier, transmit, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and transmit, based on the control message and the correspondence between the set of multiple bundle intervals and the uplink resources of the carrier, a second repetition of the set of multiple repetitions of the uplink channel in a second bundle interval of the set of multiple bundle intervals.

Some examples of the method, apparatuses, and non-transitory computer-readable medium described herein may further include operations, features, means, or instructions for receiving RRC signaling or DCI indicating a TTI format configuration, where the first bundle interval and second bundle interval may be identified based on the TTI format configuration.

In some examples of the method, apparatuses, and non-transitory computer-readable medium described herein, each bundle interval of the set of multiple bundle intervals includes two or more TTIs over which transmission of multiple repetitions of the uplink channel satisfy a phase continuity condition.

A method for wireless communication at a base station is described. The method may include transmitting, to a UE, a control message configuring the UE to transmit a set of multiple repetitions of an uplink channel, receiving a first repetition of the set of multiple repetitions of the uplink channel in a first available TTI of a first bundle interval of a set of multiple bundle intervals, and receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

An apparatus for wireless communication at a base station is described. The apparatus may include a processor, memory coupled with the processor, and instructions stored in the memory. The instructions may be executable by the processor to cause the apparatus to transmit, to a UE, a control message configuring the UE to transmit a set of multiple repetitions of an uplink channel, receive a first repetition of the set of multiple repetitions of the uplink channel in a first available TTI of a first bundle interval of a set of multiple bundle intervals, and receive a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Another apparatus for wireless communication at a base station is described. The apparatus may include means for transmitting, to a UE, a control message configuring the UE to transmit a set of multiple repetitions of an uplink channel, means for receiving a first repetition of the set of multiple repetitions of the uplink channel in a first available TTI of a first bundle interval of a set of multiple bundle intervals, and means for receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

A non-transitory computer-readable medium storing code for wireless communication at a base station is described. The code may include instructions executable by a processor to transmit, to a UE, a control message configuring the UE to transmit a set of multiple repetitions of an uplink channel, receive a first repetition of the set of multiple repetitions of the uplink channel in a first available TTI of a first bundle interval of a set of multiple bundle intervals, and receive a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

In some examples of the method, apparatuses, and non-transitory computer-readable medium described herein, the starting time of the available uplink TTI may be a starting time of a next available uplink TTI that occurs after the end of the preceding bundle interval of the set of multiple bundle intervals.

Some examples of the method, apparatuses, and non-transitory computer-readable medium described herein may further include operations, features, means, or instructions for transmitting radio resource control signaling or downlink control information indicating a TTI format configuration, where the available uplink TTI of each bundle interval of the set of multiple bundle intervals may be identified based on the TTI format configuration.

In some examples of the method, apparatuses, and non-transitory computer-readable medium described herein, each bundle interval of the set of multiple bundle intervals includes two or more uplink TTIs over which transmission of multiple repetitions of the uplink channel satisfy a phase continuity condition.

In some examples of the method, apparatuses, and non-transitory computer-readable medium described herein, the phase continuity condition may be satisfied based on the transmission of multiple repetitions of the uplink channel having a same modulation order, a same frequency allocation, a same transmission power level, a same transmit beam, or any combination thereof.

In some examples of the method, apparatuses, and non-transitory computer-readable medium described herein, the phase continuity condition may be satisfied based on the transmission of multiple repetitions of the uplink channel being consecutive transmissions.

In some examples of the method, apparatuses, and non-transitory computer-readable medium described herein, the phase continuity condition may be satisfied based on the transmission of multiple repetitions of the uplink channel having a non-zero time gap between the multiple repetitions of the uplink channel and downlink reception may be not scheduled in the non-zero time gap, or the phase continuity condition may satisfied based on the transmission of multiple repetitions of the uplink channel having a zero time gap between the multiple repetitions of the uplink channel.

Some examples of the method, apparatuses, and non-transitory computer-readable medium described herein may further include operations, features, means, or instructions for transmitting a control message indicating an unpaired spectrum operation TTI format pattern when operating in an unpaired spectrum operation mode, where the unpaired spectrum operation TTI format pattern indicates a pattern of one or more uplink TTIs, one or more downlink TTIs, or both, over a set of multiple TTIs.

Some examples of the method, apparatuses, and non-transitory computer-readable medium described herein may further include operations, features, means, or instructions for transmitting a control message indicating a paired spectrum operation mode for communications with the base station, where the paired spectrum operation mode may be associated with one or more uplink frequency ranges, one or more downlink transmission frequency ranges, or both, over a set of multiple TTIs.

Some examples of the method, apparatuses, and non-transitory computer-readable medium described herein may further include operations, features, means, or instructions for receiving, in the first bundle interval, a third repetition of the set of multiple repetitions of the uplink channel having phase continuity with the first repetition.

Some examples of the method, apparatuses, and non-transitory computer-readable medium described herein may further include operations, features, means, or instructions for receiving, in the second bundle interval, a fourth repetition of the set of multiple repetitions of the uplink channel having phase continuity with the second repetition.

Some examples of the method, apparatuses, and non-transitory computer-readable medium described herein may further include operations, features, means, or instructions for transmitting control signaling defining a bundle size applicable to each of the set of multiple bundle intervals as a number of consecutive TTIs per bundle interval.

In some examples of the method, apparatuses, and non-transitory computer-readable medium described herein, a bundle size applicable to each of the set of multiple bundle intervals may be based on a quantity of the set of multiple repetitions of the uplink channel, the bundle size defining a number of consecutive TTIs per bundle interval.

In some examples of the method, apparatuses, and non-transitory computer-readable medium described herein, a starting time of the first available TTI may be a starting time of an uplink TTI that may be scheduled for transmitting the first repetition.

In some examples of the method, apparatuses, and non-transitory computer-readable medium described herein, a starting time of the first available TTI may be a starting time of a flexible TTI that may be configured for transmitting the first repetition.

In some examples of the method, apparatuses, and non-transitory computer-readable medium described herein, a starting time of the second bundle interval may be a starting time of a flexible TTI or an uplink TTI that may be configured for transmitting a repetition of the set of multiple repetitions of the uplink channel.

In some examples of the method, apparatuses, and non-transitory computer-readable medium described herein, the uplink channel may be a physical uplink shared channel or a physical uplink control channel.

A method for wireless communication at a base station is described. The method may include transmitting, to a UE, a control message configuring the UE to transmit a set of multiple repetitions of an uplink channel, receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

An apparatus for wireless communication at a base station is described. The apparatus may include a processor, memory coupled with the processor, and instructions stored in the memory. The instructions may be executable by the processor to cause the apparatus to transmit, to a UE, a control message configuring the UE to transmit a set of multiple repetitions of an uplink channel, receive a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and receive a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Another apparatus for wireless communication at a base station is described. The apparatus may include means for transmitting, to a UE, a control message configuring the UE to transmit a set of multiple repetitions of an uplink channel, means for receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and means for receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

A non-transitory computer-readable medium storing code for wireless communication at a base station is described. The code may include instructions executable by a processor to transmit, to a UE, a control message configuring the UE to transmit a set of multiple repetitions of an uplink channel, receive a first repetition of the set of multiple repetitions of the uplink channel in a first bundle interval of a set of multiple bundle intervals and at a first frequency hop of a set of multiple frequency hops, the first frequency hop corresponding to a first index of the first bundle interval, and receive a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Some examples of the method, apparatuses, and non-transitory computer-readable medium described herein may further include operations, features, means, or instructions for receiving, in the first bundle interval and at the first frequency hop, a third repetition of the set of multiple repetitions of the uplink channel having with phase continuity with the first repetition.

Some examples of the method, apparatuses, and non-transitory computer-readable medium described herein may further include operations, features, means, or instructions for receiving, in the second bundle interval and at the second frequency hop, a fourth repetition of the set of multiple repetitions of the uplink channel having phase continuity with the second repetition.

Some examples of the method, apparatuses, and non-transitory computer-readable medium described herein may further include operations, features, means, or instructions for indexing each bundle interval of the set of multiple bundle intervals that includes at least one uplink TTI, at least one flexible TTI configured for transmitting the uplink channel, or both.

Some examples of the method, apparatuses, and non-transitory computer-readable medium described herein may further include operations, features, means, or instructions for transmitting, via the control message, an indication of a value of the first frequency hop and an offset, where the second frequency hop may be based on the value of the first frequency hop and the offset.

Some examples of the method, apparatuses, and non-transitory computer-readable medium described herein may further include operations, features, means, or instructions for transmitting, via the control message, a first indication of a value of the first frequency hop, a second indication of a second value of the second frequency hop, or both.

Some examples of the method, apparatuses, and non-transitory computer-readable medium described herein may further include operations, features, means, or instructions for transmitting a control message indicating a TDD TTI format pattern when operating in a TDD mode, the TDD TTI format pattern indicating a pattern of one or more uplink TTIs and one or more downlink TTIs for a set of multiple TTIs, where the first bundle interval may have a starting time corresponding to an available uplink TTI in the TDD TTI format pattern.

In some examples of the method, apparatuses, and non-transitory computer-readable medium described herein, the starting time of the first bundle interval may be a starting time of an uplink TTI that may be scheduled for transmitting the first repetition.

In some examples of the method, apparatuses, and non-transitory computer-readable medium described herein, the starting time of the first bundle interval may be a starting time of a flexible TTI that may be configured for transmitting the first repetition.

Some examples of the method, apparatuses, and non-transitory computer-readable medium described herein may further include operations, features, means, or instructions for receiving a control message indicating an FDD mode for communications with the base station, where the FDD mode may be associated with one or more uplink frequency ranges, one or more downlink transmission frequency ranges, or both, over a set of multiple TTIs, where the first bundle interval may have a starting time corresponding to an available uplink TTI in the FDD mode.

Some examples of the method, apparatuses, and non-transitory computer-readable medium described herein may further include operations, features, means, or instructions for indexing each bundle interval of the set of multiple bundle intervals.

In some examples of the method, apparatuses, and non-transitory computer-readable medium described herein, the uplink channel may be a physical uplink shared channel or a physical uplink control channel.

A method for wireless communication at a base station is described. The method may include transmitting, to a UE, a control message configuring the UE to transmit a set of multiple repetitions of an uplink channel, receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

An apparatus for wireless communication at a base station is described. The apparatus may include a processor, memory coupled with the processor, and instructions stored in the memory. The instructions may be executable by the processor to cause the apparatus to transmit, to a UE, a control message configuring the UE to transmit a set of multiple repetitions of an uplink channel, receive a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and receive a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Another apparatus for wireless communication at a base station is described. The apparatus may include means for transmitting, to a UE, a control message configuring the UE to transmit a set of multiple repetitions of an uplink channel, means for receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and means for receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

A non-transitory computer-readable medium storing code for wireless communication at a base station is described. The code may include instructions executable by a processor to transmit, to a UE, a control message configuring the UE to transmit a set of multiple repetitions of an uplink channel, receive a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion, and receive a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Some examples of the method, apparatuses, and non-transitory computer-readable medium described herein may further include operations, features, means, or instructions for receiving the second repetition in the second bundle interval at the first frequency hop based on the first transmission occasion index being one of an odd index or an even index.

Some examples of the method, apparatuses, and non-transitory computer-readable medium described herein may further include operations, features, means, or instructions for receiving the second repetition in the second bundle interval at the second frequency hop based on the first index being one of an odd index or an even index and the second index being an other of the odd index or the even index.

In some examples of the method, apparatuses, and non-transitory computer-readable medium described herein, multiple repetitions of the set of multiple repetitions of the uplink channel in a same bundle interval belong to a same transmission occasion.

In some examples of the method, apparatuses, and non-transitory computer-readable medium described herein, multiple repetitions of the set of multiple repetitions of the uplink channel associated with different bundle intervals may be associated with different transmission occasions.

Some examples of the method, apparatuses, and non-transitory computer-readable medium described herein may further include operations, features, means, or instructions for receiving, at the first frequency hop or at the second frequency hop, a third repetition of the set of multiple repetitions of the uplink channel via a transmission occasion corresponding to a third transmission occasion index, the transmission occasion occurring outside of transmission occasions associated with the set of multiple bundle intervals.

Some examples of the method, apparatuses, and non-transitory computer-readable medium described herein may further include operations, features, means, or instructions for uplink TTIs corresponding to the third transmission occasion index do not satisfy a phase continuity condition.

In some examples of the method, apparatuses, and non-transitory computer-readable medium described herein, each of the first bundle interval and the second bundle interval includes a respective two or more uplink TTIs over which transmission of multiple repetitions of the uplink channel satisfy a phase continuity condition.

In some examples of the method, apparatuses, and non-transitory computer-readable medium described herein, the phase continuity condition may be satisfied based on the transmission of multiple repetitions of the uplink channel having a same modulation order, a same frequency allocation, a same transmission power level, a same transmit beam, or any combination thereof.

In some examples of the method, apparatuses, and non-transitory computer-readable medium described herein, the phase continuity condition may be satisfied based on the transmission of multiple repetitions of the uplink channel being consecutive transmissions.

In some examples of the method, apparatuses, and non-transitory computer-readable medium described herein, the phase continuity condition may be satisfied based on the transmission of multiple repetitions of the uplink channel having a non-zero time gap between the multiple repetitions of the uplink channel and downlink reception may be not scheduled in the non-zero time gap.

A method for wireless communication at a base station is described. The method may include transmitting, to a UE, a control message configuring the UE to transmit a set of multiple repetitions of an uplink channel, receiving, at a first frequency hop of a set of multiple frequency hops, a first repetition of the set of multiple repetitions of the uplink channel in a first bundle interval of a set of multiple bundle intervals, and receiving, in the first bundle interval at a second frequency hop of the set of multiple frequency hops, a second repetition of the set of multiple repetitions of the uplink channel that does not have phase continuity with the first repetition.

An apparatus for wireless communication at a base station is described. The apparatus may include a processor, memory coupled with the processor, and instructions stored in the memory. The instructions may be executable by the processor to cause the apparatus to transmit, to a UE, a control message configuring the UE to transmit a set of multiple repetitions of an uplink channel, receive, at a first frequency hop of a set of multiple frequency hops, a first repetition of the set of multiple repetitions of the uplink channel in a first bundle interval of a set of multiple bundle intervals, and receive, in the first bundle interval at a second frequency hop of the set of multiple frequency hops, a second repetition of the set of multiple repetitions of the uplink channel that does not have phase continuity with the first repetition.

Another apparatus for wireless communication at a base station is described. The apparatus may include means for transmitting, to a UE, a control message configuring the UE to transmit a set of multiple repetitions of an uplink channel, means for receiving, at a first frequency hop of a set of multiple frequency hops, a first repetition of the set of multiple repetitions of the uplink channel in a first bundle interval of a set of multiple bundle intervals, and means for receiving, in the first bundle interval at a second frequency hop of the set of multiple frequency hops, a second repetition of the set of multiple repetitions of the uplink channel that does not have phase continuity with the first repetition.

A non-transitory computer-readable medium storing code for wireless communication at a base station is described. The code may include instructions executable by a processor to transmit, to a UE, a control message configuring the UE to transmit a set of multiple repetitions of an uplink channel, receive, at a first frequency hop of a set of multiple frequency hops, a first repetition of the set of multiple repetitions of the uplink channel in a first bundle interval of a set of multiple bundle intervals, and receive, in the first bundle interval at a second frequency hop of the set of multiple frequency hops, a second repetition of the set of multiple repetitions of the uplink channel that does not have phase continuity with the first repetition.

Some examples of the method, apparatuses, and non-transitory computer-readable medium described herein may further include operations, features, means, or instructions for receiving, in the first bundle interval and at the first frequency hop, a third repetition of the set of multiple repetitions of the uplink channel having phase continuity with the first repetition.

Some examples of the method, apparatuses, and non-transitory computer-readable medium described herein may further include operations, features, means, or instructions for receiving a fourth repetition of the set of multiple repetitions of the uplink channel in a second bundle interval of the set of multiple bundle intervals and at the first frequency hop.

Some examples of the method, apparatuses, and non-transitory computer-readable medium described herein may further include operations, features, means, or instructions for transmitting, via the control message, an indication of a value of the first frequency hop and an offset, where the second frequency hop may be based on the value of the first frequency hop and the offset.

In some examples of the method, apparatuses, and non-transitory computer-readable medium described herein, receiving the second repetition may include operations, features, means, or instructions for receiving the second repetition without phase continuity with the first repetition based on one or more phase continuity rules not being satisfied for transmission of the second repetition and the first repetition with phase continuity.

In some examples of the method, apparatuses, and non-transitory computer-readable medium described herein, the uplink channel may be a physical uplink shared channel or a physical uplink control channel.

A method for wireless communication at a base station is described. The method may include transmitting, to a UE, a control message configuring the UE to transmit a set of multiple repetitions of an uplink channel over a carrier, receiving, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and receiving, based on the control message and the correspondence between the set of multiple bundle intervals and the uplink resources of the carrier, a second repetition of the set of multiple repetitions of the uplink channel in a second bundle interval of the set of multiple bundle intervals.

An apparatus for wireless communication at a base station is described. The apparatus may include a processor, memory coupled with the processor, and instructions stored in the memory. The instructions may be executable by the processor to cause the apparatus to transmit, to a UE, a control message configuring the UE to transmit a set of multiple repetitions of an uplink channel over a carrier, receive, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and receive, based on the control message and the correspondence between the set of multiple bundle intervals and the uplink resources of the carrier, a second repetition of the set of multiple repetitions of the uplink channel in a second bundle interval of the set of multiple bundle intervals.

Another apparatus for wireless communication at a base station is described. The apparatus may include means for transmitting, to a UE, a control message configuring the UE to transmit a set of multiple repetitions of an uplink channel over a carrier, receiving, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and receiving, based on the control message and the correspondence between the set of multiple bundle intervals and the uplink resources of the carrier, a second repetition of the set of multiple repetitions of the uplink channel in a second bundle interval of the set of multiple bundle intervals.

A non-transitory computer-readable medium storing code for wireless communication at a UE is described. The code may include instructions executable by a processor to transmit, to a UE, a control message configuring the UE to transmit a set of multiple repetitions of an uplink channel over a carrier, receive, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals, and receive, based on the control message and the correspondence between the set of multiple bundle intervals and the uplink resources of the carrier, a second repetition of the set of multiple repetitions of the uplink channel in a second bundle interval of the set of multiple bundle intervals.

Some examples of the method, apparatuses, and non-transitory computer-readable medium described herein may further include operations, features, means, or instructions for transmitting RRC signaling or DCI indicating a TTI format configuration, where the first bundle interval and second bundle interval may be identified based on the TTI format configuration.

In some examples of the method, apparatuses, and non-transitory computer-readable medium described herein, each bundle interval of the set of multiple bundle intervals includes two or more TTIs over which transmission of multiple repetitions of the uplink channel satisfy a phase continuity condition.

DETAILED DESCRIPTION

Figure 1:
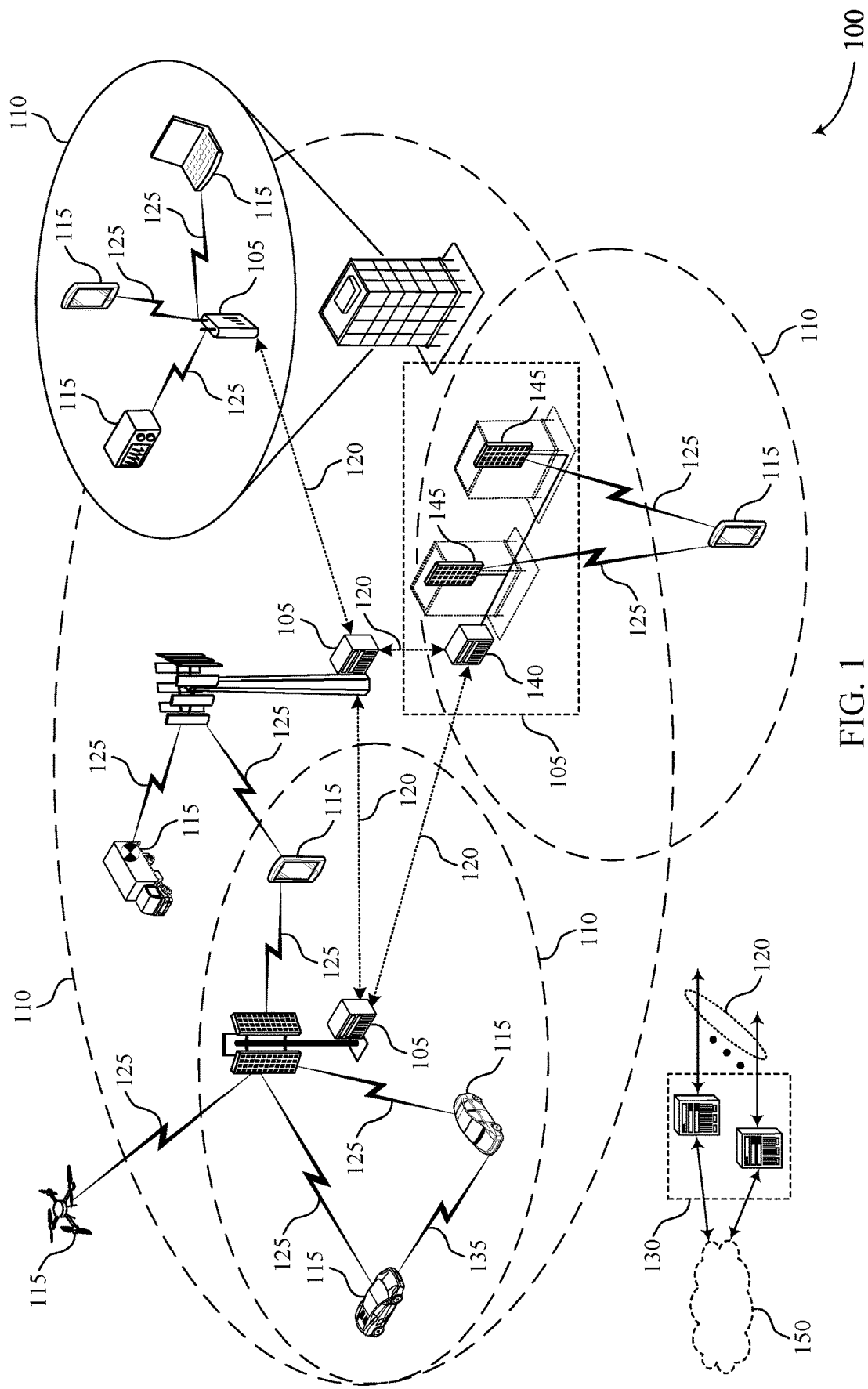
FIG. 1 illustrates an example of a wireless communications system in accordance with aspects of the present disclosure.

A user equipment (UE) may perform bundling (e.g., demodulation reference signal (DMRS) bundling) for one or more sets of repetitions of an uplink channel transmission to a base station. Bundling may include maintaining phase continuity across a set of repetitions of the uplink channel transmission, for example, to support joint channel estimation for the set of repetitions at the base station.

A bundle size may define a number of consecutive transmission time intervals (TTIs) for a bundle interval, in which a set of repetitions of the uplink channel transmission may be bundled. As described herein, a bundle interval may refer to a time interval or a time domain window (e.g., of a defined length) over which DMRS or other bundling (e.g., maintaining a phase continuity) is applied or is configured to be applied. The UE may be configured with or determine a bundle size for a set of bundle intervals that each include a set of bundled repetitions of the uplink channel transmission. Some bundle intervals may not include any uplink TTIs (e.g., based on a TTI format pattern) and the UE may be unable to apply DMRS bundling (e.g., maintain phase continuity) in such bundle intervals. Additionally, or alternatively, a bundle interval may include one or more uplink TTIs that may not support phase continuity for repetitions of the uplink channel transmission within the bundle interval (e.g., based on one or more phase continuity rules).

The present disclosure provides techniques for applying phase continuity to uplink transmissions within a bundle interval, where a UE may be configured to identify a bundle interval and/or one or more bundle interval parameters associated with the phase continuity (e.g., DMRS bundling). The UE may identify multiple bundle intervals, which may represent multiple, non-overlapping time domain windows for bundling repetitions of an uplink channel transmission. Each bundle interval may be determined based on a semi-static slot (e.g., TTI) format configuration (e.g., a cell-specific configuration or a UE-specific configuration). In a first example, the UE may determine bundle intervals for the uplink channel transmission based on a TTI format pattern and the bundle size. For example, a first bundle interval may start from a first available uplink TTI (e.g., an uplink TTI or a flexible TTI configured or available for uplink transmissions) scheduled for transmission of the uplink channel transmission or from multiple uplink TTIs scheduled for transmission of repetitions of the uplink channel transmission that meet one or more conditions for maintaining phase continuity.

For example, the transmission of multiple repetitions of the uplink channel (e.g., in that meets the one or more conditions) may support maintaining phase continuity for repetitions of the transmissions of the uplink channel and at least one other repetition of the uplink channel. In some cases, the following bundle intervals may start on a next available uplink TTI (e.g., an uplink TTI or a flexible TTI configured for uplink transmissions) after an end of a preceding bundle interval, such that each bundle interval may include at least one uplink TTI. In some cases, the following bundle intervals may start on an uplink TTI associated with uplink repetitions that meet the one or more conditions, after an end of a preceding bundle interval.

In a second example, the UE may use frequency resources (e.g., a frequency hop) for repetitions of the uplink channel transmission within a bundle interval based on an index of the bundle interval or an index of a transmission occasion for one or more of the repetitions. In some cases, all repetitions transmitted in a first bundle interval may use frequency resources associated with the index of the first bundle interval (e.g., a first frequency hop). Similarly, all repetitions transmitted in a second bundle interval may use frequency resources associated with the index of the second bundle interval (e.g., a second frequency hop). In some cases, consecutive bundle intervals may be associated with consecutive indexes (e.g., whether or not a bundle interval includes an uplink TTI). In some other cases, bundle intervals including an uplink TTI (e.g., an uplink TTI or a flexible TTI configured for uplink transmissions) may be associated with consecutive indexes, while other bundle intervals (e.g., not including an uplink TTI) may not be indexed. In some cases, a set of one or more transmissions may be referred to as a transmission occasion and may be associated with a respective transmission occasion index and a corresponding frequency hop.

In a third example, the UE may bundle (e.g., maintain phase continuity for) one or more repetitions of the uplink channel transmission in a first bundle interval, but may not bundle one or more other repetitions of the uplink channel transmission in the same bundle interval, for example, based on one or more phase continuity rules (e.g., a time between repetitions). In such cases, the UE may switch frequency resources (e.g., frequency hops) each time phase discontinuity is experienced (e.g., within a bundle interval or when switching between bundle intervals, or both).

Particular aspects of the subject matter described in this disclosure may be implemented to realize one or more of the following potential advantages. The techniques employed by the described communication devices may provide benefits and enhancements to the operation of the communication devices, including increased channel demodulation, communication quality, and reduced overhead. For example, operations performed by the described communication devices may provide improvements to channel estimation and demodulation procedures by bundling DMRS across multiple TTIs and/or by performing frequency hopping when bundling DMRS. Bundling DMRS may improve channel estimation and demodulation procedures by increasing an accuracy of channel estimation and demodulation based on a shared, coherent parameter (e.g., phase continuity) across the bundled DMRS.

By transmitting a first repetition of an uplink channel in a first bundle interval and transmitting a second repetition of the uplink channel in a second bundle interval based on a respective starting time of the second bundle interval (e.g., using one or more bundling rules or techniques described herein), channel demodulation may be performed with increased accuracy across multiple TTIs, which may increase communication quality and thereby generally reduce communication overhead. For example, configuration of bundle intervals with respective starting times corresponding to a respective starting time of a respective available transmission time interval that occurs after an end of a respective preceding bundle interval of the plurality of bundle intervals may allow for efficient identification of resources for repetitions of the uplink channel while channel demodulation to be performed with increased accuracy within a respective bundle interval (e.g., based on defining the bundle interval according to a starting time and ending time that supports increased accuracy).

Additionally or alternatively, by transmitting a first repetition of an uplink channel in a first bundle interval and at a first frequency hop (e.g., using one or rules or techniques described herein, based on a transmission occasion index), and transmitting a second repetition of the uplink channel in a second bundle interval and at the first frequency hop or a second frequency hop (e.g., using one or more rules or techniques described herein, based on a transmission occasion index), channel demodulation may also be performed with increased accuracy across multiple TTIs, which may increase communication quality and thereby generally reduce communication overhead. For example, based on using the respective frequency hops associated with the bundle intervals for transmission of the corresponding repetition(s) of the uplink channel, channel demodulation may be performed with increased accuracy within a respective bundle interval (e.g., based using a respective frequency hop that supports increased accuracy for a corresponding bundle interval).

Based on the increased communication quality and decreased communication overhead, a wireless device may generally consume less power when communicating and may generally experience lower latency. Similarly, based on the increased accuracy of channel estimation and demodulation, uplink communications may generally experience increased reliability.

Aspects of the disclosure are initially described in the context of wireless communications systems. Aspects of the disclosure are further illustrated by and described with reference to bundling schemes, a process flow, apparatus diagrams, system diagrams, and flowcharts that relate to DMRS bundling and frequency hopping.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) (e.g., paired spectrum operation) and time division duplexing (TDD) (e.g., unpaired spectrum operation) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may apply phase continuity to uplink transmissions within a bundle interval, for example, to support joint channel estimation at a base station 105. In a first example, a UE 115 may determine bundle intervals for an uplink channel transmission based on a TTI format pattern and a bundle size. For example, bundle intervals may start on a next available uplink TTI after an end of a preceding bundle interval or that includes at least one additional uplink TTI over which transmission of multiple repetitions of the uplink channel meets one or more conditions for maintaining phase continuity after an end of a preceding bundle interval, such that each bundle interval may include at least one uplink TTI. In a second example, the UE 115 may use frequency resources (e.g., a frequency hop) for repetitions of the uplink channel transmission within a bundle interval based on an index of the bundle interval or an index of a transmission occasion for one or more repetitions. In a third example, the UE 115 may not bundle some repetitions of the uplink channel transmission in a same bundle interval, for example, based on one or more phase continuity rules (e.g., a time between repetitions over which the UE 115 is capable of maintaining phase continuity). In such cases, the UE 115 may switch frequency resources (e.g., frequency hops) each time phase discontinuity is experienced (e.g., within a bundle interval or when switching between bundle intervals, or both)

Figure 2:
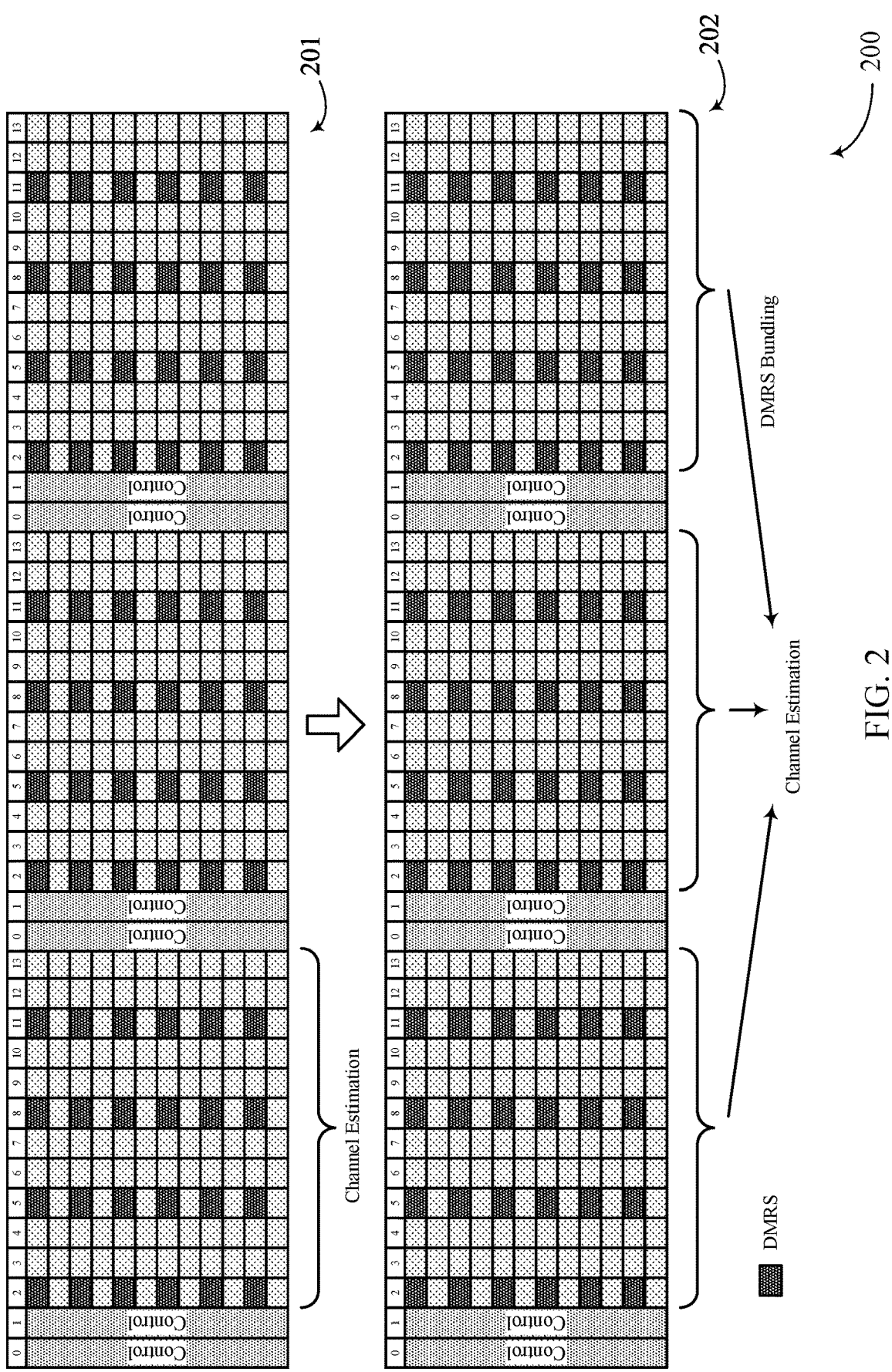
FIG. 2 illustrates an example of a bundling scheme in accordance with aspects of the present disclosure.

FIG. 2 illustrates an example of a bundling scheme 200 in accordance with aspects of the present disclosure. The bundling scheme 200 may illustrate one or more techniques for enhancing or increasing coverage for uplink shared channel transmissions (e.g., transmissions on a physical uplink shared channel (PUSCH)), for uplink control channel transmissions (e.g., transmissions on a physical uplink control channel (PUCCH)), or both.

For example, some channels may experience lower transmission rates or other communication quality bottlenecks. Such channels may include channels in a frequency range 1 (FR1) such as a PUSCH for eMBB (e.g., for FDD or for TDD with "DDDSU," "DDDSUDDSUU," or "DDDDDDDSUU" formats), a PUSCH for voice over IP (VoIP) (e.g., for FDD or for TDD with "DDDSU" or "DDDSUDDSUU" formats), a PUCCH format 3 with 11 bits, or a PUCCH format 3 with 22 bits, among other examples. Such channels may additionally, or alternatively, include channels in a frequency range 2 (FR2) (e.g., urban 28 GHz) such as a PUSCH for eMBB (e.g., for TDD with "DDDSU" or "DDSU" formats), a PUSCH for VoIP (e.g., for TDD with "DDDSU" or "DDSU" formats), a PUCCH format 3 with 11 bits, or a PUCCH format 3 with 22 bits, among other examples. As described herein, a "D" may represent a TTI configured for downlink transmissions in a TDD format (e.g., unpaired spectrum operation), a "U" may represent an TTI configured for downlink transmissions in the TDD format, and an "S" may represent a flexible TTI in the TDD format (e.g., a TTI configured for downlink, uplink, or both).

As described herein, a flexible TTI (e.g., slot) may have a dynamic slot indication, for indicating whether the flexible TTI is associated with uplink, downlink, or both. The indication may be a slot format indication (SFI) in a downlink control information (DCI) (e.g., DCI format 2_0), where the SFI may indicate a format for the flexible TTI. TDD format (e.g., unpaired spectrum operation), as described herein, may be an example of or represent a TDD TTI format pattern, which may include a pattern of "D," "U," and "S," TTIs for TDD transmissions.

In order to enhance or increase coverage for uplink shared channel and/or uplink control channel transmissions, a PUSCH repetition type (e.g., a type A) may have an increased number of repetitions (e.g., maximum number of repetitions) of a PUSCH transmission, where the number of repetitions may be counted on a basis of available uplink slots (e.g., based on a TDD TTI format). Signaling may also be configured to support PUSCH repetitions (e.g., Type A PUSCH repetitions) for a random access message 3 (msg3). Additionally, or alternatively, coverage may be increased by supporting transport block (TB) processing over a multi-slot PUSCH transmission, where a TB size (TBS) may be determined based on the multiple slots and may be transmitted over the multiple slots.

In some cases, in order to increase coverage, joint channel estimation may be performed over multiple PUSCH transmissions, for example, based on conditions for maintaining power consistency and phase continuity. The joint channel estimation may include optimization for DMRS location and/or granularity, and may additionally, or alternatively, include inter-slot frequency hopping with inter-slot bundling (e.g., DMRS bundling) to support the joint channel estimation. In some cases, in order to increase coverage, signaling may be configured to support a dynamic PUCCH repetition factor indication and/or DMRS bundling may be supported across PUCCH repetitions (e.g., repetitions of a PUCCH transmission).

When performing joint channel estimation, such as illustrated by bundling scheme 202, a receiving device (e.g., a base station 105) may jointly process DMRS in multiple uplink transmissions (e.g., multiple PUSCH or multiple PUCCH transmissions). For example, DMRS from multiple PUSCH transmissions may be jointly processed, or DMRS from multiple PUCCH transmissions may be jointly processed, but no joint processing may be performed for DMRS from PUSCH transmissions and DMRS from PUCCH transmissions. Each transmission may be received in a corresponding slot or TTI, where each TTI may include 14 symbols (e.g., numbered 0 to 13 in FIG. 2). A transmitting device (e.g., a UE 115) may maintain phase continuity across the multiple uplink transmissions (e.g., multiple PUSCH or multiple PUCCH transmissions). Maintaining phase continuity may include maintaining one or more conditions for the multiple uplink transmissions, such as maintaining a same frequency resource allocation (e.g., a same resource block (RB)), a same transmit power, a same spatial transmit relation, same antenna ports (e.g., for DMRS), and a same precoding (e.g., for DMRS).

Joint channel estimation across multiple repetitions of an uplink transmission (e.g., across multiple slots or TTIs) may increase an accuracy of the channel estimation, which may result in increased communication quality, for example, compared to other schemes, such as bundling scheme 201, that support channel estimation using one slot or TTI. In such cases, the joint channel estimation may take place across multiple consecutive or non-consecutive transmissions (e.g., consecutive or non-consecutive TTIs), such that each TTI illustrated by bundling scheme 202 may be consecutive or non-consecutive.

Figure 3:
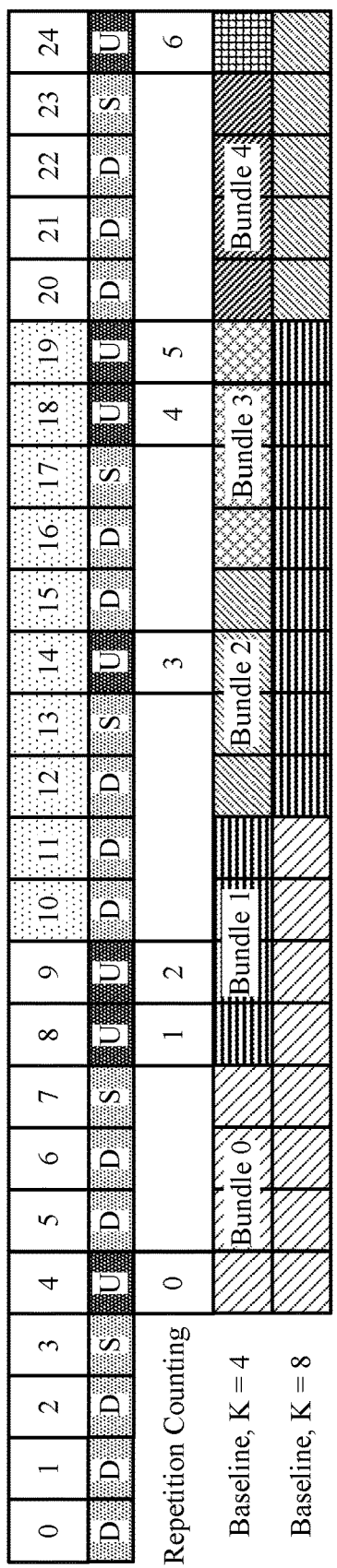
FIG. 3 illustrates an example of a bundling scheme in accordance with aspects of the present disclosure.

FIG. 3 illustrates an example of a bundling scheme 300 in accordance with aspects of the present disclosure. The bundling scheme 300 may support DMRS bundling for joint channel estimation, for example, as described with reference to FIG. 2. The bundling scheme 300 may illustrate a number of slots or TTIs (e.g., numbered from 0 to 24) over which a UE 115 may transmit repetitions of an uplink channel (e.g., a PUSCH or a PUCCH transmission), where the UE 115 may represent a UE 115 described with reference to FIGS. 1 and 2. A TTI labeled "D" may represent a TTI configured for downlink transmissions, a TTI labeled "U" may represent a TTI configured for uplink transmissions, and a TTI labeled "S" may represent a flexible TTI configured for uplink transmissions, downlink transmissions, or both.

The bundling scheme 300 may represent a TDD format "DDDSUDDSUU" (e.g., a TTI format pattern of repeating downlink, uplink, and flexible TTIs on a same carrier, following a "DDDSUDDSUU" pattern). It is to be understood that while a "DDDSUDDSUU" format is described herein, the same examples may apply to other TDD formats (e.g., TTI format patterns) or other transmission formats (e.g., FDD formats, paired spectrum operation) without departing from the scope of the present disclosure.

A bundle interval as described herein may be defined such that the UE 115 may coherently transmit in the uplink subject to one or more phase continuity conditions. In some cases, a bundle interval may also be referred to as a bundle, for example, as illustrated in FIG. 3. All bundle intervals may have a same bundle size (e.g., K), which may be counted as a number of consecutive slots or TTIs from a starting time of the bundle interval. The bundle size may be configured to the UE 115 (e.g., via RRC signaling or dynamically via DCI), or may be implicitly determined by the UE 115 based on the repetitions of the uplink channel transmission. For example, the UE 115 may determine the bundle size based on a number of repetitions of the uplink channel transmission (e.g., using a formula or equation that includes the number of repetitions as a variable).

A bundle size (e.g., K) may, in some examples, include four TTIs or eight TTIs, for example, as illustrated by the different bundle configurations (e.g., K equal to four and K equal to eight) in FIG. 3. Additionally, or alternatively, a bundle size may include any number of TTIs without departing from the scope of the present disclosure. In some cases, a larger K value may result in more uplink transmission TTIs within a bundle interval (e.g., "U" TTIs), and may also result in a higher challenge to maintain phase continuity across the uplink transmissions within the bundle interval, such that determination of the bundle size K may be based on one or both of these factors.

In some cases, phase continuity may not be maintained across uplink transmissions within the bundles or bundle intervals, for example, based on one or more phase continuity rules (e.g., based on a larger bundle size). In such cases, a bundle or a bundle interval may still be defined and used as a time period or duration to perform UE operations, such as adjusting frequency before a next uplink channel transmission (e.g., among other examples).

FIG. 3 may illustrate an example of a baseline bundle interval design, where bundle intervals may be arranged without any time gap between consecutive bundle intervals (e.g., back-to-back). In such cases, some bundles (e.g., bundle 4 when K is equal to four) may not include any TTI for an uplink transmission (e.g., may not include a slot or TTI configured as a "U" TTI), which may impact frequency hopping across bundle intervals.

Figure 4:
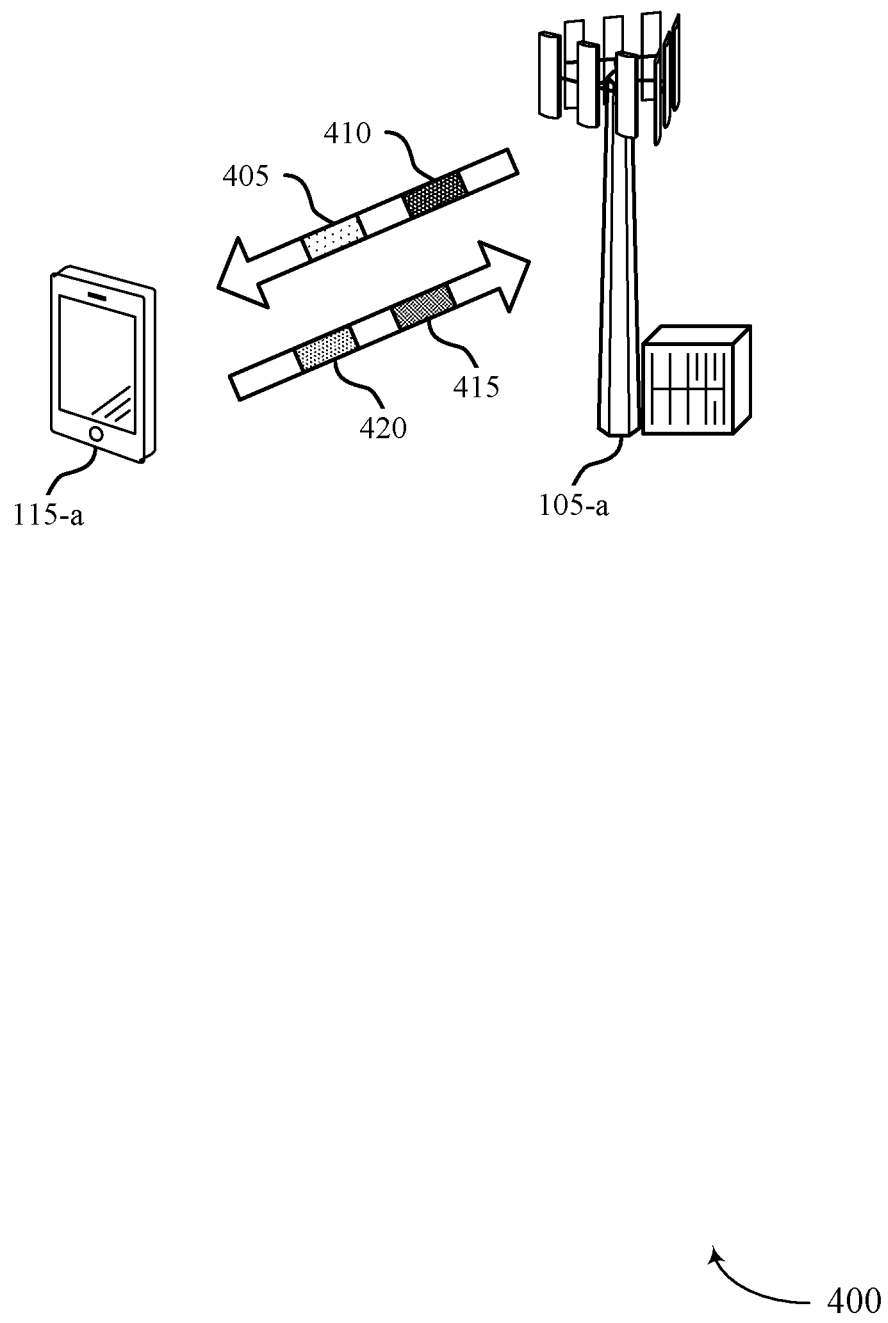
FIG. 4 illustrates an example of a wireless communications system in accordance with aspects of the present disclosure.

FIG. 4 illustrates an example of a wireless communications system 400 in accordance with aspects of the present disclosure. In some examples, wireless communications system 400 may implement some aspects of wireless communications system 100. In some examples, wireless communications system 400 may additionally, or alternatively, implement some aspects of bundling scheme 200 or 300. For example, wireless communications system 400 may include a base station 105-a and a UE 115-a, which may represent respective examples of a base station 105 and a UE 115 described with reference to FIGS. 1-3. As described herein, UE 115-a may perform bundling (e.g., DMRS bundling, such as by maintaining phase continuity) for one or more sets of repetitions of an uplink channel transmission to base station 105-a.

As described herein, transmitting repetitions of an uplink channel transmission may include transmitting an uplink message, which may be a PUSCH or PUCCH transmission, on each of the repetitions, where each uplink message may include a same TB or may include up to a number of different TBs per repetition. Each uplink message (e.g., repetition of the uplink channel transmission) may be transmitted via a respective TTI.

UE 115-a may receive control signaling 405 (e.g., RRC signaling) from base station 105-a, which may configure UE 115-a with a TDD (e.g., unpaired spectrum operation) TTI format pattern (e.g., a TDD pattern of repeating "D," "S," and/or "U" TTIs). UE 115-a may also receive a control message 410 (e.g., signaled via RRC or DCI) from base station 105-a, which may schedule transmission of the uplink channel transmission and which may indicate for UE 115-a to transmit multiple repetitions of the uplink channel transmission (e.g., may indicate a number of repetitions). In some cases, the control message 410 (e.g., a DCI carrying an SFI) may configure UE 115-a with a TDD TTI format pattern (e.g., a TDD pattern of repeating "D," "S," and/or "U" TTIs).

As described with reference to FIG. 3, UE 115-a may be configured with or determine a bundle size for bundle intervals that each include one or more bundled repetitions of the uplink channel transmission. For example, UE 115-a may receive control signaling 405 (e.g., RRC signaling) or the control message 410 (e.g., a DCI) indicating the bundle size, or UE 115-a may determine the bundle size based on a number of repetitions of the uplink channel transmission indicated by the control message 410. In some cases, some bundle intervals may not include any uplink TTIs (e.g., based on the TDD TTI format pattern) and the UE may be unable to apply DMRS bundling (e.g., maintain phase continuity) in such bundle intervals. Additionally, or alternatively, a bundle interval may include one or more uplink TTIs that may not support phase continuity for repetitions of the uplink channel transmission (e.g., based on one or more phase continuity rules, such as a time between repetitions based on a larger bundle interval).

The present disclosure provides techniques for applying phase continuity to uplink transmissions within a bundle interval, where UE 115-*a* may be configured to identify a bundle interval and/or bundle interval parameters associated with the phase continuity (e.g., DMRS bundling). In a first example, UE 115-*a* may determine bundle intervals for the uplink channel transmission based on the TDD TTI format pattern and the bundle interval size. For example, a first bundle interval may start from a first available uplink TTI (e.g., an uplink TTI or a flexible TTI configured or available for uplink transmissions) scheduled for transmission of the uplink channel transmission or from a first uplink TTI scheduled for transmission of the uplink channel transmission that meets one or more conditions for maintaining phase continuity. Because, in some cases, the first available uplink TTI may be a flexible TTI (e.g., based on an indication in SFI), in such cases, a bundle interval configuration or format may be based on an SFI indicating a format of the flexible TTI.

The first bundle interval may, for example, include a transmission (e.g., from UE 115-*a* to base station 105-*a*) of a first repetition 415 or a second repetition 420 of the uplink channel transmission. In some cases, the following bundle intervals may start on a first available uplink TTI (e.g., an uplink TTI or a flexible TTI configured for uplink transmissions) after an end of a preceding bundle interval, such that each bundle interval may include at least one uplink TTI. For example, UE 115-*a* may transmit a second repetition 420 of the uplink channel transmission (e.g., to base station 105-*a*) in an uplink TTI of the second bundle interval. Additionally, or alternatively, UE 115-*a* may transmit the second repetition 420 of the uplink channel transmission (e.g., to base station 105-*a*) in an uplink TTI of the first bundle interval, after the first repetition 415 and having phase continuity with the first repetition 415 (e.g., based on being transmitted in the same bundle interval).

In some cases, the following bundle intervals may start on a next available uplink TTI having a repetition 420 that meets the one or more conditions for phase continuity with another repetition 420, after an end of a preceding bundle interval. For example, UE 115-*a* may transmit a first repetition 415 of the uplink channel transmission without phase continuity and may transmit a second repetition 420 of the uplink channel transmission (e.g., to base station 105-*a*) in an uplink TTI of a first bundle interval.

In a second example, UE 115-*a* may use frequency resources (e.g., a frequency hop) for repetitions of the uplink channel transmission within a bundle interval based on an index of the bundle interval or an index of a transmission occasion for one or more of the repetitions. A set of one or more transmissions (e.g., consecutive transmissions) may be referred to as a transmission occasion and may be associated with a respective transmission occasion index and a corresponding frequency hop. In some cases, all repetitions transmitted in a first bundle interval or first transmission occasion may use frequency resources (e.g., a first frequency hop) associated with the index of the first bundle interval or the first transmission occasion, respectively. Similarly, all repetitions transmitted in a second bundle interval or second transmission occasion may use frequency resources (e.g., a second frequency hop) associated with the index of the second bundle interval or the second transmission occasion, respectively.

For example, UE 115-*a* may transmit the first repetition 415 and the second repetition 420 (e.g., to base station 105-*a*) within the first bundle interval, or the first transmission occasion, and using the first frequency hop. In another example, UE 115-*a* may transmit the first repetition 415 (e.g., to base station 105-*a*) within the first bundle interval, or the first transmission occasion, using the first frequency hop, and may transmit the second repetition 420 within the second bundle interval, or the second transmission occasion, using the second frequency hop. In some cases, all bundle intervals may be associated with consecutive indexes (e.g., whether or not a bundle interval includes an uplink TTI), or bundle intervals including an uplink TTI (e.g., an uplink TTI or a flexible TTI configured for uplink transmissions) may be associated with consecutive indexes, while other bundle intervals (e.g., not including an uplink TTI) may not be indexed. All transmission occasions may be associated with consecutive indexes (e.g., because each transmission occasion may include at least one uplink TTI).

In a third example, UE 115-*a* may bundle (e.g., maintain phase continuity for) one or more repetitions of the uplink channel transmission in a first bundle interval, but may not bundle one or more other repetitions of the uplink channel transmission in the same bundle interval, for example, based on one or more phase continuity rules (e.g., a time between repetitions). In such cases, UE 115-*a* may switch frequency resources (e.g., frequency hops) each time phase discontinuity is experienced (e.g., within a bundle interval or when switching between bundle intervals, or both). For example, UE 115-*a* may transmit the first repetition 415 and the second repetition 420 in the first bundle interval, but without phase continuity. In this example, the first repetition 415 may be transmitted at a first frequency hop and the second repetition 420 may be transmitted at a second frequency hop (e.g., based on being transmitted without phase continuity).

Figure 5:
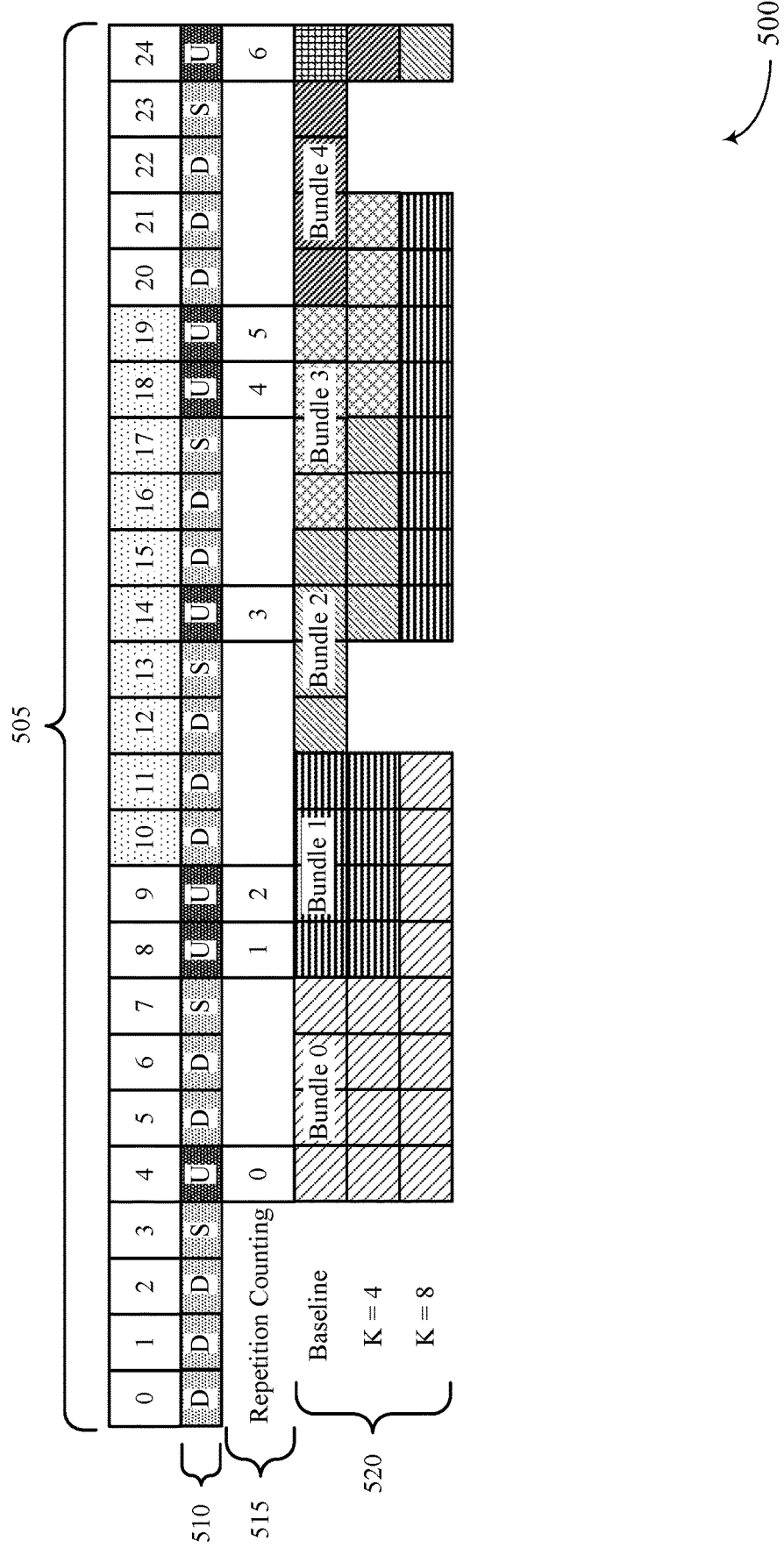
FIG. 5 illustrates an example of a bundling scheme in accordance with aspects of the present disclosure.

FIG. 5 illustrates an example of a bundling scheme 500 in accordance with aspects of the present disclosure. In some examples, bundling scheme 500 may implement or be implemented by some aspects of wireless communications system 100 or 400. In some examples, bundling scheme 500 may additionally, or alternatively, implement or be implemented by some aspects of bundling scheme 200 or 300. For example, bundling scheme 500 may be implemented by a base station 105 and a UE 115, which may represent respective examples of a base station 105 and a UE 115 described with reference to FIGS. 1-4. As described herein, the UE 115 may perform bundling (e.g., DMRS bundling, such as by maintaining phase continuity) for one or more sets of repetitions of an uplink channel transmission to the base station 105.

FIG. 5 illustrates a number of TTIs 505 (e.g., a slot or mini-slot) for transmission of the repetitions of the uplink channel transmission. The TTIs 505 may be associated with a TDD (e.g., unpaired spectrum operation) TTI format pattern 510, which may be configured by the base station 105 and which may indicate a pattern of downlink ("D"), uplink ("U"), and flexible ("S") TTIs 505. While FIG. 5 illustrates a "DDDSUDDSUU" TDD TTI format pattern, it is to be understood that the same examples described with reference to FIG. 5 may apply to other TDD formats (e.g., TTI format patterns) or other transmission formats (e.g., FDD formats, paired spectrum operation) without departing from the scope of the present disclosure. A bundle, which may also be referred to as a bundle interval 520, may be used for transmitting a set of repetitions 515 of the uplink channel transmission with phase continuity. A bundle interval may begin at a starting time and may be defined by a number of consecutive TTIs 505 (e.g., a bundle size) beginning at the starting time.

In some cases (e.g., as described with reference to FIGS. 3 and 4), a bundle interval may not line up or include a TTI 505 that is available for uplink transmissions (e.g., Bundle 4), for example, based on a baseline bundling scheme. Accordingly, as described with reference to FIG. 4, a start of a bundle interval 520 (e.g., a bundle interval k+1) may be a start of a first available uplink TTI 505 for repetitions 515 of the uplink channel transmission (e.g., a PUSCH or PUCCH transmission) after an end of a preceding (e.g., immediately preceding) bundle interval 520 (e.g., a bundle interval k), such as after an end of a last available TTI 505 of a preceding bundle interval 520. Additionally, or alternatively, a start of a bundle interval 520 (e.g., bundle interval k+1) may be a start of a first flexible TTI 505 (e.g., "S" slot) eligible for repetitions of the uplink channel transmission after an end of a preceding (e.g., immediately preceding) bundle interval 520 (e.g., bundle interval k). A first bundle interval 520 (e.g., Bundle 0, or a bundle interval k=0, such as for a first repetition of the uplink channel transmission) may start from a first available uplink TTI 505 or flexible TTI 505 (e.g., TTI 4) scheduled for transmission of a first or initial repetition of the uplink channel transmission. Such techniques for determining starting positions for a bundle interval 520 may be indicated by the base station 105 or may be configured at the UE 115 (e.g., based on a wireless communications standard).

FIG. 5 illustrates starting positions for bundle intervals 520 based on different bundle sizes (e.g., K values), where a bundle size may be configured by the network or determined implicitly, as described herein. For example, FIG. 5 illustrates starting positions for bundle intervals 520 using a K value of four and a K value of eight. A K value of four may result in bundle intervals 520 beginning at TTI 4, TTI 8, TTI 14, TTI 18, and TTI 24 (e.g., compared to the baseline bundle intervals, which start at TTI 4, TTI 8, TTI 12, TTI 16, TTI 20, and TTI 24 as shown in FIG. 3). A K value of eight may result in bundle intervals 520 beginning at TTI 4, TTI 14, and TTI 24 (e.g., compared to the baseline bundle intervals, which start at TTI 4, TTI 8, TTI 12, TTI 16, TTI 20, and TTI 24). While FIG. 5 illustrates a K value of four and a K value of eight, it is to be understood that the same examples described herein with reference to FIG. 5 may apply to other K values without departing from the scope of the present disclosure.

Figure 6:
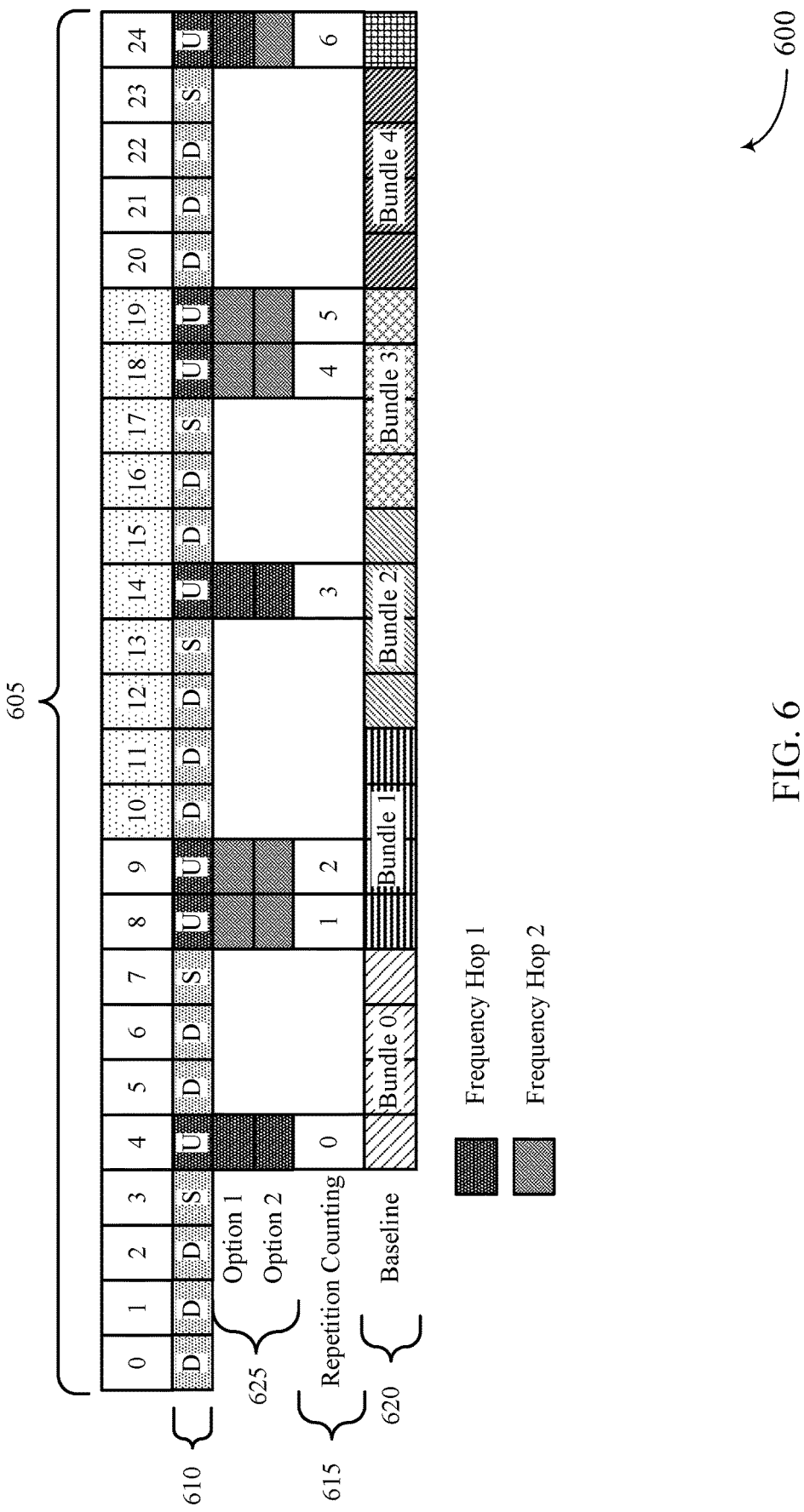
FIG. 6 illustrates an example of a bundling scheme in accordance with aspects of the present disclosure.

FIG. 6 illustrates an example of a bundling scheme 600 in accordance with aspects of the present disclosure. In some examples, bundling scheme 600 may implement or be implemented by some aspects of wireless communications system 100 or 400. In some examples, bundling scheme 600 may additionally, or alternatively, implement or be implemented by some aspects of bundling scheme 200 or 300. For example, bundling scheme 600 may be implemented by a base station 105 and a UE 115, which may represent respective examples of a base station 105 and a UE 115 described with reference to FIGS. 1-5. As described herein, the UE 115 may perform bundling (e.g., DMRS bundling, such as by maintaining phase continuity) for one or more sets of repetitions of an uplink channel transmission to the base station 105.

FIG. 6 illustrates a number of TTIs 605 (e.g., a slot or mini-slot) for transmission of the repetitions of the uplink channel transmission. The TTIs 605 may be associated with a TDD (e.g., unpaired spectrum operation) TTI format pattern 610 as described herein, which may represent a "DDDSUDDSUU" TDD TTI format pattern. It is to be understood that the same examples described with reference to FIG. 6 may apply to other TDD formats (e.g., TDD TTI format patterns) or other transmission formats (e.g., FDD formats, paired spectrum operation) without departing from the scope of the present disclosure. A bundle, which may also be referred to as a bundle interval 620, may be used for transmitting a set of repetitions 615 of the uplink channel transmission with phase continuity. A bundle interval 620 may begin at a starting time and may be defined by a number of consecutive TTIs 605 (e.g., a bundle size) beginning at the starting time. As described herein, a first bundle interval 620 (e.g., Bundle 0) may start from a first available uplink TTI 605 (e.g., TTI 4) or flexible TTI 605 scheduled for transmission of a first or initial repetition 615 of the uplink channel transmission.

In some cases, a baseline bundle interval scheme may be adopted, and as described with reference to FIGS. 3 and 4, some bundle intervals 620 (e.g., Bundle 4) may not have any uplink TTIs 605 (e.g., or flexible TTIs useable for an uplink transmission) for transmission of the repetitions 615 of the uplink channel transmission. As such, frequency hopping (e.g., changing transmission frequency resources or frequency location) may fail to occur within bundle intervals 620 that do not include uplink TTIs 605. As described herein, frequency hopping may include changing a frequency location of a repetition of the uplink channel transmission (e.g., changing to a different RB), such that phase continuity may not be maintained after frequency hopping (e.g., based on transmitting using a different frequency allocation).

In cases where a bundle interval 620 does not include any uplink TTIs 605 (e.g., or flexible TTIs 605 for an uplink transmission), the UE 115 may determine a frequency hop 625 (e.g., frequency locations or resources) for each repetition 615 of the uplink channel transmission based on an index of a corresponding bundle interval 620. The index may be different from an actual bundle number (e.g., different from Bundle 0, Bundle 1, etc.). For example, the UE 115 may transmit corresponding repetitions 615 of the uplink channel transmission at a frequency hop 1 (e.g., a first frequency resource, or first RB) for even bundle intervals 620 (e.g., bundle intervals 620 with an even-numbered index). Similarly, the UE 115 may transmit corresponding repetitions 615 of the uplink channel transmission at a frequency hop 2 (e.g., a second frequency resource, or second RB) for odd bundle intervals 620 (e.g., bundle intervals 620 with an odd-numbered index).

The UE 115 may receive signaling from the base station 105 indicating frequency hop 1 and frequency hop 2, among other examples. For example, the UE 115 may receive (e.g., via one or more DCI parameters) an indication of a starting value (e.g., frequency value) of frequency hop 1 and an offset between frequency hop 1 and frequency hop 2. In another example, the UE 115 may receive an indication of a starting value (e.g., frequency value) of frequency hop 1 and a starting value (e.g., frequency value) of frequency hop 2.

In a first example (e.g., as illustrated by Option 1), the counting of bundle intervals 620 (e.g., bundle interval indexes) may be based on bundle intervals that have at least one uplink or flexible TTI 605 for transmission of a repetition 615 of the uplink channel transmission. Accordingly, in Option 1, Bundle 0 may be associated with an index 0, Bundle 1 may be associated with an index 1, and so on through Bundle 3 (e.g., because each of these bundles may include at least one uplink or flexible TTI 605 for transmission of a repetition 615 of the uplink channel transmission). In Option 1, Bundle 4 may not be associated with a corresponding index, for example, because Bundle 4 may not include at least one uplink or flexible TTI 605 for transmission of a repetition 615 of the uplink channel transmission. Accordingly, Bundle 5 (e.g., following Bundle 4) may be associated with an index 4. The UE 115 may transmit repetitions 615 of the uplink channel transmission at a frequency hop 625 corresponding to the bundle interval index. For example, uplink repetition 0 may be transmitted at frequency hop 1, uplink repetitions 1 and 2 may be transmitted at frequency hop 2, uplink repetition 3 may be transmitted at frequency hop 1, uplink repetitions 4 and 5 may be transmitted at frequency hop 2, and uplink repetition 6 (e.g., in Bundle 5) may be transmitted at frequency hop 1 (e.g., corresponding to index 4, or an even index).

In a second example (e.g., as illustrated by Option 2), the counting of bundle intervals 620 (e.g., bundle interval indexes) may be based on all bundle intervals 620 regardless of whether a bundle interval 620 has an uplink or flexible TTI 605 for transmission of a repetition 615 of the uplink channel transmission. Accordingly, Bundle 0 may be associated with an index 0, Bundle 1 may be associated with an index 1, and so on through Bundle 5 (e.g., or further), even though Bundle 4 may not include at least one uplink or flexible TTI 605 for transmission of a repetition 615 of the uplink channel transmission. The UE 115 may transmit repetitions 615 of the uplink channel transmission at a frequency hop 625 corresponding to the bundle interval index. For example, uplink repetition 0 may be transmitted at frequency hop 1, uplink repetitions 1 and 2 may be transmitted at frequency hop 2, and so forth. In this example, Bundle 5 may be associated with an index 5, such that uplink repetitions 4 and 5 (e.g., in Bundle 3) may be transmitted at frequency hop 2 and uplink repetition 6 (e.g., in Bundle 5) may also be transmitted at frequency hop 2 (e.g., associated with index 5, or an odd index).

Figure 7:
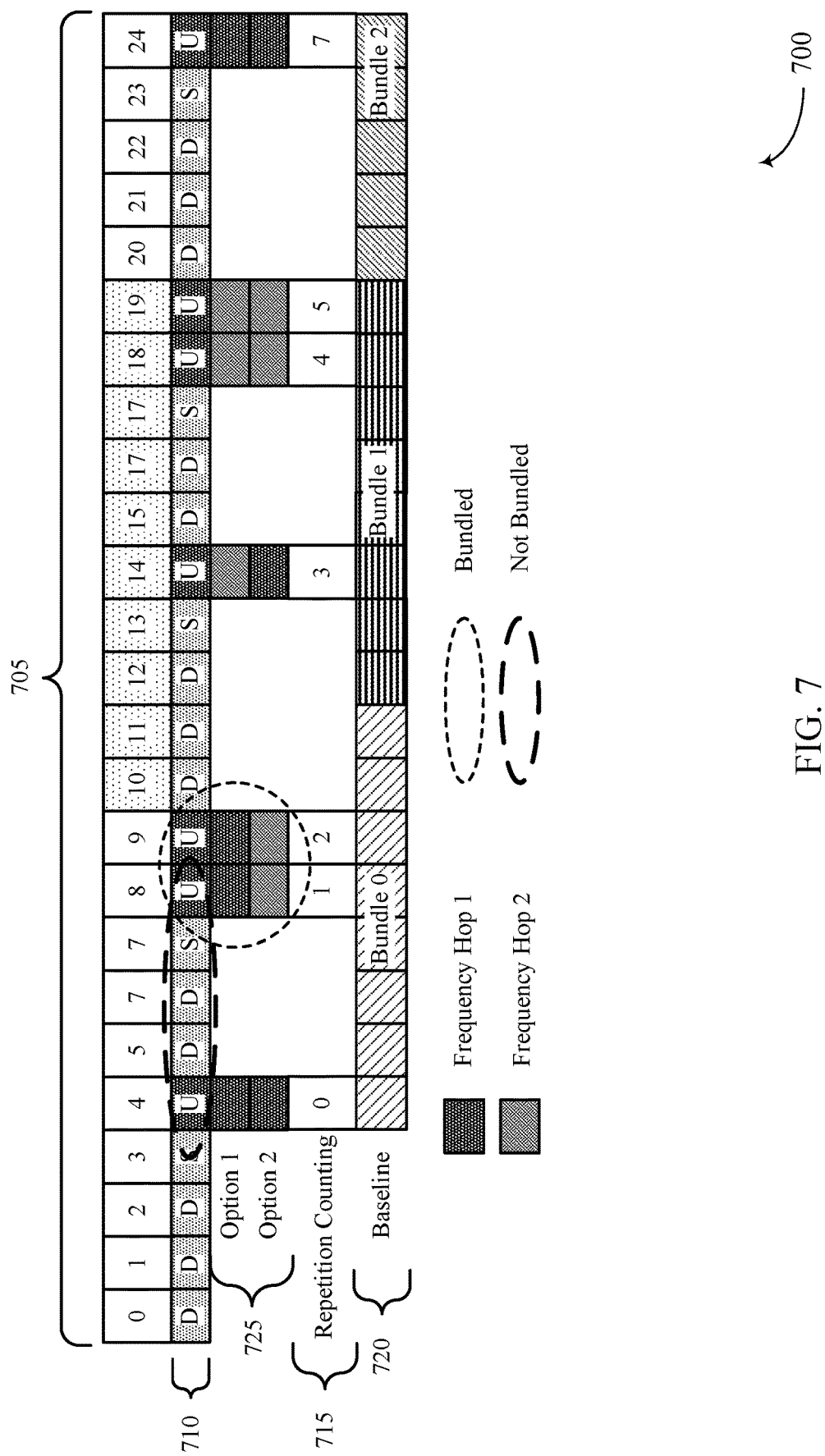
FIG. 7 illustrates an example of a bundling scheme in accordance with aspects of the present disclosure.

FIG. 7 illustrates an example of a bundling scheme 700 in accordance with aspects of the present disclosure. In some examples, bundling scheme 700 may implement or be implemented by some aspects of wireless communications system 100 or 400. In some examples, bundling scheme 700 may additionally, or alternatively, implement or be implemented by some aspects of bundling scheme 200 or 300. For example, bundling scheme 700 may be implemented by a base station 105 and a UE 115, which may represent respective examples of a base station 105 and a UE 115 described with reference to FIGS. 1-6. As described herein, the UE 115 may perform bundling (e.g., DMRS bundling, such as by maintaining phase continuity) for one or more sets of repetitions of an uplink channel transmission to the base station 105.

FIG. 7 illustrates a number of TTIs 705 (e.g., a slot or mini-slot) for transmission of the repetitions of the uplink channel transmission. The TTIs 705 may be associated with a TDD (e.g., unpaired spectrum operation) TTI format pattern 710 as described herein, which may represent a "DDDSUDDSUU" TDD TTI format pattern. It is to be understood that the same examples described with reference to FIG. 7 may apply to other TDD formats (e.g., TTI format patterns) or other transmission formats (e.g., FDD formats, paired spectrum operation) without departing from the scope of the present disclosure. A bundle, which may also be referred to as a bundle interval 720, may be used for transmitting a set of repetitions 715 of the uplink channel transmission with or without phase continuity. A bundle interval 720 may begin at a starting time and may be defined by a number of consecutive TTIs 705 (e.g., a bundle size) beginning at the starting time. As described herein, a first bundle interval 720 (e.g., Bundle 0) may start from a first available uplink TTI 705 (e.g., TTI 4) or flexible TTI 705 scheduled for transmission of a first or initial repetition 715 of the uplink channel transmission.

In some cases, a baseline bundle interval scheme may be adopted, and as described with reference to FIGS. 3 and 4, some repetitions 715 of the uplink channel transmission in a bundle interval 720 (e.g., Bundle 0) may be bundled together while some repetitions 715 of the uplink channel transmission in the same bundle interval 720 may not be bundled, for example, due to one or more phase continuity rules. For example, in Bundle 0, repetition 0 may not be bundled with either of repetition 1 or repetition 2 (e.g., based on the one or more phase continuity rules), while repetitions 1 and 2 may be bundled. In one example, repetitions 1 and 2 may be too far apart (e.g., in time) from repetition 0 to maintain phase continuity (e.g., based on the one or more phase continuity rules where a UE is capable of maintaining for repetitions that are separated in time by less than a defined time interval or in frequency by less than a defined frequency range), although other examples of phase continuity rules may apply to the same or a similar example of phase discontinuity within a bundle interval 720.

In cases where some repetitions 715 of the uplink channel transmission in a bundle interval 720 may not be bundled, frequency hopping may or may not be supported within the bundle interval 720. In a first example (e.g., Option 1), the UE 115 may determine the frequency hops 725 for the repetitions 715 of the uplink channel transmission within a bundle interval 720 such that all repetitions 715 in a same bundle interval 720 may use a same frequency hop 725. For example, the UE 115 may transmit all repetitions 715 of the uplink channel transmission within Bundle 0 at a frequency hop 1 (e.g., a first frequency resource, or first RB). The UE 115 may similarly transmit all repetitions 715 of the uplink channel transmission in Bundle 1 at a frequency hop 2 (e.g., a second frequency resource, or second RB).

In a second example (e.g., Option 2), the UE 115 may determine the frequency hops 725 for the repetitions 715 of the uplink channel transmission within a bundle interval 720 such that repetitions 715 of the uplink channel transmission with phase continuity (e.g., bundled repetitions 715) use a same frequency hop 725, while repetitions 715 of the uplink channel transmission without phase continuity (e.g., repetitions 715 that are not bundled) use different frequency hops 725. For example, the UE 115 may transmit repetition 0 at frequency hop 1 and repetitions 1 and 2 at frequency hop 2. Determination of a frequency hop 725 for a first repetition 715 of the uplink channel transmission in a next bundle interval 720 may depend on a frequency hop 725 of a last repetition 715 in the preceding bundle interval 720 (e.g., may be a different frequency hop 725 than the last repetition 715). For example, the UE 115 may transmit repetitions 1 and 2 at frequency hop 2 (e.g., in Bundle 0) and may transmit repetition 3 at frequency hop 1 (e.g., in Bundle 1) based on changing or switching bundle intervals 720.

The UE 115 may receive signaling from the base station 105 indicating frequency hop 1 and frequency hop 2, among other examples. For example, the UE 115 may receive (e.g., via one or more DCI parameters) an indication of a starting value (e.g., frequency value) of frequency hop 1 and an offset between frequency hop 1 and frequency hop 2. In another example, the UE 115 may receive an indication of a starting value (e.g., frequency value) of frequency hop 1 and a starting value (e.g., frequency value) of frequency hop 2.

Figure 8:
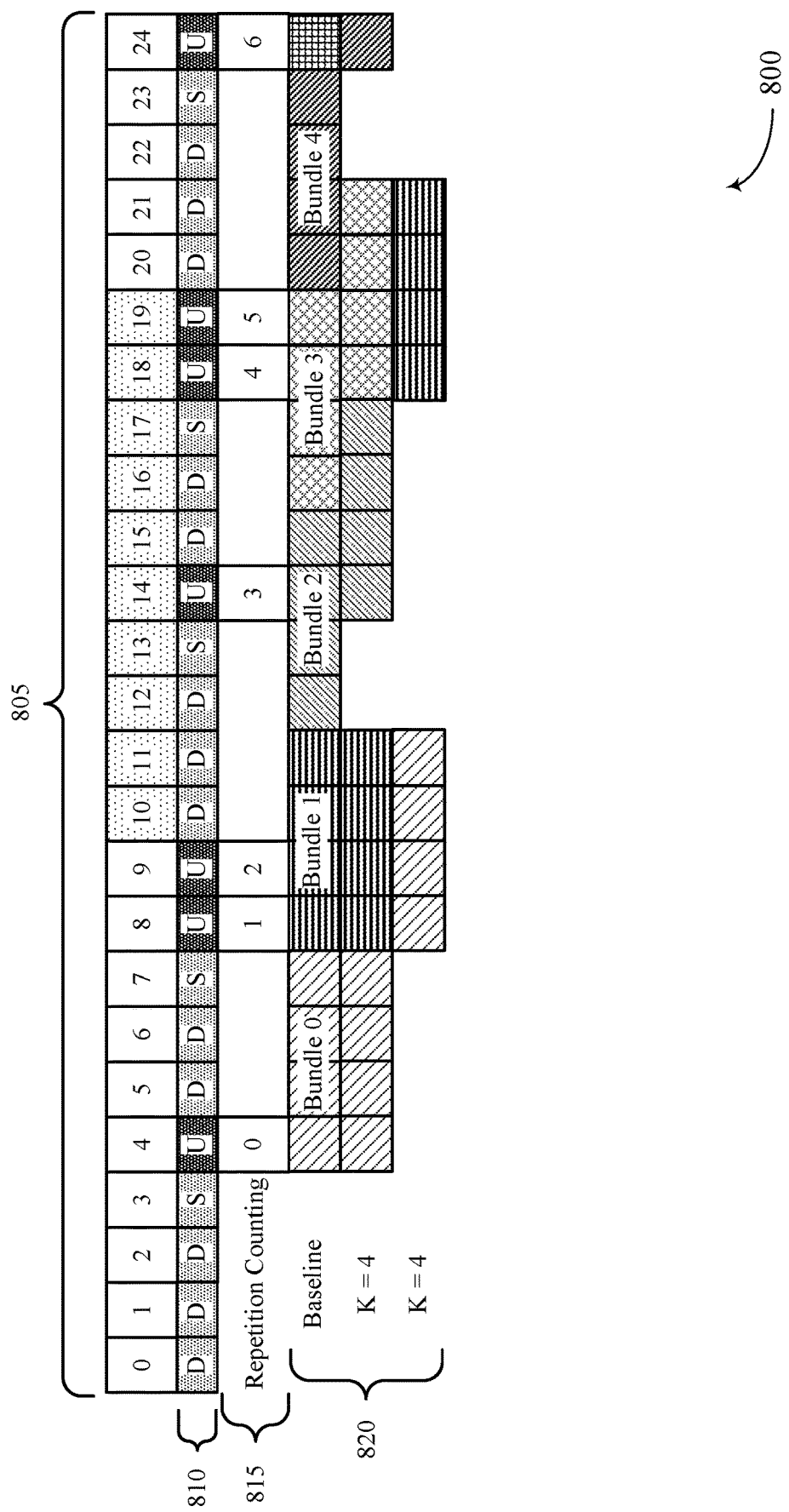
FIG. 8 illustrates an example of a bundling scheme in accordance with aspects of the present disclosure.

FIG. 8 illustrates an example of a bundling scheme 800 in accordance with aspects of the present disclosure. In some examples, bundling scheme 800 may implement or be implemented by some aspects of wireless communications system 100 or 400. In some examples, bundling scheme 800 may additionally, or alternatively, implement or be implemented by some aspects of bundling scheme 200 or 300. For example, bundling scheme 800 may be implemented by a base station 105 and a UE 115, which may represent respective examples of a base station 105 and a UE 115 described with reference to FIGS. 1-7. As described herein, the UE 115 may perform bundling (e.g., DMRS bundling, such as by maintaining phase continuity) for one or more sets of repetitions 815 of an uplink channel transmission to the base station 105.

FIG. 8 illustrates a number of TTIs 805 (e.g., a slot or mini-slot) for transmission of the repetitions 815 of the uplink channel transmission. The TTIs 805 may be associated with a TDD (e.g., unpaired spectrum operation) TTI format pattern 810 as described herein, which may represent a "DDDSUDDSUU" TDD TTI format pattern. It is to be understood that the same examples described with reference to FIG. 8 may apply to other TDD formats (e.g., TDD TTI format patterns) or other transmission formats (e.g., FDD formats, paired spectrum operation) without departing from the scope of the present disclosure. A bundle, which may also be referred to as a bundle interval 820, may be used for transmitting a set of repetitions 815 of the uplink channel transmission with phase continuity. A bundle interval 820 may begin at a starting time and may be defined by a number of consecutive TTIs 805 (e.g., a bundle size) beginning at the starting time. As described herein, a first bundle interval 820 (e.g., Bundle 0) may start from a first available uplink TTI 805 (e.g., TTI 4) or flexible TTI 805 scheduled for transmission of a first or initial repetition 815 of the uplink channel transmission that meets one or more phase continuity conditions.

For example, a bundle interval 820 may include two or more uplink TTIs 805 that are available for transmission of the repetitions 815 of the uplink channel transmission, where the two or more uplink TTIs 805 include repetitions 815 of the uplink channel transmission that satisfy the one or more phase continuity conditions. The phase continuity condition(s) may include maintaining a modulation order between repetitions 815 in the two or more uplink TTIs 805, maintaining a same RB allocation (e.g., a length and frequency position) between the repetitions 815 in the two or more uplink TTIs 805, maintaining a same beam between the repetitions 815 in the two or more uplink TTIs 805 (e.g., no beam switching occurs, such as for FR2), maintaining a same transmission power level for the repetitions 815 in the two or more uplink TTIs 805, or any combination thereof.

In some cases, the phase continuity condition(s) may include a condition that the two or more uplink TTIs 805 and corresponding repetitions 815 be consecutive. In some cases, the phase continuity condition(s) may include a condition that the repetitions 815 have a non-zero time gap between the repetitions 815, where a downlink reception is not scheduled in the non-zero time gap. In some cases, maintaining a same transmission power level may be applied to a component carrier (CC), such that no change in power control parameters occurs. Similarly, maintaining a same transmission power level may be applied to a CC that is not impacted by one or more other concurrent CCs that are configured for inter-band carrier aggregation or dual connectivity for a same UE 115 with dynamic power sharing, such that there may be no change in transmission power level for any configured CC(s) that are part of configured intra-band carrier aggregation or dual connectivity. Further, the one or more phase continuity conditions may indicate that intra-TTI and inter-TTI frequency hopping is not supported within a bundle interval 820.

In some cases, a baseline bundle interval scheme may be adopted (e.g., K=4 and bundle intervals 820 are immediately consecutive), and as described with reference to FIGS. 3 and 4, some bundle intervals 820 (e.g., Bundle 4) may not have any uplink TTIs 805 (e.g., or flexible TTIs useable for an uplink transmission) for transmission of the repetitions 815 of the uplink channel transmission. In some cases, another bundle interval scheme may be adopted (e.g., K=4 and bundle intervals 820 include one or more uplink or flexible TTIs 805), as described with reference to FIG. 6. In such cases, some bundle intervals 820 (e.g., Bundles 0, 3) may not have any uplink TTIs 805 (e.g., or flexible TTIs useable for an uplink transmission) that have a repetition 815 that satisfies the one or more conditions for phase continuity.

In such cases, an nth window (e.g., nth bundle interval 820) may start from a first available TTI 805 (e.g., uplink TTI 805 or flexible TTI 805) for transmission of the uplink channel transmission, for example, after an (n−1)th window (e.g., bundle interval 820). The first available repetition 815 may be bundled with subsequent repetitions 815 of the uplink channel transmission within the nth window (e.g., within the bundle interval 820), for example, based on satisfying the one or more phase continuity conditions for bundling. For example, a first bundle interval 820 (e.g., Bundle 0) may start at TTI 8, and may continue through TTI 11, based on Bundle 0 including TTIs 8 and 9, which may both be configured for a transmission of the uplink channel transmission where transmissions of the uplink channel transmission in TTIs 8 and 9 satisfy the one or more phase continuity conditions. Bundling (e.g., applying a bundle interval 820) may skip TTIs 4 and 14, which include repetitions 815 that may not satisfy the one or more phase continuity conditions with at least one other TTI 805. A second bundle interval 820 (e.g., Bundle 1) may start at TTI 18, and may continue through TTI 21, based on Bundle 1 including TTIs 18 and 19, which may both be configured for transmission of the uplink channel transmission, where TTIs 18 and 19 include repetitions 815 that satisfy the one or more phase continuity conditions.

Figure 9:
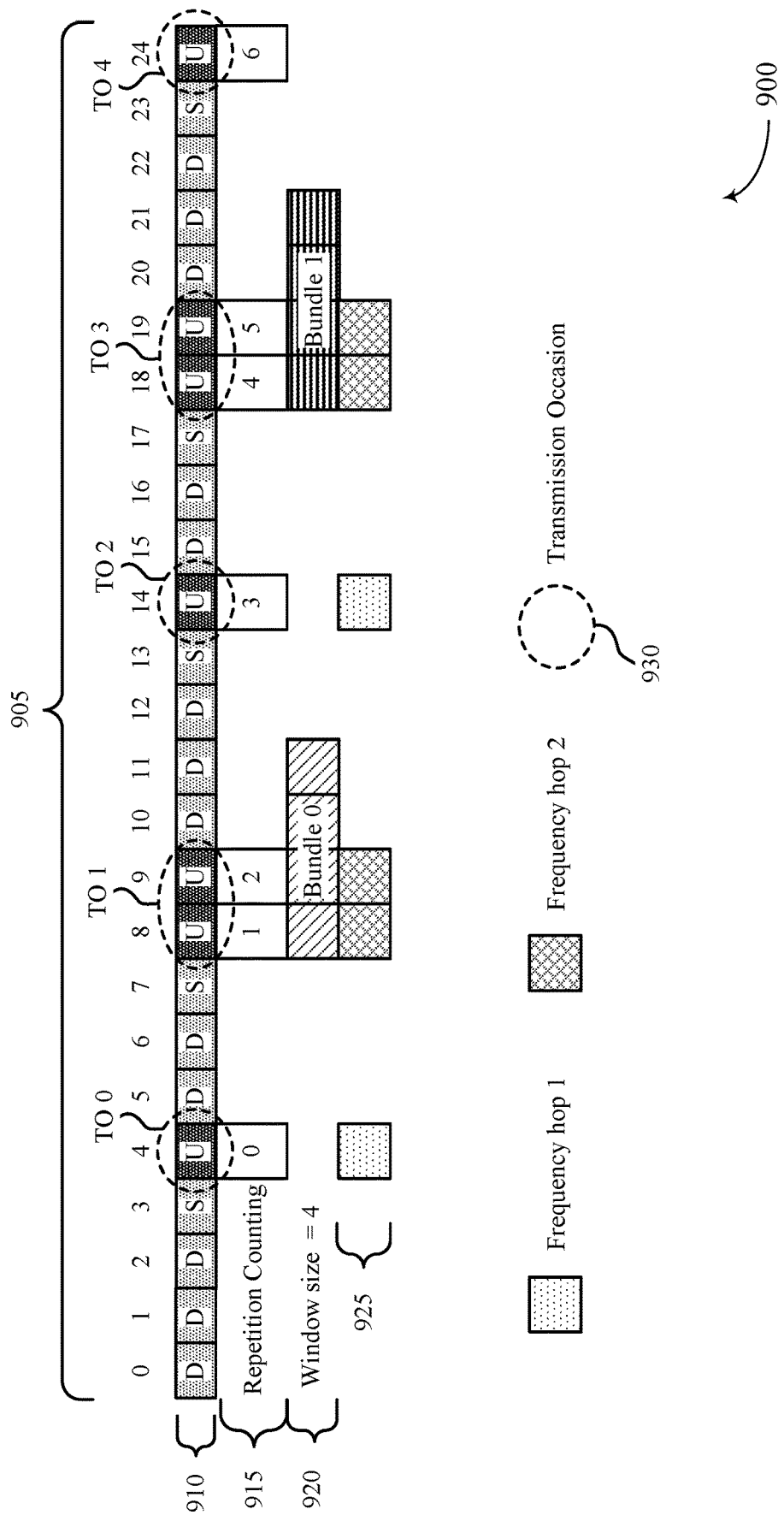
FIG. 9 illustrates an example of a bundling scheme in accordance with aspects of the present disclosure.

FIG. 9 illustrates an example of a bundling scheme 900 in accordance with aspects of the present disclosure. In some examples, bundling scheme 900 may implement or be implemented by some aspects of wireless communications system 100 or 400. In some examples, bundling scheme 900 may additionally, or alternatively, implement or be implemented by some aspects of bundling scheme 200 or 300. For example, bundling scheme 900 may be implemented by a base station 105 and a UE 115, which may represent respective examples of a base station 105 and a UE 115 described with reference to FIGS. 1-7. As described herein, the UE 115 may perform bundling (e.g., DMRS bundling, such as by maintaining phase continuity) for one or more sets of repetitions 915 of an uplink channel transmission to the base station 105.

FIG. 9 illustrates a number of TTIs 905 (e.g., a slot or mini-slot) for transmission of the repetitions 915 of the uplink channel transmission. The TTIs 905 may be associated with a TDD (e.g., unpaired spectrum operation) TTI format pattern 910 as described herein, which may represent a "DDDSUDDSUU" TDD TTI format pattern. It is to be understood that the same examples described with reference to FIG. 9 may apply to other TDD formats (e.g., TDD TTI format patterns) or other transmission formats (e.g., FDD formats, paired spectrum operation) without departing from the scope of the present disclosure. A bundle, which may also be referred to as a bundle interval 920, may be used for transmitting a set of repetitions 915 of the uplink channel transmission with phase continuity. A bundle interval 920 may begin at a starting time and may be defined by a number of consecutive TTIs 905 (e.g., a bundle size) beginning at the starting time. As described herein, a first bundle interval 920 (e.g., Bundle 0) may start from a first available uplink TTI 905 (e.g., TTI 4) or flexible TTI 905 scheduled for transmission of a first or initial repetition 915 of the uplink channel transmission that meets one or more phase continuity conditions, for example, as described with reference to FIG. 8. For example, a first bundle interval 920 (e.g., Bundle 0) may begin at TTI 8, based on Bundle 0 including TTIs 8 and 9 (e.g., that satisfy the one or more phase continuity rules). Similarly, a second bundle interval (e.g., Bundle 1) may begin at TTI 18, based on Bundle 1 including TTIs 18 and 19 (e.g., that satisfy the one or more phase continuity rules).

In such cases, frequency hops 925 for repetitions 915 of the uplink channel may be determined based on an index of an associated transmission occasion 930 (e.g., may be independent of bundling). For example, one or more transmission occasions 930 may be defined, where each transmission occasion 930 may have a corresponding index. Each repetition 915 of the uplink channel in a bundle interval 920 may belong to a same transmission occasion 930, while each repetition 915 of the uplink channel outside of a bundle interval 920 may have its own transmission occasion 930. For example, a first transmission occasion 930 (e.g., TO 0) may include a first repetition 915 in TTI 4, where the first repetition 915 may not be bundled with any other repetitions 915 (e.g., may be outside of a bundle interval 920). The first repetition 915 of the first transmission occasion 930 may, for example, fail to satisfy one or more phase continuity conditions for bundling (e.g., within a bundle interval 920) because the first repetition 915 may be scheduled for transmission in TTI 905 that is outside of a threshold number of TTIs 905 from another repetition 915 (e.g., if a bundle interval 920 were to include the first repetition 915, the first repetition 915 would be the only repetition 915 within the bundle interval 920).

A second transmission occasion 930 (e.g., TO 1) may include second and third repetitions 915 in TTIs 8 and 9, respectively, where the second and third repetitions 915 may be bundled together in Bundle 0. For example, TTIs 8 and 9 (e.g., for transmission of the second and third repetitions 915) may include repetitions 915 that satisfy one or more phase continuity conditions (e.g., may be consecutive transmissions), and therefore the second and third repetitions 915 may be bundled together in Bundle 0 (e.g., a first bundle interval 920).

A frequency hop 925 for each repetition may be based on a corresponding transmission occasion index. For example, frequency hop 1 may apply to all even indexes and frequency hop 2 may apply to all odd indexes, or vice versa. In such cases, frequency hop 1 may apply to 0 (e.g., an even or zero index) and the corresponding first repetition 915 and frequency hop 2 may apply to 1 (e.g., an odd index) and the corresponding second and third repetitions 915. Similarly, frequency hop 1 may apply to 2 and TO 4, and frequency hop 2 may apply to 3.

Figure 10:
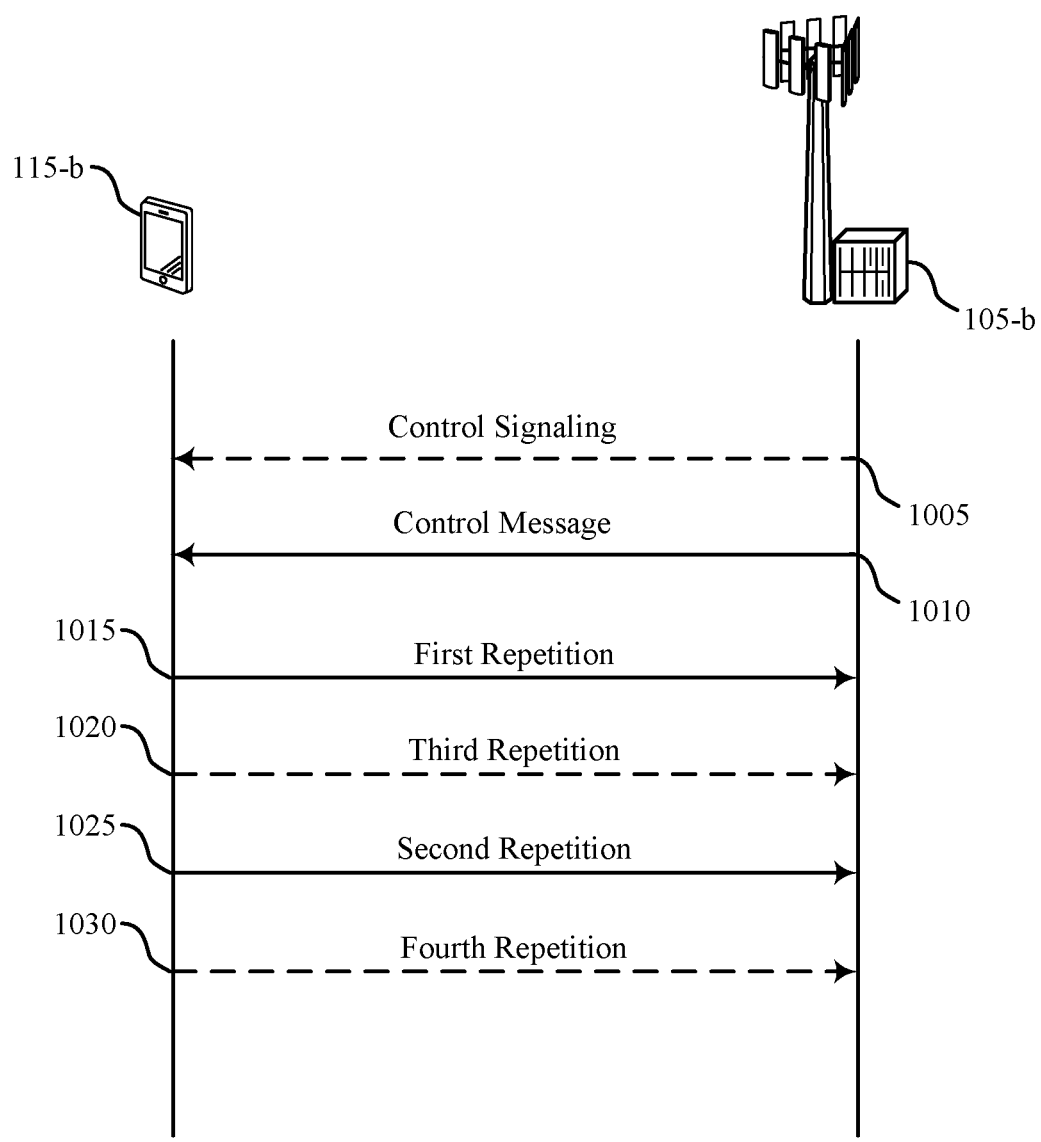
FIG. 10 illustrates an example of a process flow in accordance with aspects of the present disclosure.

FIG. 10 illustrates an example of a process flow 1000 in accordance with aspects of the present disclosure. In some examples, process flow 1000 may implement or be implemented by some aspects of wireless communications system 100 or 400. In some examples, process flow 1000 may additionally, or alternatively, implement or be implemented by some aspects of bundling schemes 200, 300, 500, 600, or 700. For example, process flow 1000 may be implemented by a base station 105-*b* and a UE 115-*b*, which may represent respective examples of a base station 105 and a UE 115 described with reference to FIGS. 1-7. As described herein, UE 115-*b* may perform bundling (e.g., DMRS bundling, such as by maintaining phase continuity) for one or more sets of repetitions of an uplink channel transmission to base station 105-*b*.

In the following description of process flow 1000, the operations may be performed in a different order than the order shown, or the operations performed by UE 115-*b* and base station 105-*b* may be performed in different orders or at different times. For example, specific operations may also be left out of process flow 1000, or other operations may be added to process flow 1000. Although UE 115-*b* and base station 105-*b* are shown performing the operations of process flow 1000, some aspects of some operations may also be performed by one or more other wireless devices.

At 1005, in some cases, base station 105-*b* may transmit, to UE 115-*b*, control signaling, such as RRC signaling. The control signaling may indicate a TDD (e.g., unpaired spectrum operation) TTI format pattern or other TTI format as described herein, which UE 115-*b* and base station 105-*b* may use for one or more downlink and/or uplink transmissions (e.g., repetitions of the uplink channel transmission). The TDD TTI format pattern may indicate a pattern of one or more uplink TTIs, one or more downlink TTIs, one or more flexible TTIs, or any combination thereof, over multiple TTIs.

In some cases, the control signaling may define a bundle size applicable to a set of multiple bundle intervals. As described herein, the bundle size may define each bundle interval by a number of consecutive TTIs following a starting time of the respective bundle interval. In some cases, the control signaling may indicate a bundle interval configuration that indicates each bundle interval of a set of multiple bundle intervals includes at least one uplink TTI, at least one flexible TTI, or both. In some cases, the control signaling may indicate a bundle interval configuration that indicates each bundle interval of a set of multiple bundle intervals includes at least one uplink TTI, at least one flexible TTI, or both, for repetitions of the uplink channel that satisfy one or more phase continuity conditions.

At 1010, base station 105-*b* may transmit, to UE 115-*b*, a control message configuring UE 115-*b* to transmit multiple repetitions of an uplink channel transmission (e.g., an uplink channel, such as a PUSCH or PUCCH). In some cases, the control message may indicate or define the bundle size as described herein. The control message may indicate a number of the multiple repetitions, and in some cases, UE 115-*b* may use the indicated number of repetitions to determine the bundle size (e.g., based on an equation). In some cases, the control message may include an indication of a value of a first frequency hop and an offset, where a second frequency hop may be based on the first frequency hop and the offset. In some other cases, the control message may include an indication of a value of a first frequency hop and a value of a second frequency hop.

At 1015, UE 115-*b* may transmit, to base station 105-*b*, a first repetition of the multiple repetitions of the uplink channel transmission in a first available TTI of a first bundle interval of the set of bundle intervals. In some cases, a starting time of the first bundle interval may be a first TTI available for transmission of an uplink channel repetition or a first TTI available for transmission of an uplink channel repetition that satisfies the one or more phase continuity conditions. In some cases, the TDD TTI format pattern may indicate that the starting time of the first bundle interval is a flexible TTI that is useable as an uplink TTI. UE 115-*b* may transmit the first repetition at a first frequency hop (e.g., a first frequency location or resource, such as an RB) of a set of multiple frequency hops. In some cases, the first frequency hop may correspond to a first index of the first bundle interval or a first transmission occasion as described herein.

At 1020, in some cases, UE 115-*b* may transmit, to base station 105-*b*, a third repetition of the multiple repetitions of the uplink channel transmission. The third repetition may be transmitted in the first bundle interval and may have phase continuity with the first repetition, for example, based on being transmitted in a same bundle interval. In some cases, the third repetition may be transmitted at the first frequency hop (e.g., based on an index of the first bundle interval or first transmission occasion, based on having phase continuity with the first repetition, or both).

At 1025, UE 115-*b* may transmit, to base station 105-*b*, a second repetition of the multiple repetitions of the uplink channel transmission. In some cases, UE 115-*b* may transmit the second repetition in the first bundle interval. In some other cases, UE 115-*b* may transmit the second repetition in a first available TTI of a second bundle interval of the set of bundle intervals. As described herein, a starting time of the second bundle interval may be a next TTI available for transmission of an uplink channel repetition that occurs after an end of a preceding bundle interval of the set of bundle intervals or a next TTI available for transmissions of repetitions of an uplink channel repetition that satisfies the one or more phase continuity conditions, that occurs after an end of a preceding bundle interval of the set of bundle intervals. In some cases, the TDD TTI format pattern may indicate that the starting time of the second bundle interval is a flexible TTI that is useable as an uplink TTI (e.g., is an available TTI). UE 115-*b* may transmit the second repetition at a second frequency hop (e.g., a second frequency location or resource, such as an RB) of the set of frequency hops.

In a first example, UE 115-*b* may transmit the second repetition in the second bundle interval at the second frequency hop, where the second frequency hop may correspond to a second index of the second bundle interval or a second transmission occasion as described herein. Consecutive indexes of the bundle intervals may correspond to bundle intervals having an available (e.g., uplink or flexible) TTI in the TDD TTI format pattern or may correspond to each consecutive bundle interval (e.g., with or without an available uplink TTI).

In a second example, UE 115-*b* may transmit the second repetition in the first bundle interval at the second frequency hop, where the second repetition may not have phase continuity with the first repetition. For example, UE 115-*b* may transmit the second repetition without phase continuity with the first repetition based on one or more phase continuity rules not being satisfied.

At 1030, in some cases, UE 115-*b* may transmit, to base station 105-*b*, a fourth repetition of the multiple repetitions of the uplink channel transmission. The fourth transmission may be transmitted in the second bundle interval. In some cases, the fourth repetition may have phase continuity with the second repetition (e.g., based on being transmitted in a same bundle interval). In some cases, the fourth repetition may be transmitted at the second frequency hop (e.g., based on an index of the second bundle interval or the second transmission occasion). In some cases, the fourth repetition may be transmitted at the first frequency hop (e.g., based on being transmitted after a preceding repetition at the second hop and in a different bundle interval or transmission occasion).

Figure 11:
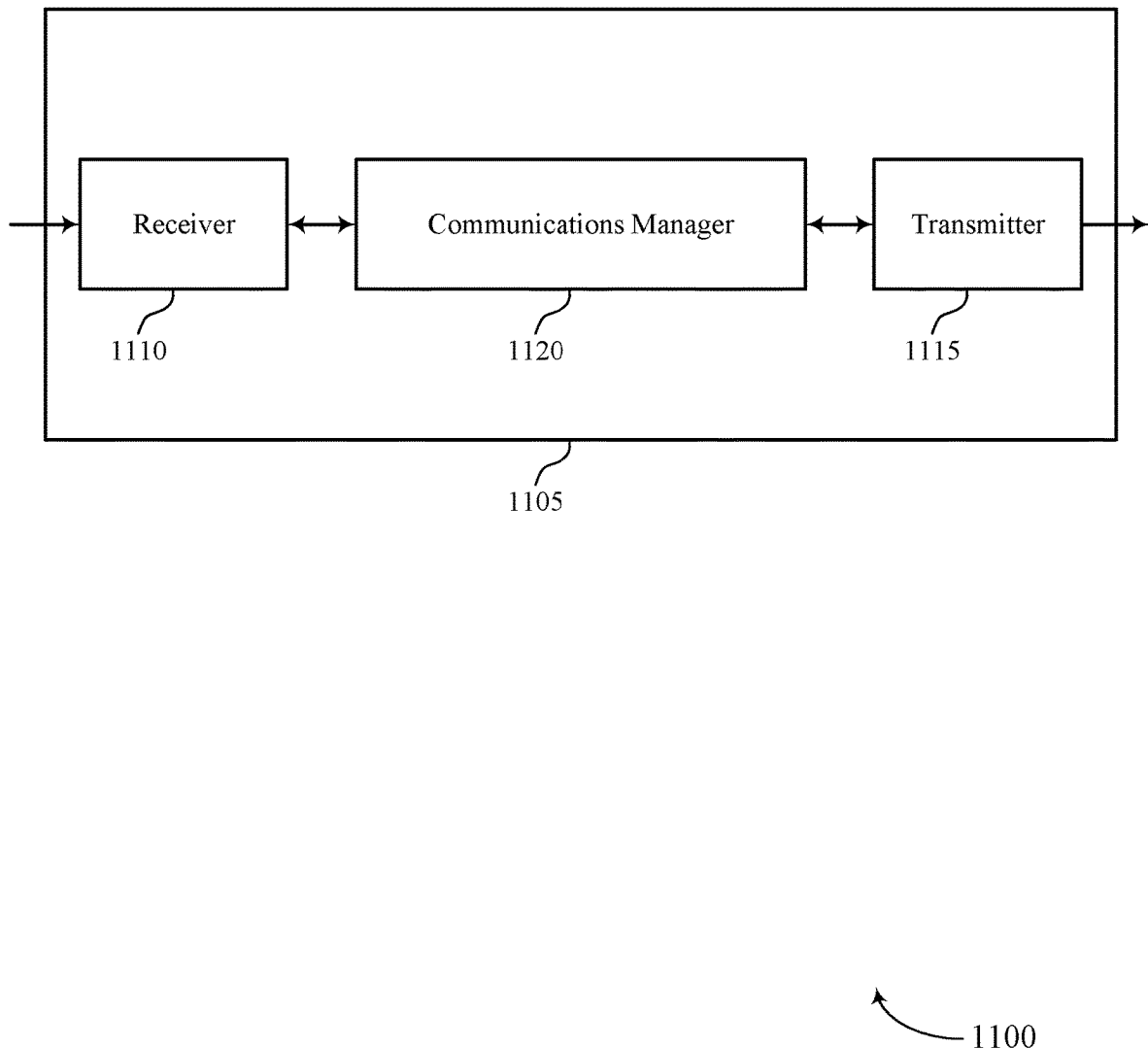
FIGS. 11 and 12 show block diagrams of devices in accordance with aspects of the present disclosure.

FIG. 11 shows a block diagram 1100 of a device 1105 in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to DMRS bundling and frequency hopping). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to DMRS bundling and frequency hopping). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of DMRS bundling and frequency hopping as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving, from a base station, a control message configuring the UE to transmit a set of multiple repetitions of an uplink channel. The communications manager 1120 may be configured as or otherwise support a means for transmitting a first repetition of the set of multiple repetitions of the uplink channel in a first available TTI of a first bundle interval of a set of multiple bundle intervals. The communications manager 1120 may be configured as or otherwise support a means for transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1120 may support wireless communication at a UE in accordance with examples as disclosed herein. For example, the communications manager 1120 may be configured as or otherwise support a means for receiving, from a base station, a control message configuring the UE to transmit a set of multiple repetitions of an uplink channel. The communications manager 1120 may be configured as or otherwise support a means for transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The communications manager 1120 may be configured as or otherwise support a means for transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1120 may support wireless communication at a UE in accordance with examples as disclosed herein. For example, the communications manager 1120 may be configured as or otherwise support a means for receiving, from a base station, a control message configuring the UE to transmit a set of multiple repetitions of an uplink channel. The communications manager 1120 may be configured as or otherwise support a means for transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The communications manager 1120 may be configured as or otherwise support a means for transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1120 may support wireless communication at a UE in accordance with examples as disclosed herein. For example, the communications manager 1120 may be configured as or otherwise support a means for receiving, from a base station, a control message configuring the UE to transmit a set of multiple repetitions of an uplink channel. The communications manager 1120 may be configured as or otherwise support a means for transmitting, at a first frequency hop of a set of multiple frequency hops, a first repetition of the set of multiple repetitions of the uplink channel in a first bundle interval of a set of multiple bundle intervals. The communications manager 1120 may be configured as or otherwise support a means for transmitting, in the first bundle interval at a second frequency hop of the set of multiple frequency hops, a second repetition of the set of multiple repetitions of the uplink channel that does not have phase continuity with the first repetition.

The actions performed by the communications manager 1120, among other examples herein, may be implemented to realize one or more potential advantages. For example, communications manager 1120 may increase available battery power and communication quality at a wireless device (e.g., a UE 115) by bundling repetitions of an uplink channel transmission and/or using frequency hopping for transmission of one or more of the repetitions. The increase in communication quality may result in increased link performance and decreased overhead based on bundling repetitions of an uplink channel transmission and/or using frequency hopping for transmission of one or more of the repetitions. Accordingly, communications manager 1120 may save power and increase battery life at a wireless device (e.g., a UE 115) by strategically increasing a quality of communications at a wireless device (e.g., a UE 115).

Figure 12:
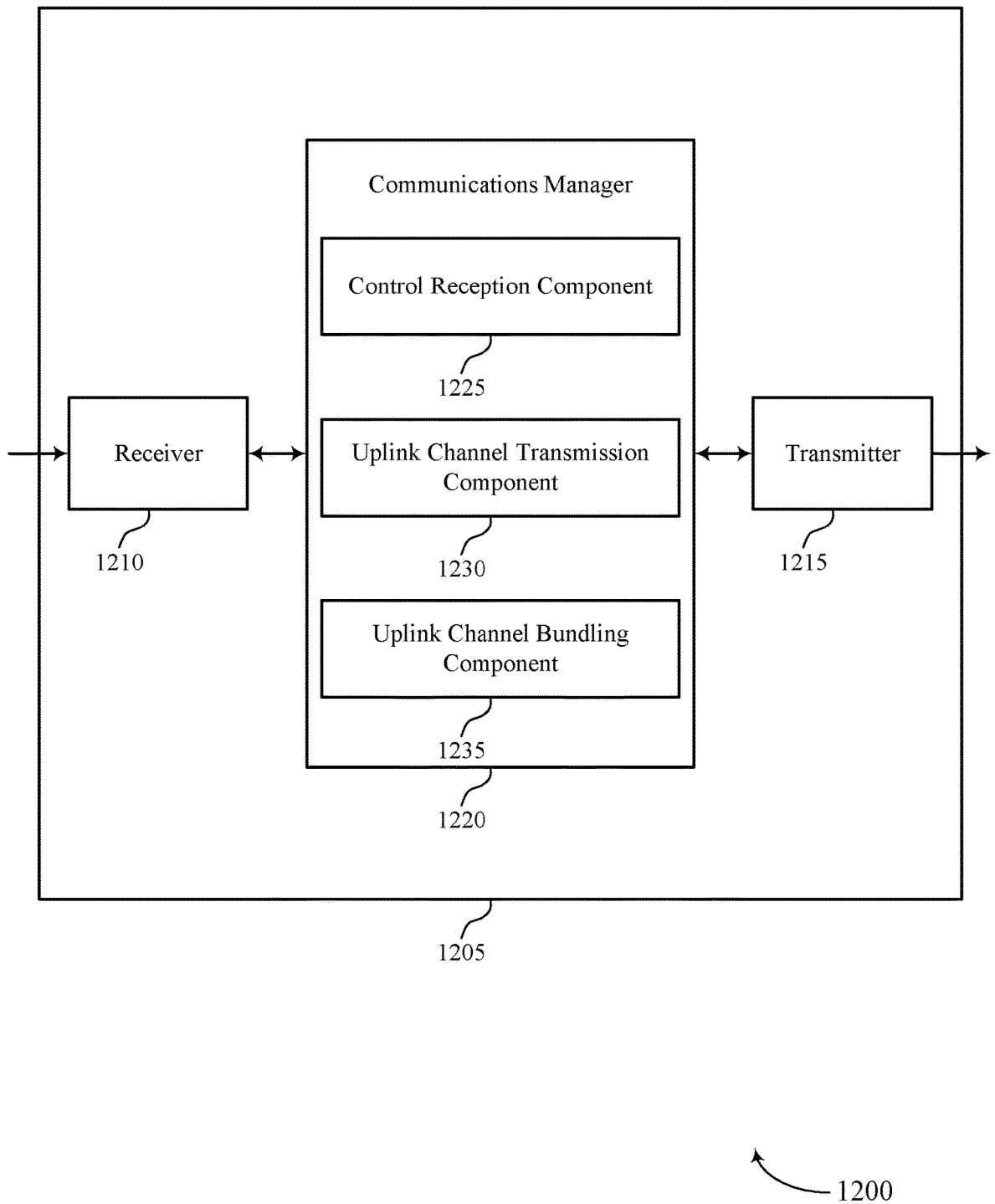

FIG. 12 shows a block diagram 1200 of a device 1205 in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to DMRS bundling and frequency hopping). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to DMRS bundling and frequency hopping). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of DMRS bundling and frequency hopping as described herein. For example, the communications manager 1220 may include a control reception component 1225, an uplink channel transmission component 1230, an uplink channel bundling component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The control reception component 1225 may be configured as or otherwise support a means for receiving, from a base station, a control message configuring the UE to transmit a set of multiple repetitions of an uplink channel. The uplink channel transmission component 1230 may be configured as or otherwise support a means for transmitting a first repetition of the set of multiple repetitions of the uplink channel in a first available TTI of a first bundle interval of a set of multiple bundle intervals. The uplink channel transmission component 1230 may be configured as or otherwise support a means for transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1220 may support wireless communication at a UE in accordance with examples as disclosed herein. The control reception component 1225 may be configured as or otherwise support a means for receiving, from a base station, a control message configuring the UE to transmit a set of multiple repetitions of an uplink channel. The uplink channel transmission component 1230 may be configured as or otherwise support a means for transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The uplink channel transmission component 1230 may be configured as or otherwise support a means for transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1220 may support wireless communication at a UE in accordance with examples as disclosed herein. The control reception component 1225 may be configured as or otherwise support a means for receiving, from a base station, a control message configuring the UE to transmit a set of multiple repetitions of an uplink channel. The uplink channel transmission component 1230 may be configured as or otherwise support a means for transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The uplink channel transmission component 1230 may be configured as or otherwise support a means for transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1220 may support wireless communication at a UE in accordance with examples as disclosed herein. The control reception component 1225 may be configured as or otherwise support a means for receiving, from a base station, a control message configuring the UE to transmit a set of multiple repetitions of an uplink channel. The uplink channel transmission component 1230 may be configured as or otherwise support a means for transmitting, at a first frequency hop of a set of multiple frequency hops, a first repetition of the set of multiple repetitions of the uplink channel in a first bundle interval of a set of multiple bundle intervals. The uplink channel transmission component 1230 may be configured as or otherwise support a means for transmitting, in the first bundle interval at a second frequency hop of the set of multiple frequency hops, a second repetition of the set of multiple repetitions of the uplink channel that does not have phase continuity with the first repetition.

A processor of a wireless device (e.g., controlling the receiver 1210, the transmitter 1215, or the transceiver 1415 as described with reference to FIG. 14) may increase available battery power and communication quality. The increased communication quality may increase available battery power and throughput (e.g., via implementation of system components described with reference to FIG. 13) compared to other systems and techniques, for example, that do not support bundling repetitions of an uplink channel transmission and/or using frequency hopping for transmission of one or more of the repetitions. Further, the processor of the wireless device may identify one or more aspects of a bundling interval configuration to transmit repetitions of the uplink channel transmission, which may result in increased communication quality, as well as save power and increase battery life at the wireless device (e.g., by strategically supporting increased communication quality by performing bundling and/or frequency hopping), among other benefits.

Figure 13:
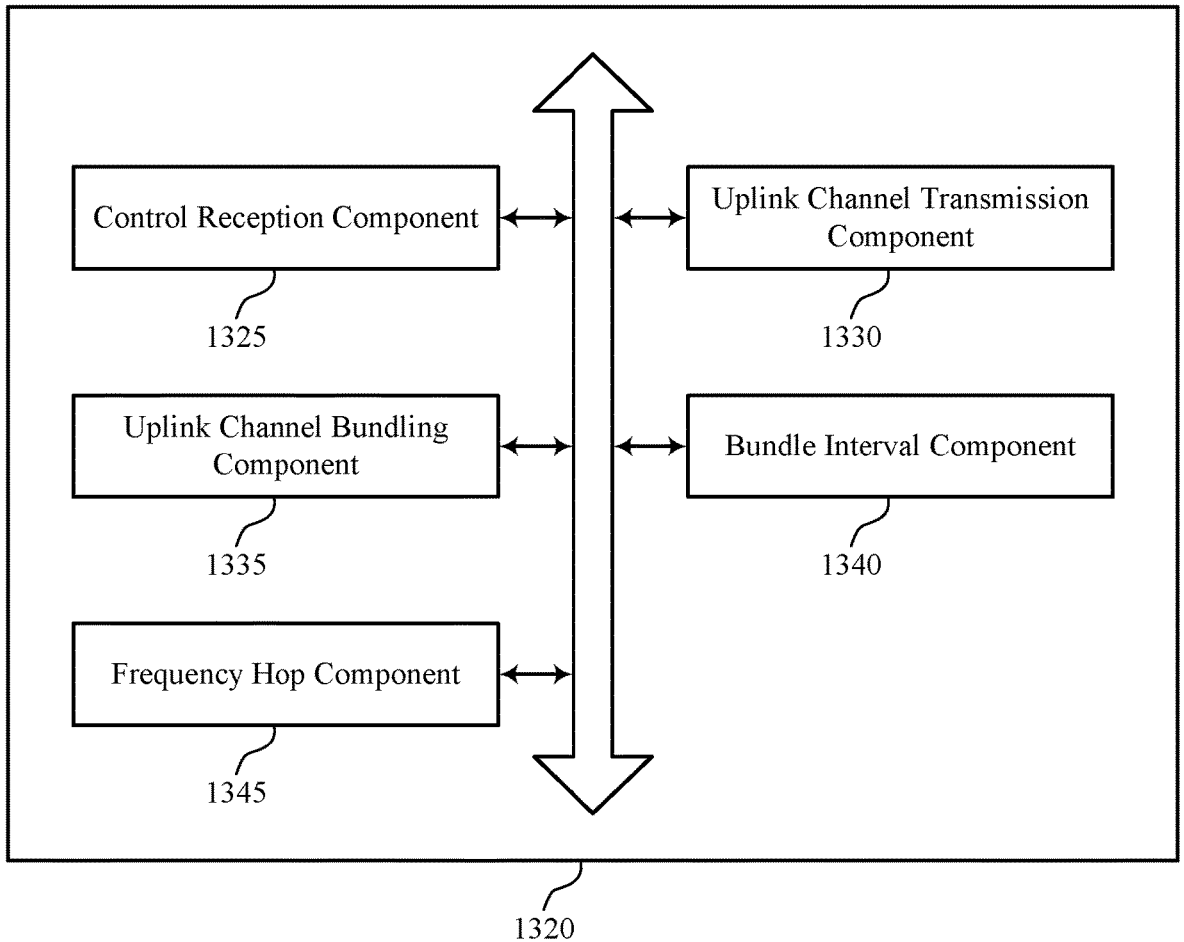
FIG. 13 shows a block diagram of a communications manager in accordance with aspects of the present disclosure.

FIG. 13 shows a block diagram 1300 of a communications manager 1320 in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of DMRS bundling and frequency hopping as described herein. For example, the communications manager 1320 may include a control reception component 1325, an uplink channel transmission component 1330, an uplink channel bundling component 1335, a bundle interval component 1340, a frequency hop component 1345, or any combination thereof. Each of these components may communicate, directly or indirectly, with one another (e.g., via one or more buses).

The communications manager 1320 may support wireless communication at a UE in accordance with examples as disclosed herein. The control reception component 1325 may be configured as or otherwise support a means for receiving, from a base station, a control message configuring the UE to transmit a set of multiple repetitions of an uplink channel. The uplink channel transmission component 1330 may be configured as or otherwise support a means for transmitting a first repetition of the set of multiple repetitions of the uplink channel in a first available TTI of a first bundle interval of a set of multiple bundle intervals. In some examples, the uplink channel transmission component 1330 may be configured as or otherwise support a means for transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available uplink TTI that occurs after an end of a respective preceding bundle interval of the set of multiple bundle intervals.

In some examples, the respective starting time of the respective available TTI is a starting time of a next available TTI that occurs after an end of a preceding bundle interval of the set of multiple bundle intervals.

In some examples, the control reception component 1325 may be configured as or otherwise support a means for receiving RRC signaling or DCI indicating a TTI format configuration, where the respective available TTI of each bundle interval of the set of multiple bundle intervals are identified based on the TTI format configuration.

In some examples, each bundle interval of the set of multiple bundle intervals includes two or more TTIs over which transmission of multiple repetitions of the uplink channel satisfy a phase continuity condition. In some examples, the phase continuity condition is satisfied based on the transmission of multiple repetitions of the uplink channel having a same modulation order, a same frequency allocation, a same transmission power level, a same transmit beam, or any combination thereof. In some examples, the phase continuity condition is satisfied based on transmission of multiple repetitions of the uplink channel having a non-zero time gap between the multiple repetitions of the uplink channel, where downlink reception is not scheduled in the non-zero time gap, or the phase continuity condition may satisfied based on the transmission of multiple repetitions of the uplink channel having a zero time gap between the multiple repetitions of the uplink channel.

In some examples, the control reception component 1325 may be configured as or otherwise support a means for receiving a control message indicating an unpaired spectrum operation TTI format pattern when operating in an unpaired spectrum operation mode, where the unpaired spectrum operation TTI format pattern indicates a pattern of one or more uplink TTIs, one or more downlink TTIs, or both, over a set of multiple TTIs. In some examples, the control reception component 1325 may be configured as or otherwise support a means for receiving a control message indicating a paired spectrum operation mode for communications with the base station, where the paired spectrum operation mode is associated with one or more uplink frequency ranges, one or more downlink transmission frequency ranges, or both, over a set of multiple TTIs.

In some examples, the uplink channel bundling component 1335 may be configured as or otherwise support a means for transmitting, in the first bundle interval, a third repetition of the set of multiple repetitions of the uplink channel having phase continuity with the first repetition. In some examples, the uplink channel bundling component 1335 may be configured as or otherwise support a means for transmitting, in the second bundle interval, a fourth repetition of the set of multiple repetitions of the uplink channel having phase continuity with the second repetition.

In some examples, the bundle interval component 1340 may be configured as or otherwise support a means for receiving control signaling defining a bundle size applicable to each of the set of multiple bundle intervals as a number of consecutive TTIs per bundle interval. In some examples, a bundle size applicable to each of the set of multiple bundle intervals is based on a quantity of the set of multiple repetitions of the uplink channel, the bundle size defining a number of consecutive TTIs per bundle interval.

In some examples, a starting time of the first available TTI is a starting time of an uplink TTI that is scheduled for transmitting the first repetition. In some examples, a starting time of the first available TTI is a starting time of a flexible TTI that is configured for transmitting the first repetition. In some examples, a starting time of the second bundle interval is a starting time of a flexible TTI or an uplink TTI that is configured for transmitting a repetition of the set of multiple repetitions of the uplink channel. In some examples, the uplink channel is a physical uplink shared channel or a physical uplink control channel. In some examples, the respective starting times of the respective available TTIs are each a starting time of a next available TTI that occurs after a last available TTI of a preceding bundle interval of the set of multiple bundle intervals.

Additionally, or alternatively, the communications manager 1320 may support wireless communication at a UE in accordance with examples as disclosed herein. In some examples, the control reception component 1325 may be configured as or otherwise support a means for receiving, from a base station, a control message configuring the UE to transmit a set of multiple repetitions of an uplink channel. In some examples, the uplink channel transmission component 1330 may be configured as or otherwise support a means for transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. In some examples, the uplink channel transmission component 1330 may be configured as or otherwise support a means for transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

In some examples, the uplink channel bundling component 1335 may be configured as or otherwise support a means for transmitting, in the first bundle interval and at the first frequency hop, a third repetition of the set of multiple repetitions of the uplink channel having with phase continuity with the first repetition. In some examples, the uplink channel bundling component 1335 may be configured as or otherwise support a means for transmitting, in the second bundle interval and at the second frequency hop, a fourth repetition of the set of multiple repetitions of the uplink channel having phase continuity with the second repetition.

In some examples, the bundle interval component 1340 may be configured as or otherwise support a means for indexing each bundle interval of the set of multiple bundle intervals that includes at least one uplink TTI, at least one flexible TTI configured for transmitting the uplink channel, or both. In some examples, the bundle interval component 1340 may be configured as or otherwise support a means for identifying a bundle interval configuration that indicates each bundle interval of the set of multiple bundle intervals has a bundle size defined by a number of consecutive TTIs after a starting time of a respective bundle interval of the set of multiple bundle intervals. In some examples, the bundle interval component 1340 may be configured as or otherwise support a means for receiving control signaling indicating the bundle interval configuration, the bundle size, or both.

In some examples, the frequency hop component 1345 may be configured as or otherwise support a means for receiving, via the control message, an indication of a value of the first frequency hop and an offset, where the second frequency hop is based on the value of the first frequency hop and the offset. In some examples, the frequency hop component 1345 may be configured as or otherwise support a means for receiving, via the control message, a first indication of a value of the first frequency hop, a second indication of a second value of the second frequency hop, or both.

In some examples, the bundle interval component 1340 may be configured as or otherwise support a means for receiving a control message indicating a TDD TTI format pattern when operating in a TDD mode, the TDD TTI format pattern indicating a pattern of one or more uplink TTIs and one or more downlink TTIs for a set of multiple TTIs, where the first bundle interval has a starting time corresponding to an available uplink TTI in the TDD TTI format pattern. In some examples, the starting time of the first bundle interval is a starting time of an uplink TTI that is scheduled for transmitting the first repetition. In some examples, the starting time of the first bundle interval is a starting time of a flexible TTI that is configured for transmitting the first repetition.

In some examples, the bundle interval component 1340 may be configured as or otherwise support a means for receiving a control message indicating an FDD mode for communications with the base station, where the FDD mode is associated with one or more uplink frequency ranges, one or more downlink transmission frequency ranges, or both, over a set of multiple TTIs, where the first bundle interval has a starting time corresponding to an available uplink TTI in the FDD mode. In some examples, the bundle interval component 1340 may be configured as or otherwise support a means for indexing each bundle interval of the set of multiple bundle intervals. In some examples, the uplink channel is a physical uplink shared channel or a physical uplink control channel.

Additionally, or alternatively, the communications manager 1320 may support wireless communication at a UE in accordance with examples as disclosed herein. In some examples, the control reception component 1325 may be configured as or otherwise support a means for receiving, from a base station, a control message configuring the UE to transmit a set of multiple repetitions of an uplink channel. In some examples, the uplink channel transmission component 1330 may be configured as or otherwise support a means for transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. In some examples, the uplink channel transmission component 1330 may be configured as or otherwise support a means for transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

In some examples, the frequency hop component 1345 may be configured as or otherwise support a means for transmitting the second repetition in the second bundle interval at the first frequency hop based on the first transmission occasion index being one of an odd index or an even index. In some examples, the frequency hop component 1345 may be configured as or otherwise support a means for transmitting the second repetition in the second bundle interval at the second frequency hop based on the first index being one of an odd index or an even index and the second index being an other of the odd index or the even index.

In some examples, multiple repetitions of the set of multiple repetitions of the uplink channel in a same bundle interval belong to a same transmission occasion. In some examples, multiple repetitions of the set of multiple repetitions of the uplink channel associated with different bundle intervals are associated with different transmission occasions.

In some examples, the uplink channel transmission component 1330 may be configured as or otherwise support a means for transmitting, at the first frequency hop or at the second frequency hop, a third repetition of the set of multiple repetitions of the uplink channel via a transmission occasion corresponding to a third transmission occasion index, the transmission occasion occurring outside of transmission occasions associated with the set of multiple bundle intervals.

In some examples, uplink TTIs corresponding to the third transmission occasion index do not satisfy a phase continuity condition. In some examples, each of the first bundle interval and the second bundle interval includes a respective two or more uplink TTIs over which transmission of multiple repetitions of the uplink channel satisfy a phase continuity condition. In some examples, the phase continuity condition is satisfied based on the transmission of multiple repetitions of the uplink channel having a same modulation order, a same frequency allocation, a same transmission power level, a same transmit beam, or any combination thereof. In some examples, the phase continuity condition is satisfied based on transmission of multiple repetitions of the uplink channel being consecutive transmissions. In some examples, the phase continuity condition is satisfied based on the transmission of multiple repetitions of the uplink channel having a non-zero time gap between the multiple repetitions of the uplink channel, where downlink reception is not scheduled in the non-zero time gap.

Additionally, or alternatively, the communications manager 1320 may support wireless communication at a UE in accordance with examples as disclosed herein. In some examples, the control reception component 1325 may be configured as or otherwise support a means for receiving, from a base station, a control message configuring the UE to transmit a set of multiple repetitions of an uplink channel. In some examples, the uplink channel transmission component 1330 may be configured as or otherwise support a means for transmitting, at a first frequency hop of a set of multiple frequency hops, a first repetition of the set of multiple repetitions of the uplink channel in a first bundle interval of a set of multiple bundle intervals. In some examples, the uplink channel transmission component 1330 may be configured as or otherwise support a means for transmitting, in the first bundle interval at a second frequency hop of the set of multiple frequency hops, a second repetition of the set of multiple repetitions of the uplink channel that does not have phase continuity with the first repetition.

In some examples, the uplink channel bundling component 1335 may be configured as or otherwise support a means for transmitting, in the first bundle interval and at the first frequency hop, a third repetition of the set of multiple repetitions of the uplink channel having phase continuity with the first repetition. In some examples, the uplink channel transmission component 1330 may be configured as or otherwise support a means for transmitting a fourth repetition of the set of multiple repetitions of the uplink channel in a second bundle interval of the set of multiple bundle intervals and at the first frequency hop.

In some examples, the frequency hop component 1345 may be configured as or otherwise support a means for receiving, via the control message, an indication of a value of the first frequency hop and an offset, where the second frequency hop is based on the value of the first frequency hop and the offset. In some examples, to support transmitting the second repetition, the uplink channel bundling component 1335 may be configured as or otherwise support a means for transmitting the second repetition without phase continuity with the first repetition based on one or more phase continuity rules not being satisfied for transmission of the second repetition and the first repetition with phase continuity. In some examples, the uplink channel is a physical uplink shared channel or a physical uplink control channel.

Additionally, or alternatively, the communications manager 1320 may support wireless communication at a UE in accordance with examples as disclosed herein. In some examples, the control reception component 1325 may be configured as or otherwise support a means for receiving, from a base station, a control message configuring the UE to transmit a set of multiple repetitions of an uplink channel over a carrier. In some examples, the uplink channel transmission component 1330 may be configured as or otherwise support a means for transmitting, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals. In some examples, the uplink channel transmission component 1330 may be configured as or otherwise support a means for transmitting, based on the control message and the correspondence between the set of multiple bundle intervals and the uplink resources of the carrier, a second repetition of the set of multiple repetitions of the uplink channel in a second bundle interval of the set of multiple bundle intervals.

In some examples, the control reception component 1325 may be configured as or otherwise support a means for receiving RRC signaling or DCI indicating a TTI format configuration, where the first bundle interval and second bundle interval may be identified based on the TTI format configuration. In some examples, each bundle interval of the set of multiple bundle intervals includes two or more TTIs over which transmission of multiple repetitions of the uplink channel satisfy a phase continuity condition.

Figure 14:
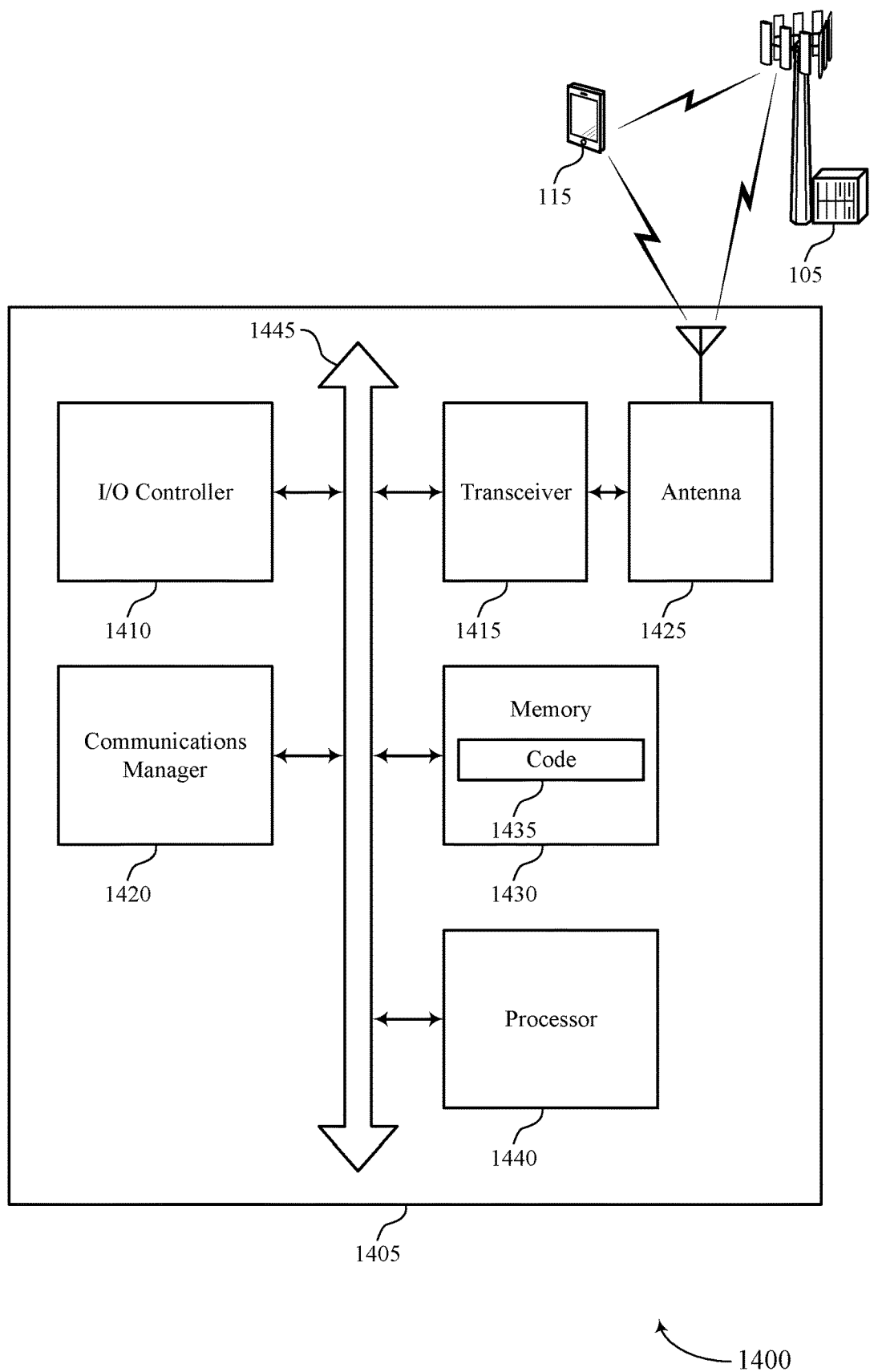
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting DMRS bundling and frequency hopping). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving, from a base station, a control message configuring the UE to transmit a set of multiple repetitions of an uplink channel. The communications manager 1420 may be configured as or otherwise support a means for transmitting a first repetition of the set of multiple repetitions of the uplink channel in a first available TTI of a first bundle interval of a set of multiple bundle intervals. The communications manager 1420 may be configured as or otherwise support a means for transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1420 may support wireless communication at a UE in accordance with examples as disclosed herein. For example, the communications manager 1420 may be configured as or otherwise support a means for receiving, from a base station, a control message configuring the UE to transmit a set of multiple repetitions of an uplink channel. The communications manager 1420 may be configured as or otherwise support a means for transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The communications manager 1420 may be configured as or otherwise support a means for transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1420 may support wireless communication at a UE in accordance with examples as disclosed herein. For example, the communications manager 1420 may be configured as or otherwise support a means for receiving, from a base station, a control message configuring the UE to transmit a set of multiple repetitions of an uplink channel. The communications manager 1420 may be configured as or otherwise support a means for transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The communications manager 1420 may be configured as or otherwise support a means for transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1420 may support wireless communication at a UE in accordance with examples as disclosed herein. For example, the communications manager 1420 may be configured as or otherwise support a means for receiving, from a base station, a control message configuring the UE to transmit a set of multiple repetitions of an uplink channel. The communications manager 1420 may be configured as or otherwise support a means for transmitting, at a first frequency hop of a set of multiple frequency hops, a first repetition of the set of multiple repetitions of the uplink channel in a first bundle interval of a set of multiple bundle intervals. The communications manager 1420 may be configured as or otherwise support a means for transmitting, in the first bundle interval at a second frequency hop of the set of multiple frequency hops, a second repetition of the set of multiple repetitions of the uplink channel that does not have phase continuity with the first repetition.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of DMRS bundling and frequency hopping as described herein, or the processor 1440 and the memory 1430 may be otherwise configured to perform or support such operations.

Figure 15:
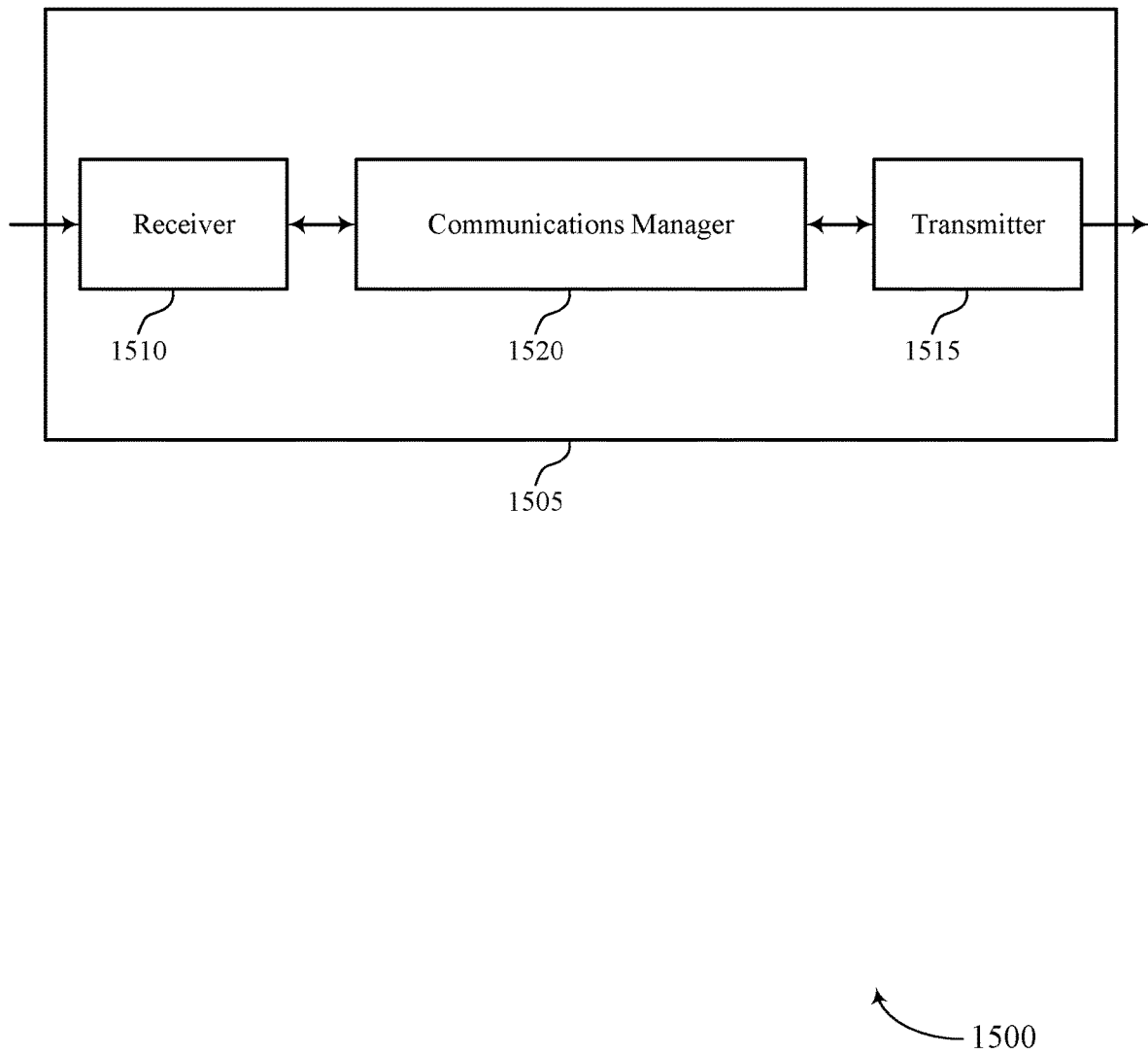
FIGS. 15 and 16 show block diagrams of devices in accordance with aspects of the present disclosure.

FIG. 15 shows a block diagram 1500 of a device 1505 in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to DMRS bundling and frequency hopping). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to DMRS bundling and frequency hopping). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of DMRS bundling and frequency hopping as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE, a control message configuring the UE to transmit a set of multiple repetitions of an uplink channel. The communications manager 1520 may be configured as or otherwise support a means for receiving a first repetition of the set of multiple repetitions of the uplink channel in a first available TTI of a first bundle interval of a set of multiple bundle intervals. The communications manager 1520 may be configured as or otherwise support a means for receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1520 may support wireless communication at a base station in accordance with examples as disclosed herein. For example, the communications manager 1520 may be configured as or otherwise support a means for transmitting, to a UE, a control message configuring the UE to transmit a set of multiple repetitions of an uplink channel. The communications manager 1520 may be configured as or otherwise support a means for receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The communications manager 1520 may be configured as or otherwise support a means for receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1520 may support wireless communication at a base station in accordance with examples as disclosed herein. For example, the communications manager 1520 may be configured as or otherwise support a means for transmitting, to a UE, a control message configuring the UE to transmit a set of multiple repetitions of an uplink channel. The communications manager 1520 may be configured as or otherwise support a means for receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The communications manager 1520 may be configured as or otherwise support a means for receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1520 may support wireless communication at a base station in accordance with examples as disclosed herein. For example, the communications manager 1520 may be configured as or otherwise support a means for transmitting, to a UE, a control message configuring the UE to transmit a set of multiple repetitions of an uplink channel. The communications manager 1520 may be configured as or otherwise support a means for receiving, at a first frequency hop of a set of multiple frequency hops, a first repetition of the set of multiple repetitions of the uplink channel in a first bundle interval of a set of multiple bundle intervals. The communications manager 1520 may be configured as or otherwise support a means for receiving, in the first bundle interval at a second frequency hop of the set of multiple frequency hops, a second repetition of the set of multiple repetitions of the uplink channel that does not have phase continuity with the first repetition.

Figure 16:
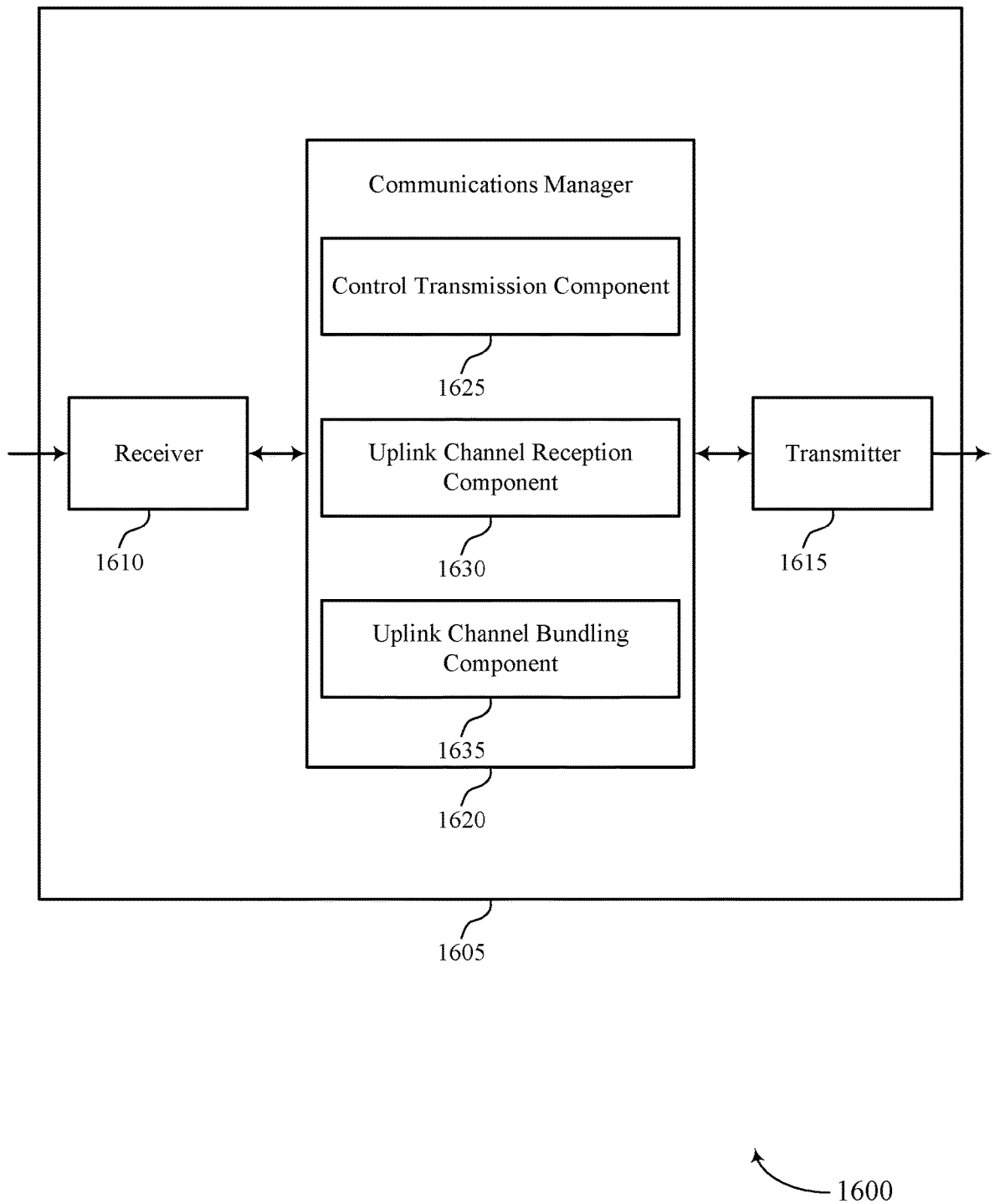

FIG. 16 shows a block diagram 1600 of a device 1605 in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to DMRS bundling and frequency hopping). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to DMRS bundling and frequency hopping). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of DMRS bundling and frequency hopping as described herein. For example, the communications manager 1620 may include a control transmission component 1625, an uplink channel reception component 1630, an uplink channel bundling component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The control transmission component 1625 may be configured as or otherwise support a means for transmitting, to a UE, a control message configuring the UE to transmit a set of multiple repetitions of an uplink channel. The uplink channel reception component 1630 may be configured as or otherwise support a means for receiving a first repetition of the set of multiple repetitions of the uplink channel in a first available TTI of a first bundle interval of a set of multiple bundle intervals. The uplink channel reception component 1630 may be configured as or otherwise support a means for receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1620 may support wireless communication at a base station in accordance with examples as disclosed herein. The control transmission component 1625 may be configured as or otherwise support a means for transmitting, to a UE, a control message configuring the UE to transmit a set of multiple repetitions of an uplink channel. The uplink channel reception component 1630 may be configured as or otherwise support a means for receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The uplink channel reception component 1630 may be configured as or otherwise support a means for receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1620 may support wireless communication at a base station in accordance with examples as disclosed herein. The control transmission component 1625 may be configured as or otherwise support a means for transmitting, to a UE, a control message configuring the UE to transmit a set of multiple repetitions of an uplink channel. The uplink channel reception component 1630 may be configured as or otherwise support a means for receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The uplink channel reception component 1630 may be configured as or otherwise support a means for receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1620 may support wireless communication at a base station in accordance with examples as disclosed herein. The control transmission component 1625 may be configured as or otherwise support a means for transmitting, to a UE, a control message configuring the UE to transmit a set of multiple repetitions of an uplink channel. The uplink channel reception component 1630 may be configured as or otherwise support a means for receiving, at a first frequency hop of a set of multiple frequency hops, a first repetition of the set of multiple repetitions of the uplink channel in a first bundle interval of a set of multiple bundle intervals. The uplink channel reception component 1630 may be configured as or otherwise support a means for receiving, in the first bundle interval at a second frequency hop of the set of multiple frequency hops, a second repetition of the set of multiple repetitions of the uplink channel that does not have phase continuity with the first repetition.

Figure 17:
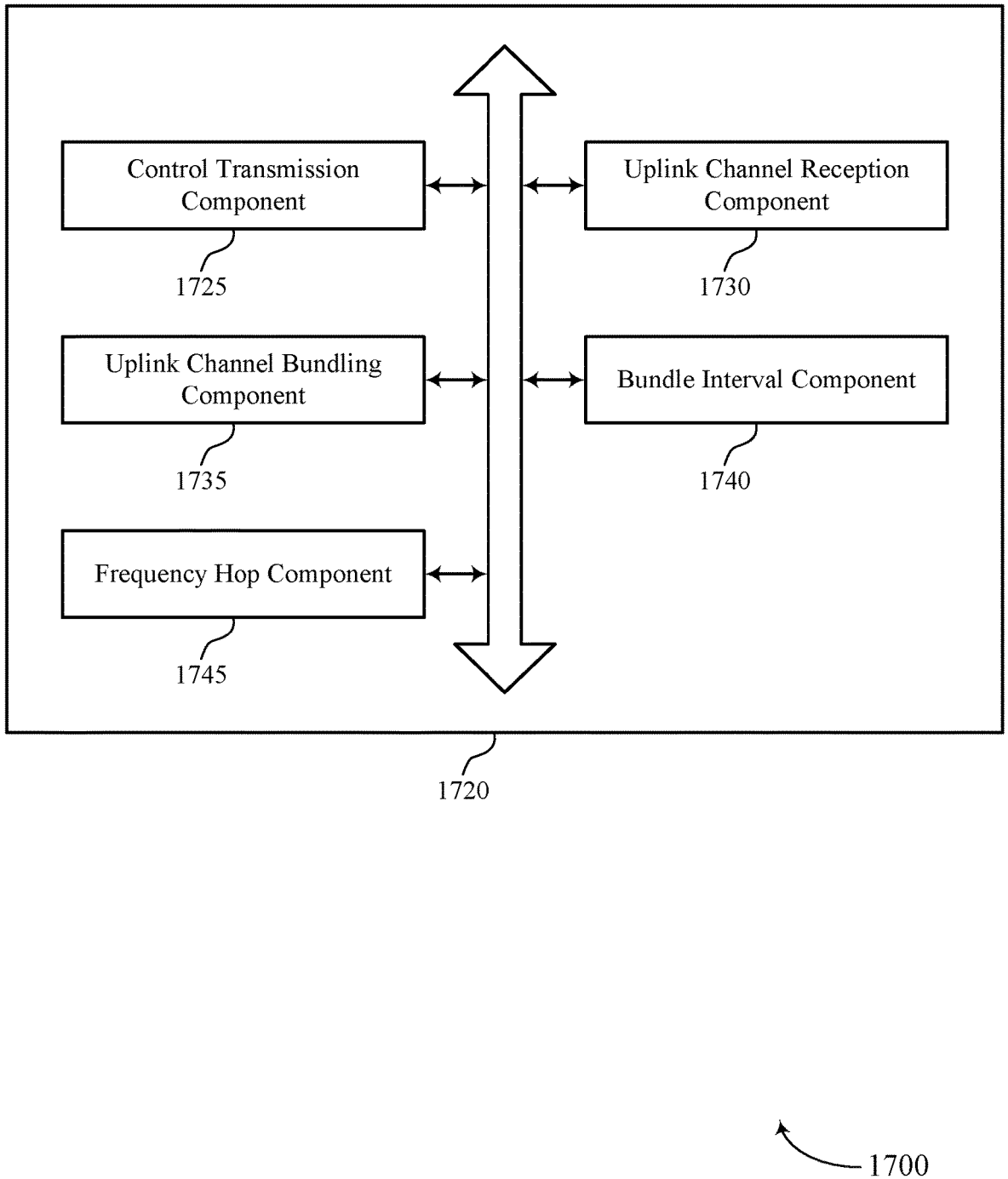
FIG. 17 shows a block diagram of a communications manager in accordance with aspects of the present disclosure.

FIG. 17 shows a block diagram 1700 of a communications manager 1720 in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of DMRS bundling and frequency hopping as described herein. For example, the communications manager 1720 may include a control transmission component 1725, an uplink channel reception component 1730, an uplink channel bundling component 1735, a bundle interval component 1740, a frequency hop component 1745, or any combination thereof. Each of these components may communicate, directly or indirectly, with one another (e.g., via one or more buses).

The communications manager 1720 may support wireless communication at a base station in accordance with examples as disclosed herein. The control transmission component 1725 may be configured as or otherwise support a means for transmitting, to a UE, a control message configuring the UE to transmit a set of multiple repetitions of an uplink channel. The uplink channel reception component 1730 may be configured as or otherwise support a means for receiving a first repetition of the set of multiple repetitions of the uplink channel in a first available TTI of a first bundle interval of a set of multiple bundle intervals. In some examples, the uplink channel reception component 1730 may be configured as or otherwise support a means for receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

In some examples, the respective starting time of the respective available TTI is a starting time of a next available TTI that occurs after an end of a preceding bundle interval of the set of multiple bundle intervals. In some examples, the control transmission component 1725 may be configured as or otherwise support a means for transmitting RRC signaling or DCI indicating a TTI format configuration, where the respective available TTI of each bundle interval of the set of multiple bundle intervals are identified based on the TTI format configuration.

In some examples, each bundle interval of the set of multiple bundle intervals includes two or more TTIs over which transmission of multiple repetitions of the uplink channel satisfy a phase continuity condition. In some examples, the phase continuity condition is satisfied based on the transmission of multiple repetitions of the uplink channel repetitions of the uplink channel having a same modulation order, a same frequency allocation, a same transmission power level, a same transmit beam, or any combination thereof. In some examples, the phase continuity condition is satisfied based on the two or more repetitions of the uplink channel uplink transmissions time intervals being associated with consecutive TTIs. In some examples, the phase continuity condition is satisfied based on transmission of multiple repetitions of the uplink channel having a non-zero time gap between the multiple repetitions of the uplink channel, where downlink reception is not scheduled in the non-zero time gap, or the phase continuity condition may satisfied based on the transmission of multiple repetitions of the uplink channel having a zero time gap between the multiple repetitions of the uplink channel.

In some examples, the control transmission component 1725 may be configured as or otherwise support a means for transmitting a control message indicating an unpaired spectrum operation TTI format pattern when operating in an unpaired spectrum operation mode, where the unpaired spectrum operation TTI format pattern indicates a pattern of one or more uplink TTIs, one or more downlink TTIs, or both, over a set of multiple TTIs. In some examples, the control transmission component 1725 may be configured as or otherwise support a means for transmitting a control message indicating a paired spectrum operation mode for communications with the base station, where the paired spectrum operation mode is associated with one or more uplink frequency ranges, one or more downlink transmission frequency ranges, or both, over a set of multiple TTIs.

In some examples, the uplink channel bundling component 1735 may be configured as or otherwise support a means for receiving, in the first bundle interval, a third repetition of the set of multiple repetitions of the uplink channel having phase continuity with the first repetition. In some examples, the uplink channel bundling component 1735 may be configured as or otherwise support a means for receiving, in the second bundle interval, a fourth repetition of the set of multiple repetitions of the uplink channel having phase continuity with the second repetition.

In some examples, the bundle interval component 1740 may be configured as or otherwise support a means for transmitting control signaling defining a bundle size applicable to each of the set of multiple bundle intervals as a number of consecutive TTIs per bundle interval.

In some examples, a bundle size applicable to each of the set of multiple bundle intervals is based on a quantity of the set of multiple repetitions of the uplink channel, the bundle size defining a number of consecutive TTIs per bundle interval. In some examples, a starting time of the first available TTI is a starting time of an uplink TTI that is scheduled for transmitting the first repetition. In some examples, a starting time of the first available TTI is a starting time of a flexible TTI that is configured for transmitting the first repetition. In some examples, the starting time of a second bundle interval is a starting time of a flexible TTI or an uplink TTI that is configured for transmitting a repetition of the set of multiple repetitions of the uplink channel. In some examples, the uplink channel is a physical uplink shared channel or a physical uplink control channel. In some examples, the respective starting times of the respective available TTIs are each a starting time of a next available TTI that occurs after a last available TTI of a preceding bundle interval of the set of multiple bundle intervals.

Additionally, or alternatively, the communications manager 1720 may support wireless communication at a base station in accordance with examples as disclosed herein. In some examples, the control transmission component 1725 may be configured as or otherwise support a means for transmitting, to a UE, a control message configuring the UE to transmit a set of multiple repetitions of an uplink channel. In some examples, the uplink channel reception component 1730 may be configured as or otherwise support a means for receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. In some examples, the uplink channel reception component 1730 may be configured as or otherwise support a means for receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

In some examples, the uplink channel bundling component 1735 may be configured as or otherwise support a means for receiving, in the first bundle interval and at the first frequency hop, a third repetition of the set of multiple repetitions of the uplink channel having with phase continuity with the first repetition. In some examples, the uplink channel bundling component 1735 may be configured as or otherwise support a means for receiving, in the second bundle interval and at the second frequency hop, a fourth repetition of the set of multiple repetitions of the uplink channel having phase continuity with the second repetition.

In some examples, the bundle interval component 1740 may be configured as or otherwise support a means for indexing each bundle interval of the set of multiple bundle intervals that includes at least one uplink TTI, at least one flexible TTI configured for transmitting the uplink channel, or both.

In some examples, the frequency hop component 1745 may be configured as or otherwise support a means for transmitting, via the control message, an indication of a value of the first frequency hop and an offset, where the second frequency hop is based on the value of the first frequency hop and the offset. In some examples, the frequency hop component 1745 may be configured as or otherwise support a means for transmitting, via the control message, a first indication of a value of the first frequency hop, a second indication of a second value of the second frequency hop, or both.

In some examples, the bundle interval component 1740 may be configured as or otherwise support a means for transmitting a control message indicating a TDD TTI format pattern when operating in a TDD mode, the TDD TTI format pattern indicating a pattern of one or more uplink TTIs and one or more downlink TTIs for a set of multiple TTIs, where the first bundle interval has a starting time corresponding to an available uplink TTI in the TDD TTI format pattern.

In some examples, the starting time of the first bundle interval is a starting time of an uplink TTI that is scheduled for transmitting the first repetition. In some examples, the starting time of the first bundle interval is a starting time of a flexible TTI that is configured for transmitting the first repetition.

In some examples, the bundle interval component 1740 may be configured as or otherwise support a means for receiving a control message indicating an FDD mode for communications with the base station, where the FDD mode is associated with one or more uplink frequency ranges, one or more downlink transmission frequency ranges, or both, over a set of multiple TTIs, where the first bundle interval has a starting time corresponding to an available uplink TTI in the FDD mode.

In some examples, the bundle interval component 1740 may be configured as or otherwise support a means for indexing each bundle interval of the set of multiple bundle intervals. In some examples, the uplink channel is a physical uplink shared channel or a physical uplink control channel.

Additionally, or alternatively, the communications manager 1720 may support wireless communication at a base station in accordance with examples as disclosed herein. In some examples, the control transmission component 1725 may be configured as or otherwise support a means for transmitting, to a UE, a control message configuring the UE to transmit a set of multiple repetitions of an uplink channel. In some examples, the uplink channel reception component 1730 may be configured as or otherwise support a means for receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. In some examples, the uplink channel reception component 1730 may be configured as or otherwise support a means for receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

In some examples, the frequency hop component 1745 may be configured as or otherwise support a means for receiving the second repetition in the second bundle interval at the first frequency hop based on the first transmission occasion index being one of an odd index or an even index. In some examples, the frequency hop component 1745 may be configured as or otherwise support a means for receiving the second repetition in the second bundle interval at the second frequency hop based on the first index being one of an odd index or an even index and the second index being an other of the odd index or the even index.

In some examples, multiple repetitions of the set of multiple repetitions of the uplink channel in a same bundle interval belong to a same transmission occasion. In some examples, multiple repetitions of the set of multiple repetitions of the uplink channel associated with different bundle intervals are associated with different transmission occasions.

In some examples, the uplink channel reception component 1730 may be configured as or otherwise support a means for receiving, at the first frequency hop or at the second frequency hop, a third repetition of the set of multiple repetitions of the uplink channel via a transmission occasion corresponding to a third transmission occasion index, the transmission occasion occurring outside of transmission occasions associated with the set of multiple bundle intervals.

In some examples, uplink TTIs corresponding to the third transmission occasion index do not satisfy a phase continuity condition. In some examples, each of the first bundle interval and the second bundle interval includes a respective two or more uplink TTIs over which transmission of multiple repetitions of the uplink channel satisfy a phase continuity condition. In some examples, the phase continuity condition is satisfied based on the transmission of multiple repetitions of the uplink channel having a same modulation order, a same frequency allocation, a same transmission power level, a same transmit beam, or any combination thereof. In some examples, the phase continuity condition is satisfied based on transmission of multiple repetitions of the uplink channel being consecutive transmissions. In some examples, the phase continuity condition is satisfied based on transmission of multiple repetitions of the uplink channel having a non-zero time gap between the multiple repetitions of the uplink channel, where downlink reception is not scheduled in the non-zero time gap.

Additionally, or alternatively, the communications manager 1720 may support wireless communication at a base station in accordance with examples as disclosed herein. In some examples, the control transmission component 1725 may be configured as or otherwise support a means for transmitting, to a UE, a control message configuring the UE to transmit a set of multiple repetitions of an uplink channel. In some examples, the uplink channel reception component 1730 may be configured as or otherwise support a means for receiving, at a first frequency hop of a set of multiple frequency hops, a first repetition of the set of multiple repetitions of the uplink channel in a first bundle interval of a set of multiple bundle intervals. In some examples, the uplink channel reception component 1730 may be configured as or otherwise support a means for receiving, in the first bundle interval at a second frequency hop of the set of multiple frequency hops, a second repetition of the set of multiple repetitions of the uplink channel that does not have phase continuity with the first repetition.

In some examples, the uplink channel bundling component 1735 may be configured as or otherwise support a means for receiving, in the first bundle interval and at the first frequency hop, a third repetition of the set of multiple repetitions of the uplink channel having phase continuity with the first repetition. In some examples, the uplink channel bundling component 1735 may be configured as or otherwise support a means for receiving a fourth repetition of the set of multiple repetitions of the uplink channel in a second bundle interval of the set of multiple bundle intervals and at the first frequency hop.

In some examples, the frequency hop component 1745 may be configured as or otherwise support a means for transmitting, via the control message, an indication of a value of the first frequency hop and an offset, where the second frequency hop is based on the value of the first frequency hop and the offset. In some examples, to support receiving the second repetition, the uplink channel bundling component 1735 may be configured as or otherwise support a means for receiving the second repetition without phase continuity with the first repetition based on one or more phase continuity rules not being satisfied for transmission of the second repetition and the first repetition with phase continuity. In some examples, the uplink channel is a physical uplink shared channel or a physical uplink control channel.

Additionally, or alternatively, the communications manager 1720 may support wireless communication at a base station in accordance with examples as disclosed herein. In some examples, the control transmission component 1725 may be configured as or otherwise support a means for transmitting, to a UE, a control message configuring the UE to transmit a set of multiple repetitions of an uplink channel over a carrier. In some examples, the uplink channel reception component 1730 may be configured as or otherwise support a means for receiving, based on the control message and a correspondence between a set of multiple bundle intervals and uplink resources of the carrier, a first repetition of the set of multiple repetitions of the uplink channel in a first bundle interval of the set of multiple bundle intervals, where each bundle interval of the set of multiple bundle intervals has a starting time corresponding to a next TTI that occurs after an end of a preceding bundle interval of the set of multiple bundle intervals. In some examples, the uplink channel reception component 1730 may be configured as or otherwise support a means for receiving, based on the control message and the correspondence between the set of multiple bundle intervals and the uplink resources of the carrier, a second repetition of the set of multiple repetitions of the uplink channel in a second bundle interval of the set of multiple bundle intervals.

In some examples, the control transmission component 1725 may be configured as or otherwise support a means for transmitting RRC signaling or DCI indicating a TTI format configuration, where the first bundle interval and second bundle interval may be identified based on the TTI format configuration.

In some examples, each bundle interval of the set of multiple bundle intervals includes two or more TTIs over which transmission of multiple repetitions of the uplink channel satisfy a phase continuity condition.

Figure 18:
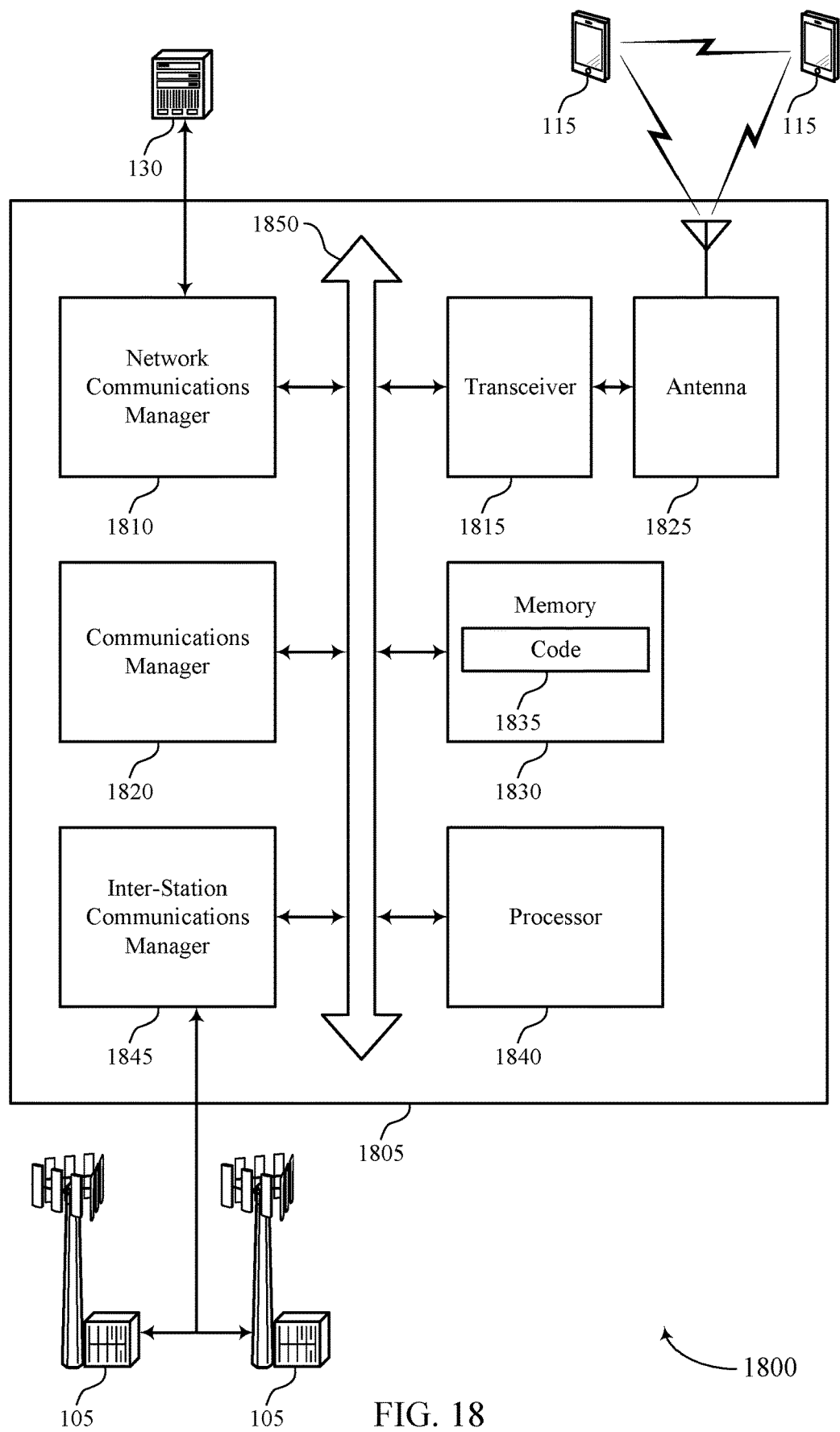
FIG. 18 shows a diagram of a system including a device in accordance with aspects of the present disclosure.

FIG. 18 shows a diagram of a system 1800 including a device 1805 in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting DMRS bundling and frequency hopping). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE, a control message configuring the UE to transmit a set of multiple repetitions of an uplink channel. The communications manager 1820 may be configured as or otherwise support a means for receiving a first repetition of the set of multiple repetitions of the uplink channel in a first available TTI of a first bundle interval of a set of multiple bundle intervals. The communications manager 1820 may be configured as or otherwise support a means for receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the set of multiple bundle intervals.

Additionally, or alternatively, the communications manager 1820 may support wireless communication at a base station in accordance with examples as disclosed herein. For example, the communications manager 1820 may be configured as or otherwise support a means for transmitting, to a UE, a control message configuring the UE to transmit a set of multiple repetitions of an uplink channel. The communications manager 1820 may be configured as or otherwise support a means for receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The communications manager 1820 may be configured as or otherwise support a means for receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval.

Additionally, or alternatively, the communications manager 1820 may support wireless communication at a base station in accordance with examples as disclosed herein. For example, the communications manager 1820 may be configured as or otherwise support a means for transmitting, to a UE, a control message configuring the UE to transmit a set of multiple repetitions of an uplink channel. The communications manager 1820 may be configured as or otherwise support a means for receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The communications manager 1820 may be configured as or otherwise support a means for receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion.

Additionally, or alternatively, the communications manager 1820 may support wireless communication at a base station in accordance with examples as disclosed herein. For example, the communications manager 1820 may be configured as or otherwise support a means for transmitting, to a UE, a control message configuring the UE to transmit a set of multiple repetitions of an uplink channel. The communications manager 1820 may be configured as or otherwise support a means for receiving, at a first frequency hop of a set of multiple frequency hops, a first repetition of the set of multiple repetitions of the uplink channel in a first bundle interval of a set of multiple bundle intervals. The communications manager 1820 may be configured as or otherwise support a means for receiving, in the first bundle interval at a second frequency hop of the set of multiple frequency hops, a second repetition of the set of multiple repetitions of the uplink channel that does not have phase continuity with the first repetition.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of DMRS bundling and frequency hopping as described herein, or the processor 1840 and the memory 1830 may be otherwise configured to perform or support such operations.

Figure 19:
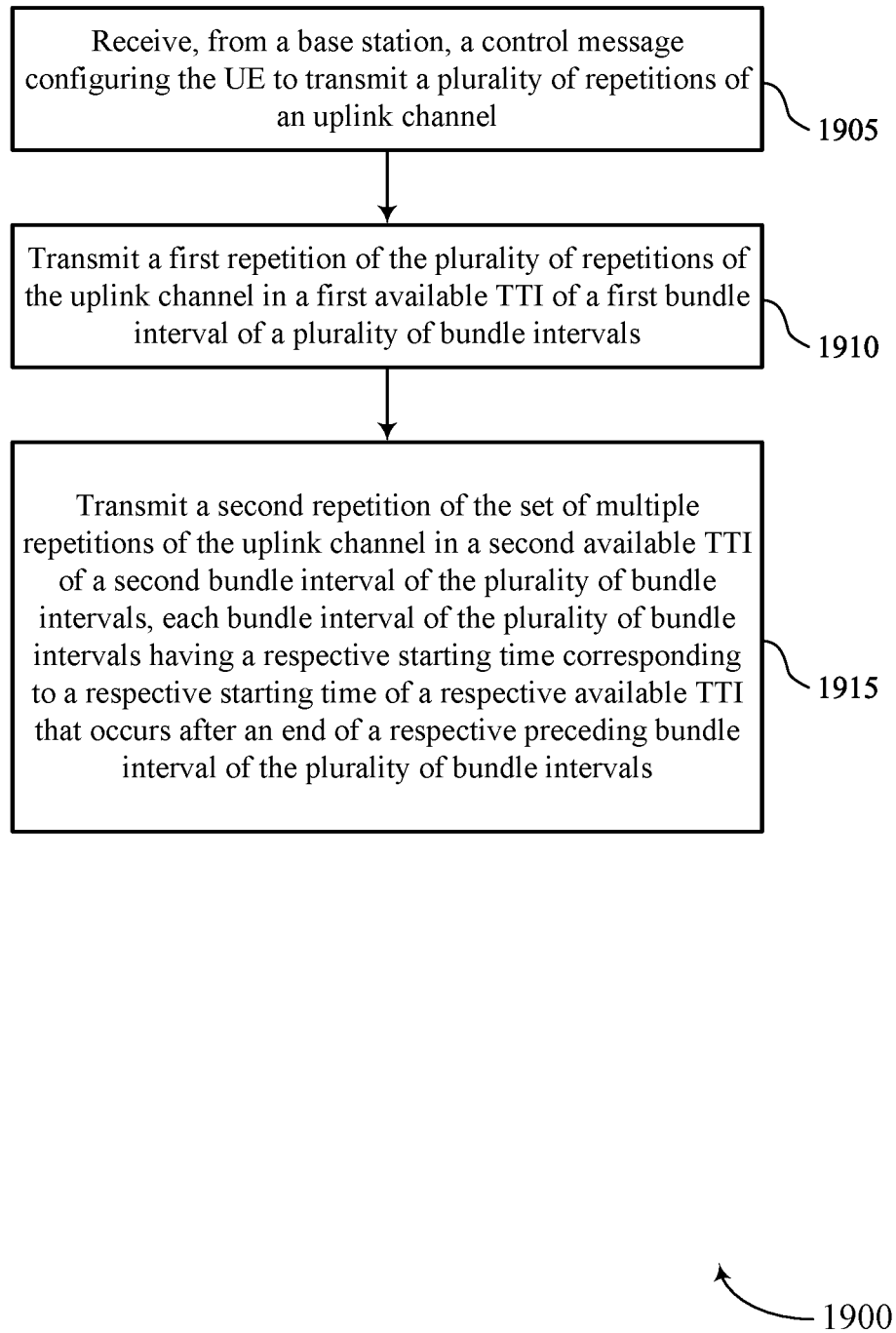
FIGS. 19 through 28 show flowcharts illustrating methods in accordance with aspects of the present disclosure.

FIG. 19 shows a flowchart illustrating a method 1900 in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1905, the method may include receiving, from a base station, a control message configuring the UE to transmit a set of multiple repetitions of an uplink channel. The operations of 1905 may be performed in accordance with examples as disclosed herein. In some examples, aspects of the operations of 1905 may be performed by a control reception component 1325 as described with reference to FIG. 13.

At 1910, the method may include transmitting a first repetition of the set of multiple repetitions of the uplink channel in a first available TTI of a first bundle interval of a set of multiple bundle intervals. The operations of 1910 may be performed in accordance with examples as disclosed herein. In some examples, aspects of the operations of 1910 may be performed by an uplink channel transmission component 1330 as described with reference to FIG. 13.

At 1915, the method may include transmitting a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the plurality of bundle intervals. The operations of 1915 may be performed in accordance with examples as disclosed herein. In some examples, aspects of the operations of 1915 may be performed by an uplink channel transmission component 1330 as described with reference to FIG. 13.

Figure 20:
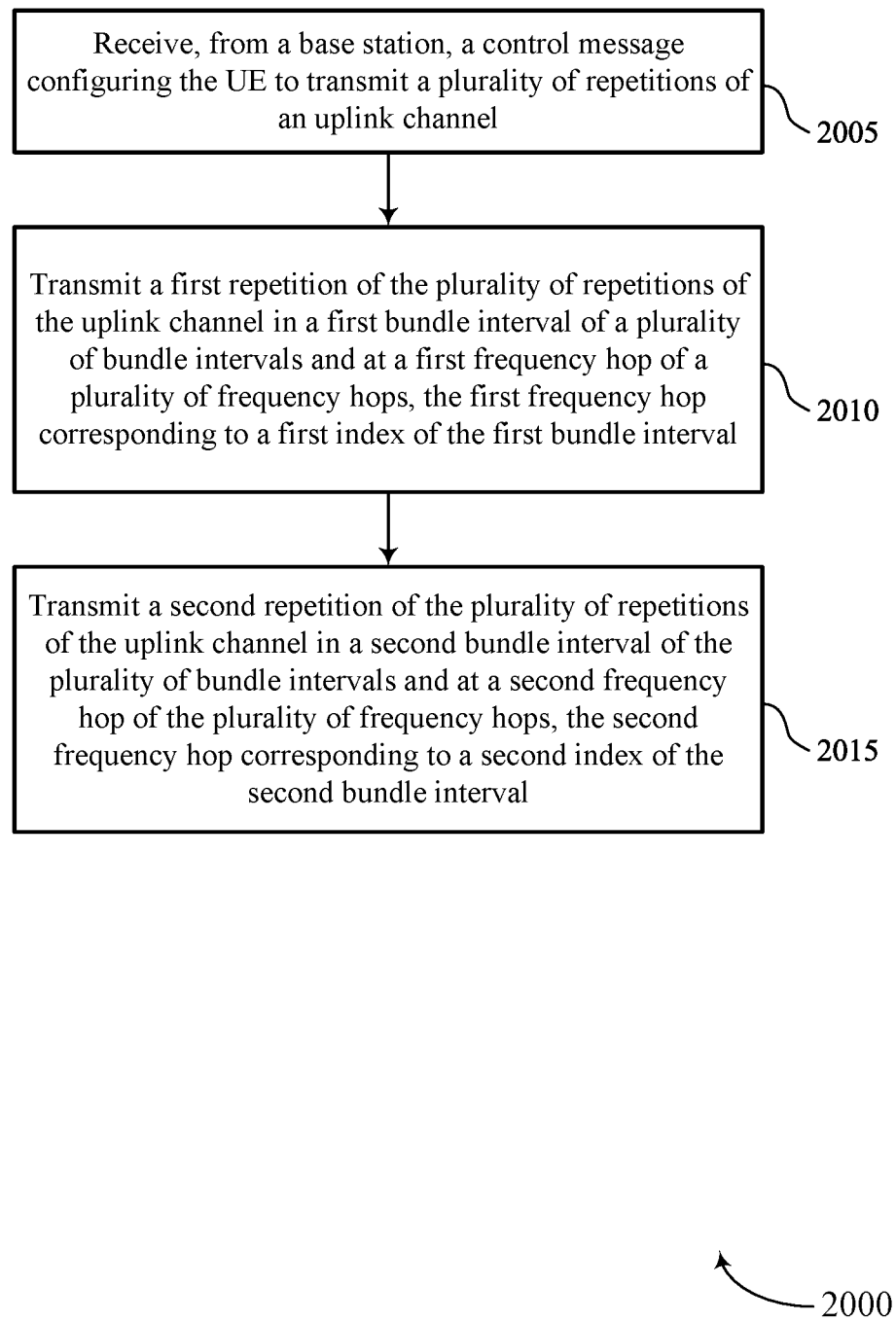

FIG. 20 shows a flowchart illustrating a method 2000 in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2005, the method may include receiving, from a base station, a control message configuring the UE to transmit a set of multiple repetitions of an uplink channel. The operations of 2005 may be performed in accordance with examples as disclosed herein. In some examples, aspects of the operations of 2005 may be performed by a control reception component 1325 as described with reference to FIG. 13.

At 2010, the method may include transmitting a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The operations of 2010 may be performed in accordance with examples as disclosed herein. In some examples, aspects of the operations of 2010 may be performed by an uplink channel transmission component 1330 as described with reference to FIG. 13.

At 2015, the method may include transmitting a second repetition of the set of multiple repetitions of the uplink channel in a second bundle interval of the set of multiple bundle intervals and at a second frequency hop of the set of multiple frequency hops, the second frequency hop corresponding to a second index of the second bundle interval. The operations of 2015 may be performed in accordance with examples as disclosed herein. In some examples, aspects of the operations of 2015 may be performed by an uplink channel transmission component 1330 as described with reference to FIG. 13.

Figure 21:
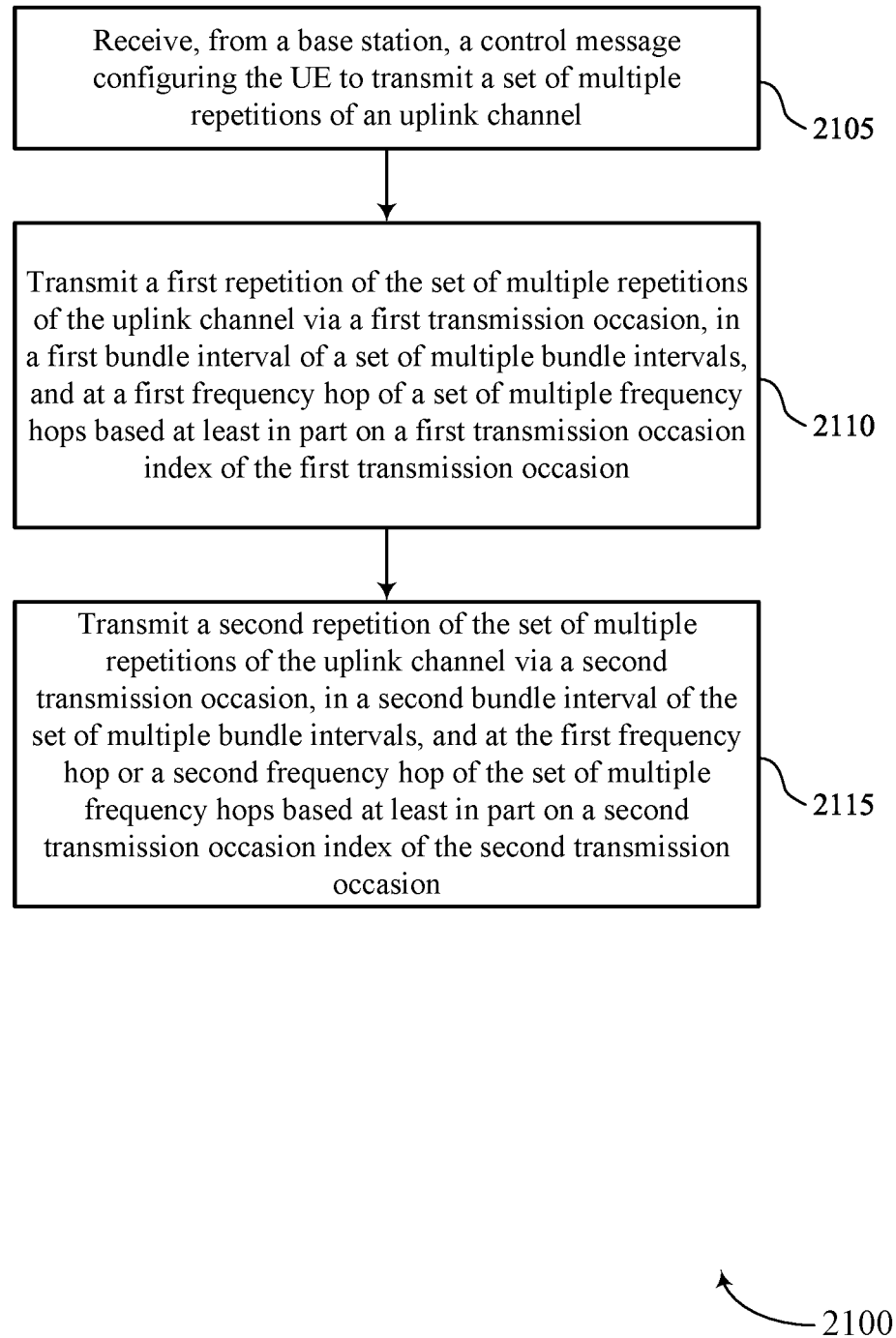

FIG. 21 shows a flowchart illustrating a method 2100 in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2105, the method may include receiving, from a base station, a control message configuring the UE to transmit a set of multiple repetitions of an uplink channel. The operations of 2105 may be performed in accordance with examples as disclosed herein. In some examples, aspects of the operations of 2105 may be performed by a control reception component 1325 as described with reference to FIG. 13.

At 2110, the method may include transmitting a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The operations of 2110 may be performed in accordance with examples as disclosed herein. In some examples, aspects of the operations of 2110 may be performed by an uplink channel transmission component 1330 as described with reference to FIG. 13.

At 2115, the method may include transmitting a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion. The operations of 2115 may be performed in accordance with examples as disclosed herein. In some examples, aspects of the operations of 2115 may be performed by an uplink channel transmission component 1330 as described with reference to FIG. 13.

Figure 22:
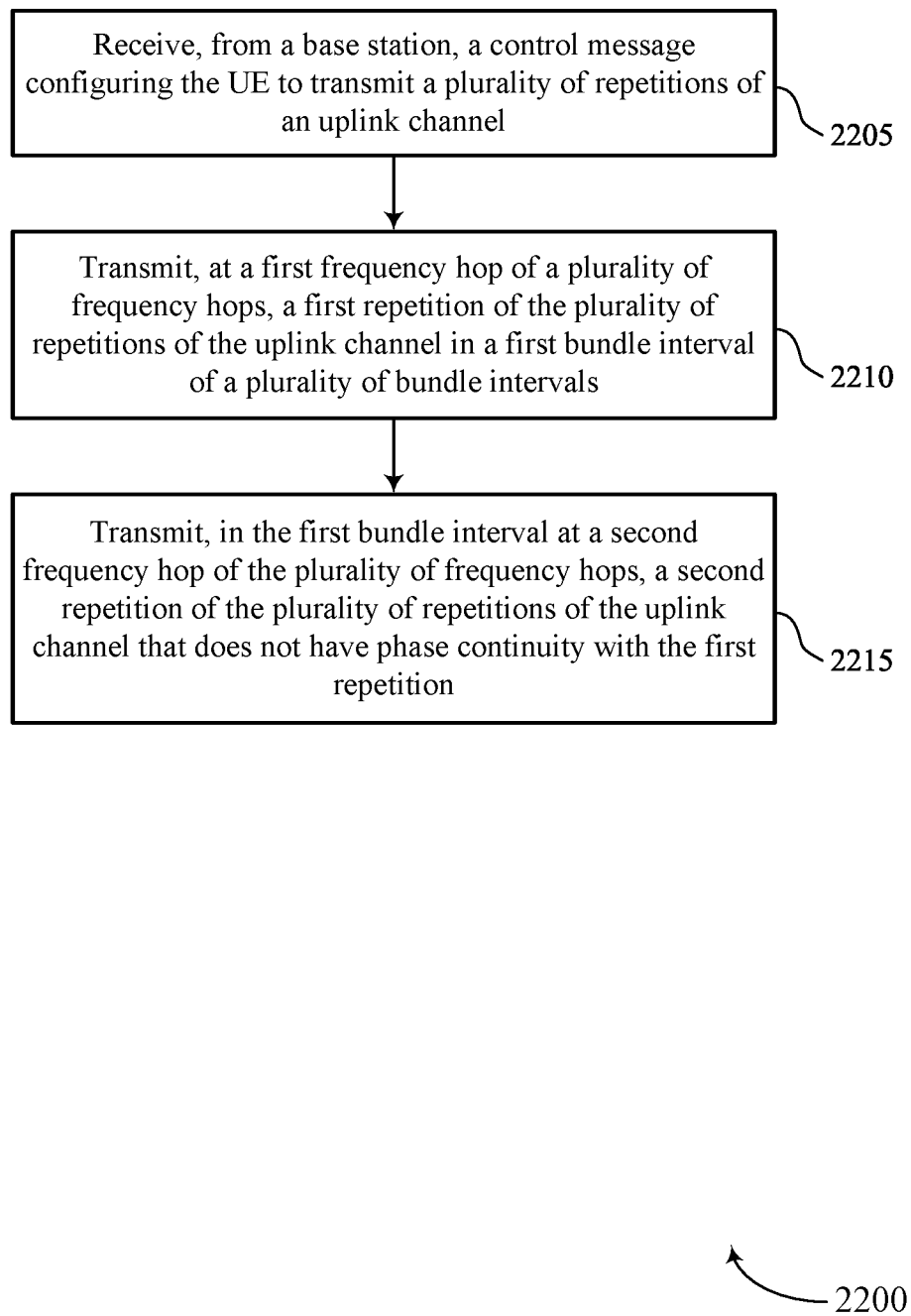

FIG. 22 shows a flowchart illustrating a method 2200 in accordance with aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2205, the method may include receiving, from a base station, a control message configuring the UE to transmit a set of multiple repetitions of an uplink channel. The operations of 2205 may be performed in accordance with examples as disclosed herein. In some examples, aspects of the operations of 2205 may be performed by a control reception component 1325 as described with reference to FIG. 13.

At 2210, the method may include transmitting, at a first frequency hop of a set of multiple frequency hops, a first repetition of the set of multiple repetitions of the uplink channel in a first bundle interval of a set of multiple bundle intervals. The operations of 2210 may be performed in accordance with examples as disclosed herein. In some examples, aspects of the operations of 2210 may be performed by an uplink channel transmission component 1330 as described with reference to FIG. 13.

At 2215, the method may include transmitting, in the first bundle interval at a second frequency hop of the set of multiple frequency hops, a second repetition of the set of multiple repetitions of the uplink channel that does not have phase continuity with the first repetition. The operations of 2215 may be performed in accordance with examples as disclosed herein. In some examples, aspects of the operations of 2215 may be performed by an uplink channel bundling component 1335 as described with reference to FIG. 13.

Figure 23:
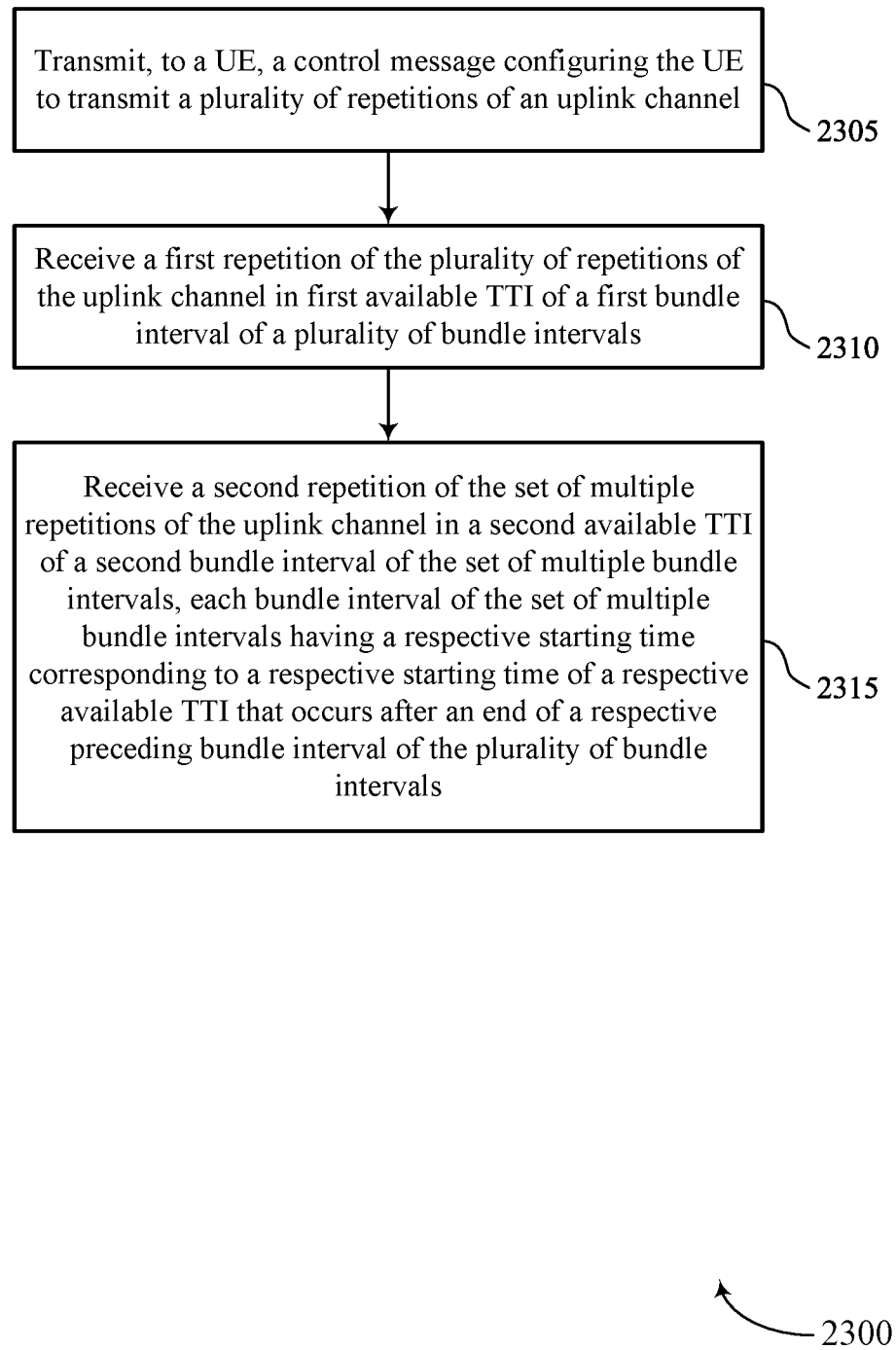

FIG. 23 shows a flowchart illustrating a method 2300 in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2305, the method may include transmitting, to a UE, a control message configuring the UE to transmit a set of multiple repetitions of an uplink channel. The operations of 2305 may be performed in accordance with examples as disclosed herein. In some examples, aspects of the operations of 2305 may be performed by a control transmission component 1725 as described with reference to FIG. 17.

At 2310, the method may include receiving a first repetition of the set of multiple repetitions of the uplink channel in a first available TTI of a first bundle interval of a set of multiple bundle intervals. The operations of 2310 may be performed in accordance with examples as disclosed herein. In some examples, aspects of the operations of 2310 may be performed by an uplink channel reception component 1730 as described with reference to FIG. 17.

At 2315, the method may include receiving a second repetition of the set of multiple repetitions of the uplink channel in a second available TTI of a second bundle interval of the set of multiple bundle intervals, each bundle interval of the set of multiple bundle intervals having a respective starting time corresponding to a respective starting time of a respective available TTI that occurs after an end of a respective preceding bundle interval of the plurality of bundle intervals. The operations of 2315 may be performed in accordance with examples as disclosed herein. In some examples, aspects of the operations of 2315 may be performed by an uplink channel reception component 1730 as described with reference to FIG. 17.

Figure 24:
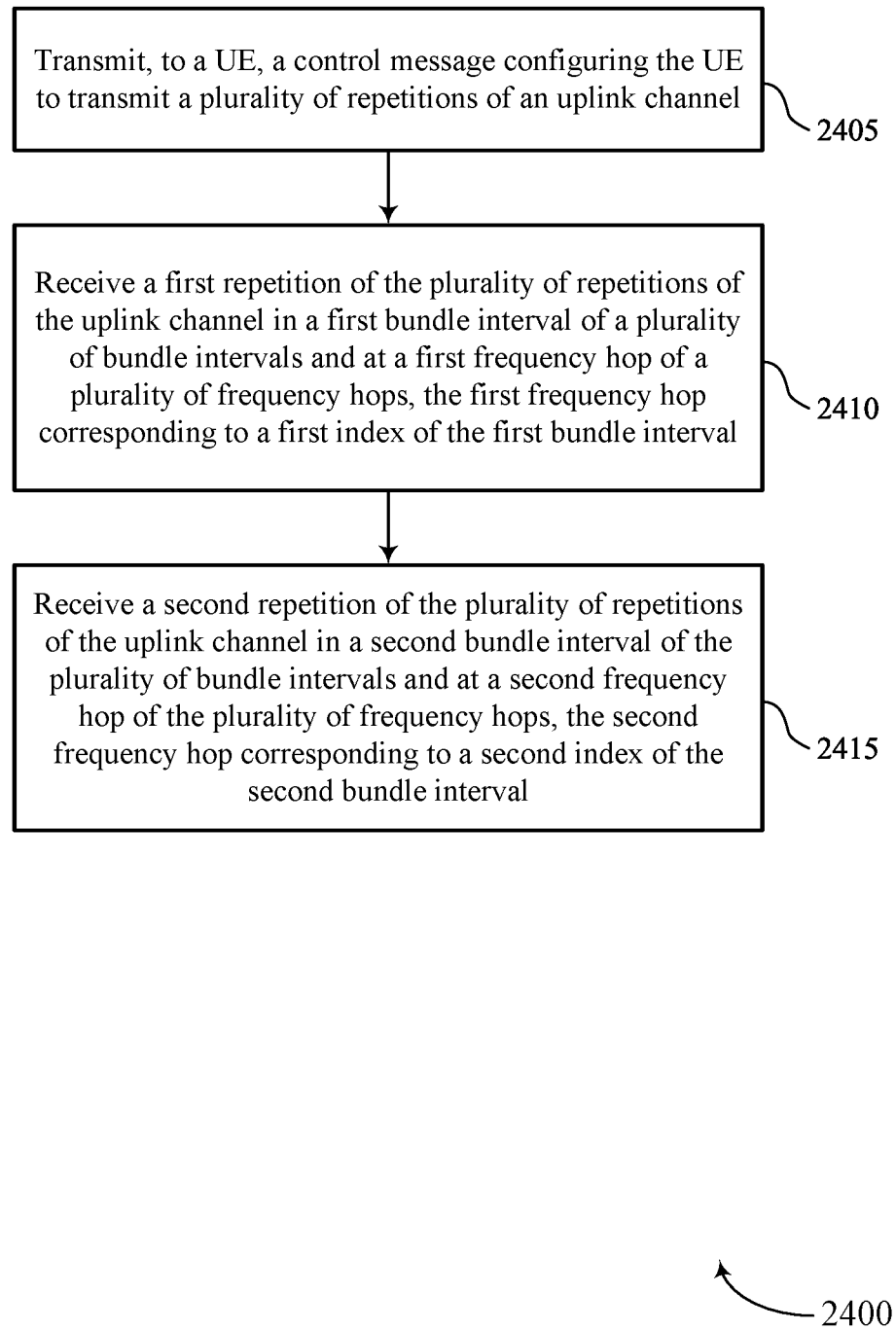

FIG. 24 shows a flowchart illustrating a method 2400 in accordance with aspects of the present disclosure. The operations of the method 2400 may be implemented by a base station or its components as described herein. For example, the operations of the method 2400 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2405, the method may include transmitting, to a UE, a control message configuring the UE to transmit a set of multiple repetitions of an uplink channel. The operations of 2405 may be performed in accordance with examples as disclosed herein. In some examples, aspects of the operations of 2405 may be performed by a control transmission component 1725 as described with reference to FIG. 17.

At 2410, the method may include receiving a first repetition of the set of multiple repetitions of the uplink channel in a first bundle interval of a set of multiple bundle intervals and at a first frequency hop of a set of multiple frequency hops, the first frequency hop corresponding to a first index of the first bundle interval. The operations of 2410 may be performed in accordance with examples as disclosed herein. In some examples, aspects of the operations of 2410 may be performed by an uplink channel reception component 1730 as described with reference to FIG. 17.

At 2415, the method may include receiving a second repetition of the set of multiple repetitions of the uplink channel in a second bundle interval of the set of multiple bundle intervals and at a second frequency hop of the set of multiple frequency hops, the second frequency hop corresponding to a second index of the second bundle interval. The operations of 2415 may be performed in accordance with examples as disclosed herein. In some examples, aspects of the operations of 2415 may be performed by an uplink channel reception component 1730 as described with reference to FIG. 17.

Figure 25:
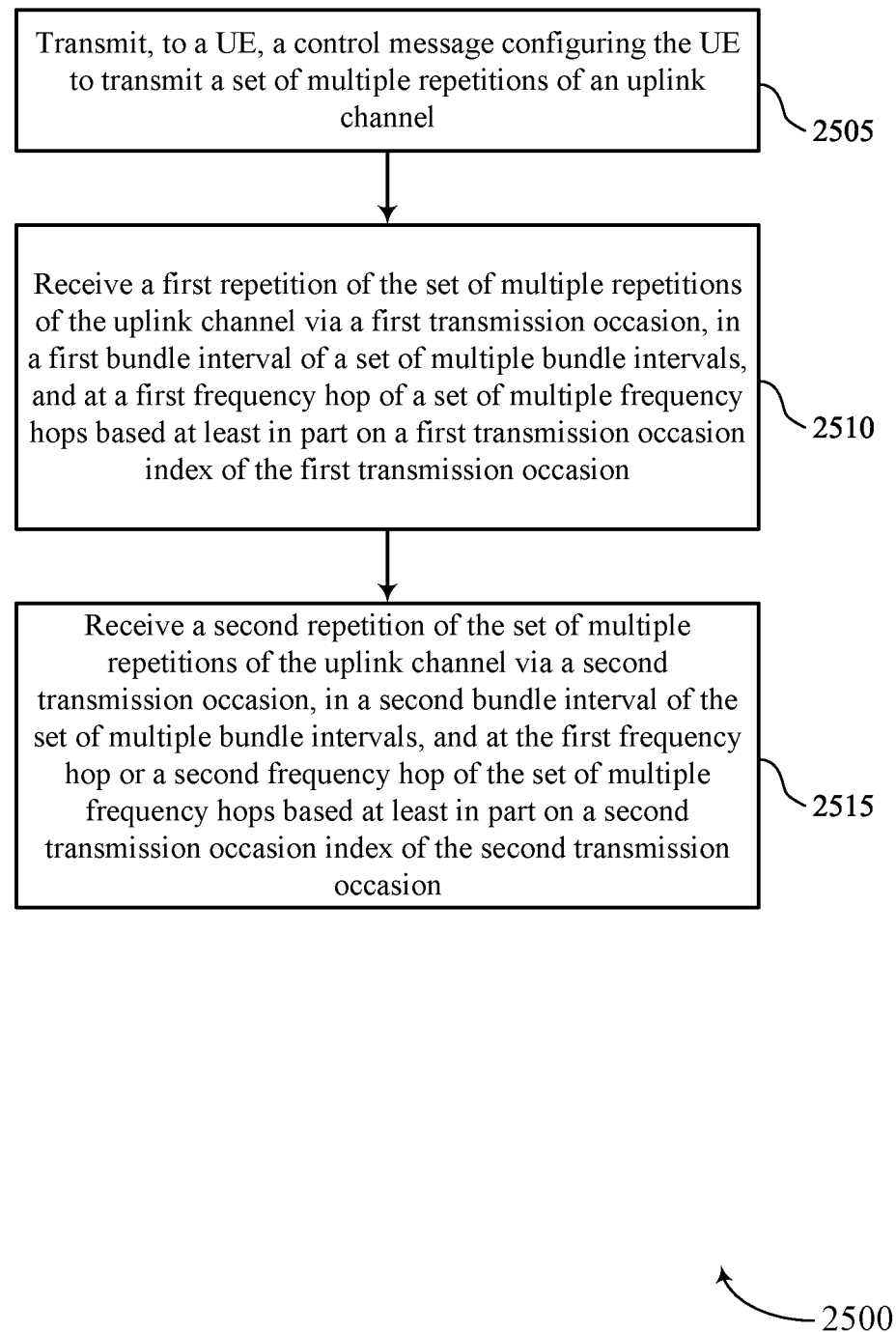

FIG. 25 shows a flowchart illustrating a method 2500 in accordance with aspects of the present disclosure. The operations of the method 2500 may be implemented by a base station or its components as described herein. For example, the operations of the method 2500 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2505, the method may include transmitting, to a UE, a control message configuring the UE to transmit a set of multiple repetitions of an uplink channel. The operations of 2505 may be performed in accordance with examples as disclosed herein. In some examples, aspects of the operations of 2505 may be performed by a control transmission component 1725 as described with reference to FIG. 17.

At 2510, the method may include receiving a first repetition of the set of multiple repetitions of the uplink channel via a first transmission occasion, in a first bundle interval of a set of multiple bundle intervals, and at a first frequency hop of a set of multiple frequency hops based on a first transmission occasion index of the first transmission occasion. The operations of 2510 may be performed in accordance with examples as disclosed herein. In some examples, aspects of the operations of 2510 may be performed by an uplink channel reception component 1730 as described with reference to FIG. 17.

At 2515, the method may include receiving a second repetition of the set of multiple repetitions of the uplink channel via a second transmission occasion, in a second bundle interval of the set of multiple bundle intervals, and at the first frequency hop or a second frequency hop of the set of multiple frequency hops based on a second transmission occasion index of the second transmission occasion. The operations of 2515 may be performed in accordance with examples as disclosed herein. In some examples, aspects of the operations of 2515 may be performed by an uplink channel reception component 1730 as described with reference to FIG. 17.

Figure 26:
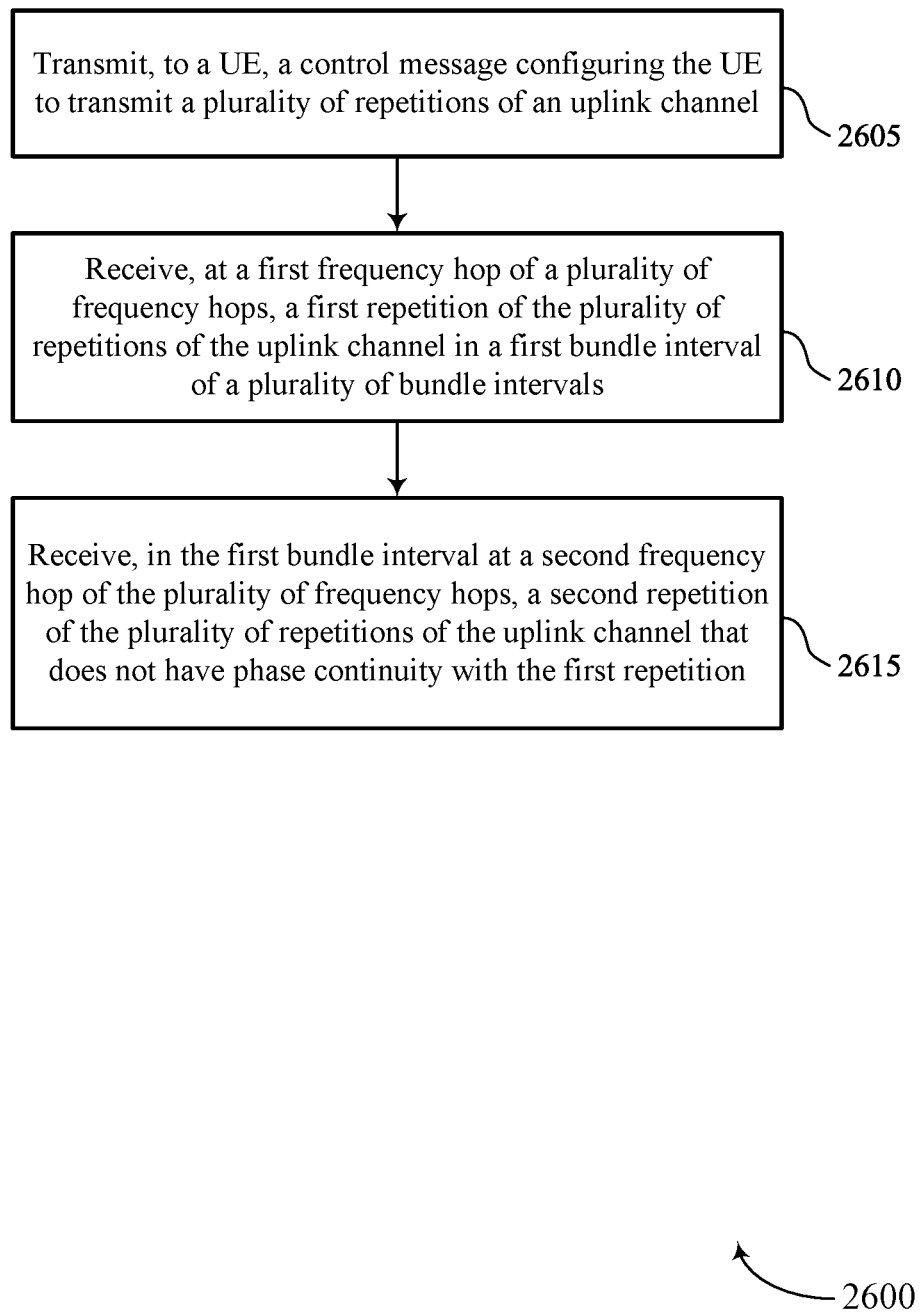

FIG. 26 shows a flowchart illustrating a method 2600 in accordance with aspects of the present disclosure. The operations of the method 2600 may be implemented by a base station or its components as described herein. For example, the operations of the method 2600 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2605, the method may include transmitting, to a UE, a control message configuring the UE to transmit a set of multiple repetitions of an uplink channel. The operations of 2605 may be performed in accordance with examples as disclosed herein. In some examples, aspects of the operations of 2605 may be performed by a control transmission component 1725 as described with reference to FIG. 17.

At 2610, the method may include receiving, at a first frequency hop of a set of multiple frequency hops, a first repetition of the set of multiple repetitions of the uplink channel in a first bundle interval of a set of multiple bundle intervals. The operations of 2610 may be performed in accordance with examples as disclosed herein. In some examples, aspects of the operations of 2610 may be performed by an uplink channel reception component 1730 as described with reference to FIG. 17.

At 2615, the method may include receiving, in the first bundle interval at a second frequency hop of the set of multiple frequency hops, a second repetition of the set of multiple repetitions of the uplink channel that does not have phase continuity with the first repetition. The operations of 2615 may be performed in accordance with examples as disclosed herein. In some examples, aspects of the operations of 2615 may be performed by an uplink channel bundling component 1735 as described with reference to FIG. 17.

Figure 27:
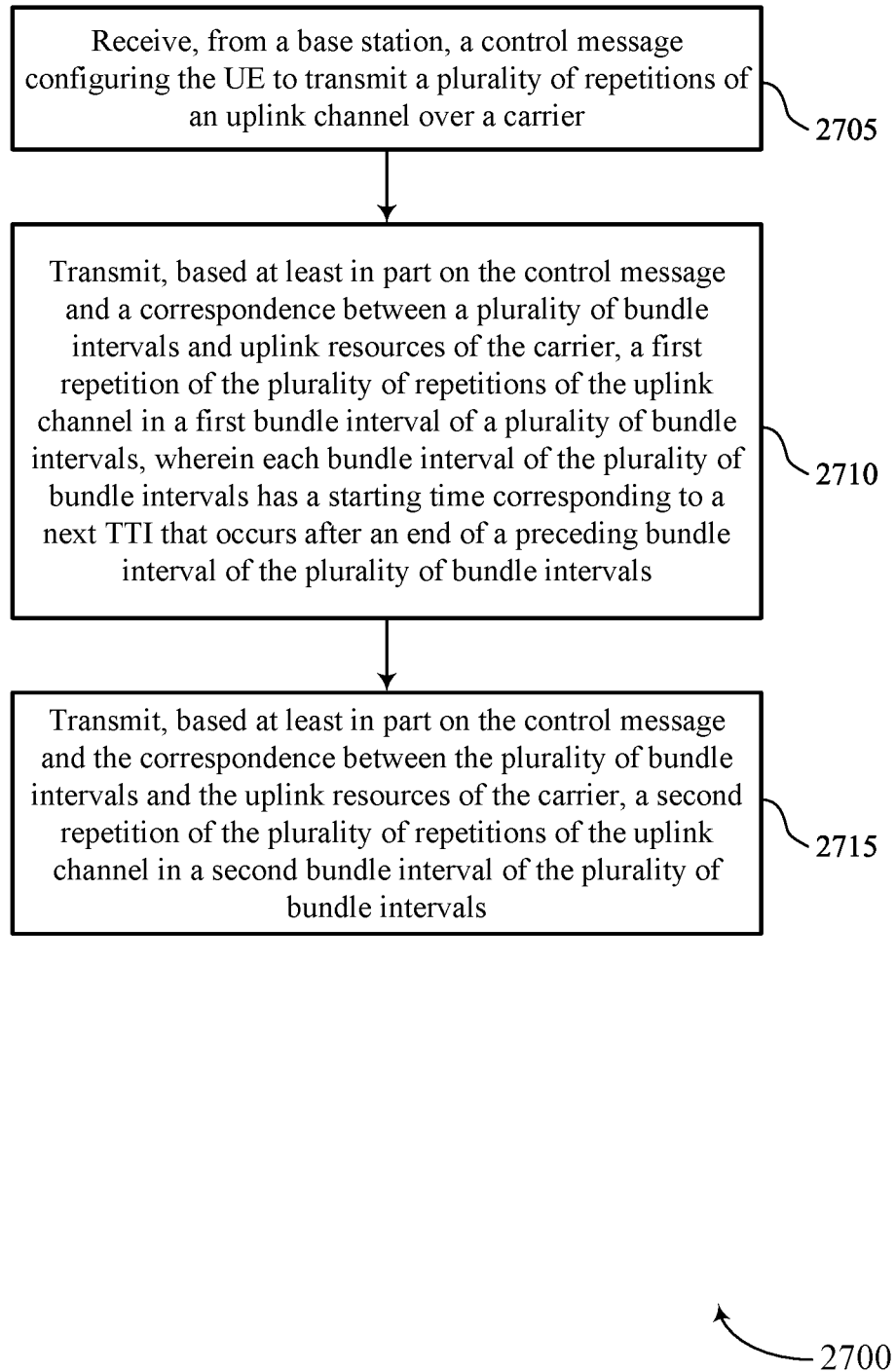

FIG. 27 shows a flowchart illustrating a method 2700 in accordance with aspects of the present disclosure. The operations of the method 2700 may be implemented by a UE or its components as described herein. For example, the operations of the method 2700 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2705, the method may include receiving, from a base station, a control message configuring the UE to transmit a plurality of repetitions of an uplink channel over a carrier. The operations of 2705 may be performed in accordance with examples as disclosed herein. In some examples, aspects of the operations of 2705 may be performed by a control reception component 1325 as described with reference to FIG. 13.

At 2710, the method may include transmitting, based on the control message and a correspondence between a plurality of bundle intervals and uplink resources of the carrier, a first repetition of the plurality of repetitions of the uplink channel in a first bundle interval of a plurality of bundle intervals, where each bundle interval of the plurality of bundle intervals has a starting time corresponding to a next TTI that occurs after an end of a preceding bundle interval of the plurality of bundle intervals. The operations of 2710 may be performed in accordance with examples as disclosed herein. In some examples, aspects of the operations of 2710 may be performed by an uplink channel transmission component 1330 as described with reference to FIG. 13.

At 2715, the method may include transmitting, based on the control message and the correspondence between the plurality of bundle intervals and the uplink resources of the carrier, a second repetition of the plurality of repetitions of the uplink channel in a second bundle interval of the plurality of bundle intervals. The operations of 2715 may be performed in accordance with examples as disclosed herein. In some examples, aspects of the operations of 2715 may be performed by an uplink channel transmission component 1330 as described with reference to FIG. 13.

Figure 28:
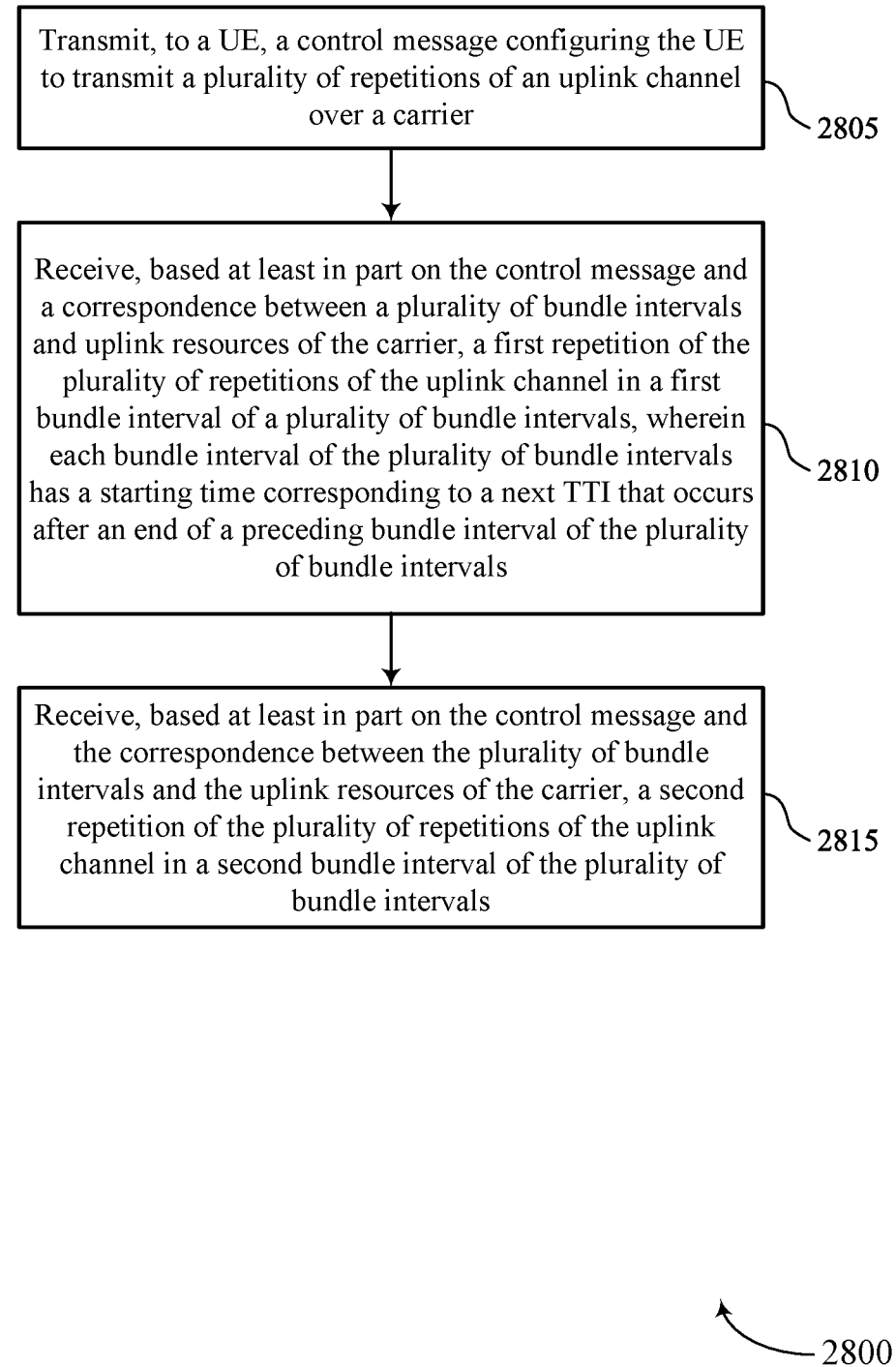

FIG. 28 shows a flowchart illustrating a method 2800 in accordance with aspects of the present disclosure. The operations of the method 2800 may be implemented by a base station or its components as described herein. For example, the operations of the method 2800 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2805, the method may include transmitting, to a UE, a control message configuring the UE to transmit a plurality of repetitions of an uplink channel over a carrier. The operations of 2805 may be performed in accordance with examples as disclosed herein. In some examples, aspects of the operations of 2805 may be performed by a control transmission component 1725 as described with reference to FIG. 17.

At 2810, the method may include receiving, based on the control message and a correspondence between a plurality of bundle intervals and uplink resources of the carrier, a first repetition of the plurality of repetitions of the uplink channel in a first bundle interval of a plurality of bundle intervals, where each bundle interval of the plurality of bundle intervals has a starting time corresponding to a next TTI that occurs after an end of a preceding bundle interval of the plurality of bundle intervals. The operations of 2810 may be performed in accordance with examples as disclosed herein. In some examples, aspects of the operations of 2810 may be performed by an uplink channel reception component 1730 as described with reference to FIG. 17.

At 2815, the method may include receiving, based on the control message and the correspondence between the plurality of bundle intervals and the uplink resources of the carrier, a second repetition of the plurality of repetitions of the uplink channel in a second bundle interval of the plurality of bundle intervals. The operations of 2815 may be performed in accordance with examples as disclosed herein. In some examples, aspects of the operations of 2815 may be performed by an uplink channel bundling component 1735 as described with reference to FIG. 17.

The following provides an overview of aspects of the present disclosure:

Aspect 1: A method for wireless communication at a UE, comprising: receiving, from a base station, a control message configuring the UE to transmit a plurality of repetitions of an uplink channel; transmitting a first repetition of the plurality of repetitions of the uplink channel in a first available TTI of a first bundle interval of a plurality of bundle intervals; and transmitting a second repetition of the plurality of repetitions of the uplink channel in a second available TTI of a second bundle interval of the plurality of bundle intervals, each bundle interval of the plurality of bundle intervals having a respective starting time corresponding to a respective starting time of a respective available TTI that occurs after an end of a respective preceding bundle interval of the plurality of bundle intervals.

Aspect 2: The method of aspect 1, wherein the respective starting time of the respective available TTI is a starting time of a next available TTI that occurs after an end of a preceding bundle interval of the plurality of bundle intervals.

Aspect 3: The method of any of aspects 1 through 2, further comprising: receiving radio resource control signaling or downlink control information indicating a TTI format configuration, wherein the respective available TTI of each bundle interval of the plurality of bundle intervals are identified based at least in part on the TTI format configuration.

Aspect 4: The method of any of aspects 1 through 3, wherein each bundle interval of the plurality of bundle intervals comprises two or more TTIs over which transmission of multiple repetitions of the uplink channel satisfy a phase continuity condition.

Aspect 5: The method of aspect 4, wherein the phase continuity condition is satisfied based at least in part on the transmission of multiple repetitions of the uplink channel having a same modulation order, a same frequency allocation, a same transmission power level, a same transmit beam, or any combination thereof.

Aspect 6: The method of any of aspects 4 through 5, wherein the phase continuity condition is satisfied based at least in part on the transmission of multiple repetitions of the uplink channel being consecutive transmissions.

Aspect 7: The method of any of aspects 4 through 6, wherein the phase continuity condition is satisfied based at least in part on the transmission of multiple repetitions of the uplink channel having a non-zero time gap between the multiple repetitions of the uplink channel and downlink reception is not scheduled in the non-zero time gap; or the phase continuity condition is satisfied based at least in part on the transmission of multiple repetitions of the uplink channel having a zero time gap between the multiple repetitions of the uplink channel.

Aspect 8: The method of any of aspects 1 through 7, further comprising: receiving a control message indicating an unpaired spectrum operation TTI format pattern when operating in an unpaired spectrum operation mode, wherein the unpaired spectrum operation TTI format pattern indicates a pattern of one or more uplink TTIs, one or more downlink TTIs, or both, over a plurality of TTIs.

Aspect 9: The method of any of aspects 1 through 7, further comprising: receiving a control message indicating a paired spectrum operation mode for communications with the base station, wherein the paired spectrum operation mode is associated with one or more uplink frequency ranges, one or more downlink transmission frequency ranges, or both, over a plurality of TTIs.

Aspect 10: The method of any of aspects 1 through 9, further comprising transmitting, in the first bundle interval, a third repetition of the plurality of repetitions of the uplink channel having phase continuity with the first repetition.

Aspect 11: The method of any of aspects 1 through 10, further comprising transmitting, in the second bundle interval, a fourth repetition of the plurality of repetitions of the uplink channel having phase continuity with the second repetition.

Aspect 12: The method of any of aspects 1 through 11, further comprising receiving control signaling defining a bundle size applicable to each of the plurality of bundle intervals as a number of consecutive TTIs per bundle interval.

Aspect 13: The method of any of aspects 1 through 11, wherein a bundle size applicable to each of the plurality of bundle intervals is based at least in part on a quantity of the plurality of repetitions of the uplink channel, the bundle size defining a number of consecutive TTIs per bundle interval.

Aspect 14: The method of any of aspects 1 through 13, wherein a starting time of the first available TTI is a starting time of an uplink TTI that is scheduled for transmitting the first repetition.

Aspect 15: The method of any of aspects 1 through 13, wherein the starting time of the first bundle interval is a starting time of a flexible TTI that is configured for transmitting the first repetition.

Aspect 16: The method of any of aspects 1 through 15, wherein a starting time of the second bundle interval is a starting time of a flexible TTI or an uplink TTI that is configured for transmitting a repetition of the plurality of repetitions of the uplink channel.

Aspect 17: The method of any of aspects 1 through 16, wherein the respective starting times of the respective available TTIs are each a starting time of a next available TTI that occurs after a last available TTI of a preceding bundle interval of the plurality of bundle intervals.

Aspect 18: A method for wireless communication at a UE, comprising: receiving, from a base station, a control message configuring the UE to transmit a plurality of repetitions of an uplink channel; transmitting a first repetition of the plurality of repetitions of the uplink channel in a first bundle interval of a plurality of bundle intervals and at a first frequency hop of a plurality of frequency hops, the first frequency hop corresponding to a first index of the first bundle interval; and transmitting a second repetition of the plurality of repetitions of the uplink channel in a second bundle interval of the plurality of bundle intervals and at a second frequency hop of the plurality of frequency hops, the second frequency hop corresponding to a second index of the second bundle interval.

Aspect 19: The method of aspect 18, further comprising transmitting, in the first bundle interval and at the first frequency hop, a third repetition of the plurality of repetitions of the uplink channel having with phase continuity with the first repetition.

Aspect 20: The method of any of aspects 18 through 19, further comprising transmitting, in the second bundle interval and at the second frequency hop, a fourth repetition of the plurality of repetitions of the uplink channel having phase continuity with the second repetition.

Aspect 21: The method of any of aspects 18 through 20, further comprising indexing each bundle interval of the plurality of bundle intervals that includes at least one uplink TTI, at least one flexible TTI configured for transmitting the uplink channel, or both.

Aspect 22: The method of any of aspects 18 through 21, further comprising: identifying a bundle interval configuration that indicates each bundle interval of the plurality of bundle intervals has a bundle size defined by a number of consecutive TTIs after a starting time of a respective bundle interval of the plurality of bundle intervals.

Aspect 23: The method of aspect 22, further comprising receiving control signaling indicating the bundle interval configuration, the bundle size, or both.

Aspect 24: The method of any of aspects 18 through 23, further comprising: receiving, via the control message, an indication of a value of the first frequency hop and an offset, wherein the second frequency hop is based at least in part on the value of the first frequency hop and the offset.

Aspect 25: The method of any of aspects 18 through 23, further comprising receiving, via the control message, a first indication of a value of the first frequency hop, a second indication of a second value of the second frequency hop, or both.

Aspect 26: The method of any of aspects 18 through 25, further comprising: receiving a control message indicating a TDD TTI format pattern when operating in a TDD mode, the TDD TTI format pattern indicating a pattern of one or more uplink TTIs and one or more downlink TTIs for a plurality of TTIs, wherein the first bundle interval has a starting time corresponding to an available uplink TTI in the TDD TTI format pattern.

Aspect 27: The method of aspect 26, wherein the starting time of the first bundle interval is a starting time of an uplink TTI that is scheduled for transmitting the first repetition.

Aspect 28: The method of aspect 26, wherein the starting time of the first bundle interval is a starting time of a flexible TTI that is configured for transmitting the first repetition.

Aspect 29: The method of any of aspects 18 through 25, further comprising: receiving a control message indicating an FDD mode for communications with the base station, wherein the FDD mode is associated with one or more uplink frequency ranges, one or more downlink transmission frequency ranges, or both, over a plurality of TTIs, wherein the first bundle interval has a starting time corresponding to an available uplink TTI in the FDD mode.

Aspect 30: The method of any of aspects 18 through 29, further comprising indexing each bundle interval of the plurality of bundle intervals.

Aspect 31: The method of any of aspects 18 through 30, wherein the uplink channel is a physical uplink shared channel or a physical uplink control channel.

Aspect 32: A method for wireless communication at a UE, comprising: receiving, from a base station, a control message configuring the UE to transmit a plurality of repetitions of an uplink channel; transmitting a first repetition of the plurality of repetitions of the uplink channel via a first transmission occasion, in a first bundle interval of a plurality of bundle intervals, and at a first frequency hop of a plurality of frequency hops based at least in part on a first transmission occasion index of the first transmission occasion; and transmitting a second repetition of the plurality of repetitions of the uplink channel via a second transmission occasion, in a second bundle interval of the plurality of bundle intervals, and at the first frequency hop or a second frequency hop of the plurality of frequency hops based at least in part on a second transmission occasion index of the second transmission occasion.

Aspect 33: The method of aspect 32, further comprising transmitting the second repetition in the second bundle interval at the first frequency hop based at least in part on the first transmission occasion index being one of an odd index or an even index.

Aspect 34: The method of aspect 32, further comprising transmitting the second repetition in the second bundle interval at the second frequency hop based at least in part on the first index being one of an odd index or an even index and the second index being an other of the odd index or the even index.

Aspect 35: The method of any of aspects 32 through 34, wherein multiple repetitions of the plurality of repetitions of the uplink channel in a same bundle interval belong to a same transmission occasion.

Aspect 36: The method of any of aspects 32 through 35, wherein multiple repetitions of the plurality of repetitions of the uplink channel associated with different bundle intervals are associated with different transmission occasions.

Aspect 37: The method of any of aspects 32 through 36, further comprising: transmitting, at the first frequency hop or at the second frequency hop, a third repetition of the plurality of repetitions of the uplink channel via a transmission occasion corresponding to a third transmission occasion index, the transmission occasion occurring outside of transmission occasions associated with the plurality of bundle intervals.

Aspect 38: The method of aspect 37, wherein uplink TTIs corresponding to the third transmission occasion index do not satisfy a phase continuity condition.

Aspect 39: The method of any of aspects 32 through 38, wherein each of the first bundle interval and the second bundle interval comprises a respective two or more uplink TTIs over which transmission of multiple repetitions of the uplink channel satisfy a phase continuity condition.

Aspect 40: The method of aspect 39, wherein the phase continuity condition is satisfied based at least in part on the transmission of multiple repetitions of the uplink channel having a same modulation order, a same frequency allocation, a same transmission power level, a same transmit beam, or any combination thereof.

Aspect 41: The method of any of aspects 39 through 40, wherein the phase continuity condition is satisfied based at least in part on the transmission of multiple repetitions of the uplink channel being consecutive transmissions.

Aspect 42: The method of any of aspects 39 through 41, wherein the phase continuity condition is satisfied based at least in part on the transmission of multiple repetitions of the uplink channel having a non-zero time gap between the multiple repetitions of the uplink channel and downlink reception is not scheduled in the non-zero time gap.

Aspect 43: A method for wireless communication at a UE, comprising: receiving, from a base station, a control message configuring the UE to transmit a plurality of repetitions of an uplink channel; transmitting, at a first frequency hop of a plurality of frequency hops, a first repetition of the plurality of repetitions of the uplink channel in a first bundle interval of a plurality of bundle intervals; and transmitting, in the first bundle interval at a second frequency hop of the plurality of frequency hops, a second repetition of the plurality of repetitions of the uplink channel that does not have phase continuity with the first repetition.

Aspect 44: The method of aspect 43, further comprising transmitting, in the first bundle interval and at the first frequency hop, a third repetition of the plurality of repetitions of the uplink channel having phase continuity with the first repetition.

Aspect 45: The method of any of aspects 43 through 44, further comprising transmitting a fourth repetition of the plurality of repetitions of the uplink channel in a second bundle interval of the plurality of bundle intervals and at the first frequency hop.

Aspect 46: The method of any of aspects 43 through 45, further comprising: receiving, via the control message, an indication of a value of the first frequency hop and an offset, wherein the second frequency hop is based at least in part on the value of the first frequency hop and the offset.

Aspect 47: The method of any of aspects 43 through 46, wherein transmitting the second repetition further comprises: transmitting the second repetition without phase continuity with the first repetition based at least in part on one or more phase continuity rules not being satisfied for transmission of the second repetition and the first repetition with phase continuity.

Aspect 48: The method of any of aspects 43 through 47, wherein the uplink channel is a physical uplink shared channel or a physical uplink control channel.

Aspect 49: A method for wireless communication at a base station, comprising: transmitting, to a UE, a control message configuring the UE to transmit a plurality of repetitions of an uplink channel; receiving a first repetition of the plurality of repetitions of the uplink channel in a first available TTI of a first bundle interval of a plurality of bundle intervals; and receiving a second repetition of the plurality of repetitions of the uplink channel in a second available TTI of a second bundle interval of the plurality of bundle intervals, each bundle interval of the plurality of bundle intervals having a respective starting time corresponding to a respective starting time of a respective available TTI that occurs after an end of a respective preceding bundle interval of the plurality of bundle intervals.

Aspect 50: The method of aspect 49, wherein the respective starting time of the respective available TTI is a starting time of a next available TTI that occurs after an end of a preceding bundle interval of the plurality of bundle intervals.

Aspect 51: The method of any of aspects 49 through 50, further comprising: transmitting radio resource control signaling or downlink control information indicating a TTI format configuration, wherein the respective available TTI of each bundle interval of the plurality of bundle intervals are identified based at least in part on the TTI format configuration.

Aspect 52: The method of any of aspects 49 through 51, wherein each bundle interval of the plurality of bundle intervals comprises two or more TTIs over which transmission of multiple repetitions of the uplink channel satisfy a phase continuity condition.

Aspect 53: The method of aspect 52, wherein the phase continuity condition is satisfied based at least in part on the transmission of multiple repetitions of the uplink channel having a same modulation order, a same frequency allocation, a same transmission power level, a same transmit beam, or any combination thereof.

Aspect 54: The method of any of aspects 52 through 53, wherein the phase continuity condition is satisfied based at least in part on the transmission of multiple repetitions of the uplink channel being consecutive transmissions.

Aspect 55: The method of any of aspects 52 through 54, wherein the phase continuity condition is satisfied based at least in part on the transmission of multiple repetitions of the uplink channel having a non-zero time gap between the multiple repetitions of the uplink channel and downlink reception is not scheduled in the non-zero time gap; or the phase continuity condition is satisfied based at least in part on the transmission of multiple repetitions of the uplink channel having a zero time gap between the multiple repetitions of the uplink channel.

Aspect 56: The method of any of aspects 49 through 55, further comprising: transmitting a control message indicating an unpaired spectrum operation TTI format pattern when operating in an unpaired spectrum operation mode, wherein the unpaired spectrum operation TTI format pattern indicates a pattern of one or more uplink TTIs, one or more downlink TTIs, or both, over a plurality of TTIs.

Aspect 57: The method of any of aspects 49 through 55, further comprising: transmitting a control message indicating a paired spectrum operation mode for communications with the base station, wherein the paired spectrum operation mode is associated with one or more uplink frequency ranges, one or more downlink transmission frequency ranges, or both, over a plurality of TTIs.

Aspect 58: The method of any of aspects 49 through 57, further comprising receiving, in the first bundle interval, a third repetition of the plurality of repetitions of the uplink channel having phase continuity with the first repetition.

Aspect 59: The method of any of aspects 49 through 58, further comprising receiving, in the second bundle interval, a fourth repetition of the plurality of repetitions of the uplink channel having phase continuity with the second repetition.

Aspect 60: The method of any of aspects 49 through 59, further comprising transmitting control signaling defining a bundle size applicable to each of the plurality of bundle intervals as a number of consecutive TTIs per bundle interval.

Aspect 61: The method of any of aspects 49 through 60, wherein a bundle size applicable to each of the plurality of bundle intervals is based at least in part on a quantity of the plurality of repetitions of the uplink channel, the bundle size defining a number of consecutive TTIs per bundle interval.

Aspect 62: The method of any of aspects 49 through 61, wherein a starting time of the first available TTI is a starting time of an uplink TTI that is scheduled for transmitting the first repetition.

Aspect 63: The method of any of aspects 49 through 61, wherein a starting time of the first available TTI is a starting time of a flexible TTI that is configured for transmitting the first repetition.

Aspect 64: The method of any of aspects 49 through 63, wherein a starting time of the second bundle interval is a starting time of a flexible TTI or an uplink TTI that is configured for transmitting a repetition of the plurality of repetitions of the uplink channel.

Aspect 65: The method of any of aspects 49 through 64, wherein the respective starting times of the respective available TTIs are each a starting time of a next available TTI that occurs after a last available TTI of a preceding bundle interval of the plurality of bundle intervals.

Aspect 66: A method for wireless communication at a base station, comprising: transmitting, to a UE, a control message configuring the UE to transmit a plurality of repetitions of an uplink channel; receiving a first repetition of the plurality of repetitions of the uplink channel in a first bundle interval of a plurality of bundle intervals and at a first frequency hop of a plurality of frequency hops, the first frequency hop corresponding to a first index of the first bundle interval; and receiving a second repetition of the plurality of repetitions of the uplink channel in a second bundle interval of the plurality of bundle intervals and at a second frequency hop of the plurality of frequency hops, the second frequency hop corresponding to a second index of the second bundle interval.

Aspect 67: The method of aspect 66, further comprising receiving, in the first bundle interval and at the first frequency hop, a third repetition of the plurality of repetitions of the uplink channel having with phase continuity with the first repetition.

Aspect 68: The method of any of aspects 66 through 67, further comprising receiving, in the second bundle interval and at the second frequency hop, a fourth repetition of the plurality of repetitions of the uplink channel having phase continuity with the second repetition.

Aspect 69: The method of any of aspects 66 through 68, further comprising indexing each bundle interval of the plurality of bundle intervals that includes at least one uplink TTI, at least one flexible TTI configured for transmitting the uplink channel, or both.

Aspect 70: The method of any of aspects 66 through 69, further comprising: transmitting, via the control message, an indication of a value of the first frequency hop and an offset, wherein the second frequency hop is based at least in part on the value of the first frequency hop and the offset.

Aspect 71: The method of any of aspects 66 through 69, further comprising transmitting, via the control message, a first indication of a value of the first frequency hop, a second indication of a second value of the second frequency hop, or both.

Aspect 72: The method of any of aspects 66 through 71, further comprising: transmitting a control message indicating a TDD TTI format pattern when operating in a TDD mode, the TDD TTI format pattern indicating a pattern of one or more uplink TTIs and one or more downlink TTIs for a plurality of TTIs, wherein the first bundle interval has a starting time corresponding to an available uplink TTI in the TDD TTI format pattern.

Aspect 73: The method of aspect 72, wherein the starting time of the first bundle interval is a starting time of an uplink TTI that is scheduled for transmitting the first repetition.

Aspect 74: The method of aspect 72, wherein the starting time of the first bundle interval is a starting time of a flexible TTI that is configured for transmitting the first repetition.

Aspect 75: The method of any of aspects 66 through 71, further comprising: receiving a control message indicating an FDD mode for communications with the base station, wherein the FDD mode is associated with one or more uplink frequency ranges, one or more downlink transmission frequency ranges, or both, over a plurality of TTIs, wherein the first bundle interval has a starting time corresponding to an available uplink TTI in the FDD mode.

Aspect 76: The method of any of aspects 66 through 75, further comprising indexing each bundle interval of the plurality of bundle intervals.

Aspect 77: The method of any of aspects 66 through 76, wherein the uplink channel is a physical uplink shared channel or a physical uplink control channel.

Aspect 78: A method for wireless communication at a base station, comprising: transmitting, to a UE, a control message configuring the UE to transmit a plurality of repetitions of an uplink channel; receiving a first repetition of the plurality of repetitions of the uplink channel via a first transmission occasion, in a first bundle interval of a plurality of bundle intervals, and at a first frequency hop of a plurality of frequency hops based at least in part on a first transmission occasion index of the first transmission occasion; and receiving a second repetition of the plurality of repetitions of the uplink channel via a second transmission occasion, in a second bundle interval of the plurality of bundle intervals, and at the first frequency hop or a second frequency hop of the plurality of frequency hops based at least in part on a second transmission occasion index of the second transmission occasion.

Aspect 79: The method of aspect 78, further comprising receiving the second repetition in the second bundle interval at the first frequency hop based at least in part on the first transmission occasion index being one of an odd index or an even index.

Aspect 80: The method of aspect 78, further comprising receiving the second repetition in the second bundle interval at the second frequency hop based at least in part on the first index being one of an odd index or an even index and the second index being an other of the odd index or the even index.

Aspect 81: The method of any of aspects 78 through 80, wherein multiple repetitions of the plurality of repetitions of the uplink channel in a same bundle interval belong to a same transmission occasion.

Aspect 82: The method of any of aspects 78 through 81, wherein multiple repetitions of the plurality of repetitions of the uplink channel associated with different bundle intervals are associated with different transmission occasions.

Aspect 83: The method of any of aspects 78 through 82, further comprising: receiving, at the first frequency hop or at the second frequency hop, a third repetition of the plurality of repetitions of the uplink channel via a transmission occasion corresponding to a third transmission occasion index, the transmission occasion occurring outside of transmission occasions associated with the plurality of bundle intervals.

Aspect 84: The method of any of aspects 78 through 83, wherein uplink TTIs corresponding to the third transmission occasion index do not satisfy a phase continuity condition.

Aspect 85: The method of any of aspects 78 through 84, wherein each of the first bundle interval and the second bundle interval comprises a respective two or more uplink TTIs over which transmission of multiple repetitions of the uplink channel satisfy a phase continuity condition.

Aspect 86: The method of aspect 85, wherein the phase continuity condition is satisfied based at least in part on the transmission of multiple repetitions of the uplink channel having a same modulation order, a same frequency allocation, a same transmission power level, a same transmit beam, or any combination thereof.

Aspect 87: The method of any of aspects 85 through 86, wherein the phase continuity condition is satisfied based at least in part on the transmission of multiple repetitions of the uplink channel being consecutive transmissions.

Aspect 88: The method of any of aspects 85 through 87, wherein the phase continuity condition is satisfied based at least in part on the transmission of multiple repetitions of the uplink channel having a non-zero time gap between the multiple repetitions of the uplink channel and downlink reception is not scheduled in the non-zero time gap.

Aspect 89: A method for wireless communication at a base station, comprising: transmitting, to a UE, a control message configuring the UE to transmit a plurality of repetitions of an uplink channel; receiving, at a first frequency hop of a plurality of frequency hops, a first repetition of the plurality of repetitions of the uplink channel in a first bundle interval of a plurality of bundle intervals; and receiving, in the first bundle interval at a second frequency hop of the plurality of frequency hops, a second repetition of the plurality of repetitions of the uplink channel that does not have phase continuity with the first repetition.

Aspect 90: The method of aspect 89, further comprising receiving, in the first bundle interval and at the first frequency hop, a third repetition of the plurality of repetitions of the uplink channel having phase continuity with the first repetition.

Aspect 91: The method of any of aspects 89 through 90, further comprising receiving a fourth repetition of the plurality of repetitions of the uplink channel in a second bundle interval of the plurality of bundle intervals and at the first frequency hop.

Aspect 92: The method of any of aspects 89 through 91, further comprising: transmitting, via the control message, an indication of a value of the first frequency hop and an offset, wherein the second frequency hop is based at least in part on the value of the first frequency hop and the offset.

Aspect 93: The method of any of aspects 89 through 92, wherein receiving the second repetition further comprises: receiving the second repetition without phase continuity with the first repetition based at least in part on one or more phase continuity rules not being satisfied for transmission of the second repetition and the first repetition with phase continuity.

Aspect 94: The method of any of aspects 89 through 93, wherein the uplink channel is a physical uplink shared channel or a physical uplink control channel.

Aspect 95: A method for wireless communication at a UE, comprising: receiving, from a base station, a control message configuring the UE to transmit a plurality of repetitions of an uplink channel over a carrier; transmitting, based at least in part on the control message and a correspondence between a plurality of bundle intervals and uplink resources of the carrier, a first repetition of the plurality of repetitions of the uplink channel in a first bundle interval of the plurality of bundle intervals, wherein each bundle interval of the plurality of bundle intervals has a starting time corresponding to a next TTI that occurs after an end of a preceding bundle interval of the plurality of bundle intervals; and transmitting, based at least in part on the control message and the correspondence between the plurality of bundle intervals and the uplink resources of the carrier, a second repetition of the plurality of repetitions of the uplink channel in a second bundle interval of the plurality of bundle intervals.

Aspect 96: The method of aspect 95, further comprising: receiving RRC signaling or DCI indicating a TTI format configuration, wherein the first bundle interval and second bundle interval are identified based at least in part on the TTI format configuration.

Aspect 97: The method of any of aspects 95 through 96, wherein each bundle interval of the plurality of bundle intervals comprises two or more TTIs over which transmission of multiple repetitions of the uplink channel satisfy a phase continuity condition.

Aspect 98: A method for wireless communication at a base station, comprising: transmitting, to a UE, a control message configuring the UE to transmit a plurality of repetitions of an uplink channel over a carrier; receiving, based at least in part on the control message and a correspondence between a plurality of bundle intervals and uplink resources of the carrier, a first repetition of the plurality of repetitions of the uplink channel in a first bundle interval of the plurality of bundle intervals, wherein each bundle interval of the plurality of bundle intervals has a starting time corresponding to a next TTI that occurs after an end of a preceding bundle interval of the plurality of bundle intervals; and receiving, based at least in part on the control message and the correspondence between the plurality of bundle intervals and the uplink resources of the carrier, a second repetition of the plurality of repetitions of the uplink channel in a second bundle interval of the plurality of bundle intervals.

Aspect 99: The method of aspect 98, further comprising: transmitting RRC signaling or DCI indicating a TTI format configuration, wherein the first bundle interval and second bundle interval are identified based at least in part on the TTI format configuration.

Aspect 100: The method of any of aspects 98 through 99, wherein each bundle interval of the plurality of bundle intervals comprises two or more TTIs over which transmission of multiple repetitions of the uplink channel satisfy a phase continuity condition.

Aspect 101: An apparatus for wireless communication at a UE, comprising a processor; memory coupled with the processor; and instructions stored in the memory and executable by the processor to cause the apparatus to perform a method of any of aspects 1 through 17.

Aspect 102: An apparatus for wireless communication at a UE, comprising at least one means for performing a method of any of aspects 1 through 17.

Aspect 103: A non-transitory computer-readable medium storing code for wireless communication at a UE, the code comprising instructions executable by a processor to perform a method of any of aspects 1 through 17.

Aspect 104: An apparatus for wireless communication at a UE, comprising a processor; memory coupled with the processor; and instructions stored in the memory and executable by the processor to cause the apparatus to perform a method of any of aspects 18 through 31.

Aspect 105: An apparatus for wireless communication at a UE, comprising at least one means for performing a method of any of aspects 18 through 31.

Aspect 106: A non-transitory computer-readable medium storing code for wireless communication at a UE, the code comprising instructions executable by a processor to perform a method of any of aspects 18 through 31.

Aspect 107: An apparatus for wireless communication at a UE, comprising a processor; memory coupled with the processor; and instructions stored in the memory and executable by the processor to cause the apparatus to perform a method of any of aspects 32 through 42.

Aspect 108: An apparatus for wireless communication at a UE, comprising at least one means for performing a method of any of aspects 32 through 42.

Aspect 109: A non-transitory computer-readable medium storing code for wireless communication at a UE, the code comprising instructions executable by a processor to perform a method of any of aspects 32 through 42.

Aspect 110: An apparatus for wireless communication at a UE, comprising a processor; memory coupled with the processor; and instructions stored in the memory and executable by the processor to cause the apparatus to perform a method of any of aspects 43 through 48.

Aspect 111: An apparatus for wireless communication at a UE, comprising at least one means for performing a method of any of aspects 43 through 48.

Aspect 112: A non-transitory computer-readable medium storing code for wireless communication at a UE, the code comprising instructions executable by a processor to perform a method of any of aspects 43 through 48.

Aspect 113: An apparatus for wireless communication at a base station, comprising a processor; memory coupled with the processor; and instructions stored in the memory and executable by the processor to cause the apparatus to perform a method of any of aspects 49 through 65.

Aspect 114: An apparatus for wireless communication at a base station, comprising at least one means for performing a method of any of aspects 49 through 65.

Aspect 115: A non-transitory computer-readable medium storing code for wireless communication at a base station, the code comprising instructions executable by a processor to perform a method of any of aspects 49 through 65.

Aspect 116: An apparatus for wireless communication at a base station, comprising a processor; memory coupled with the processor; and instructions stored in the memory and executable by the processor to cause the apparatus to perform a method of any of aspects 66 through 77.

Aspect 117: An apparatus for wireless communication at a base station, comprising at least one means for performing a method of any of aspects 66 through 77.

Aspect 118: A non-transitory computer-readable medium storing code for wireless communication at a base station, the code comprising instructions executable by a processor to perform a method of any of aspects 66 through 77.

Aspect 119: An apparatus for wireless communication at a base station, comprising a processor; memory coupled with the processor; and instructions stored in the memory and executable by the processor to cause the apparatus to perform a method of any of aspects 78 through 88.

Aspect 120: An apparatus for wireless communication at a base station, comprising at least one means for performing a method of any of aspects 78 through 88.

Aspect 121: A non-transitory computer-readable medium storing code for wireless communication at a base station, the code comprising instructions executable by a processor to perform a method of any of aspects 78 through 88.

Aspect 122: An apparatus for wireless communication at a base station, comprising a processor; memory coupled with the processor; and instructions stored in the memory and executable by the processor to cause the apparatus to perform a method of any of aspects 89 through 94.

Aspect 123: An apparatus for wireless communication at a base station, comprising at least one means for performing a method of any of aspects 89 through 94.

Aspect 124: A non-transitory computer-readable medium storing code for wireless communication at a base station, the code comprising instructions executable by a processor to perform a method of any of aspects 89 through 94.

Aspect 101: An apparatus for wireless communication at a UE, comprising a processor; memory coupled with the processor; and instructions stored in the memory and executable by the processor to cause the apparatus to perform a method of any of aspects 95 through 97.

Aspect 102: An apparatus for wireless communication at a UE, comprising at least one means for performing a method of any of aspects 95 through 97.

Aspect 103: A non-transitory computer-readable medium storing code for wireless communication at a UE, the code comprising instructions executable by a processor to perform a method of any of aspects 95 through 97.

Aspect 101: An apparatus for wireless communication at a base station, comprising a processor; memory coupled with the processor; and instructions stored in the memory and executable by the processor to cause the apparatus to perform a method of any of aspects 98 through 100.

Aspect 102: An apparatus for wireless communication at a base station, comprising at least one means for performing a method of any of aspects 98 through 100.

Aspect 103: A non-transitory computer-readable medium storing code for wireless communication at a base station, the code comprising instructions executable by a processor to perform a method of any of aspects 98 through 100.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      receive, from a network device, a first control message indicating an unpaired spectrum operation transmission time interval format pattern when operating in an unpaired spectrum operation mode,
      wherein the unpaired spectrum operation transmission time interval format pattern indicates a pattern of one or more uplink transmission time intervals, one or more downlink transmission time intervals, or both, over a plurality of transmission time intervals;
      receive, from the network device, a second control message configuring the UE to transmit a plurality of repetitions of an uplink channel;
      transmit a first repetition of the plurality of repetitions of the uplink channel in a first available transmission time interval of a first bundle interval of a plurality of bundle intervals, the first available transmission time interval being based at least in part on the unpaired spectrum operation transmission time interval format pattern; and
      transmit a second repetition of the plurality of repetitions of the uplink channel in a second available transmission time interval of a second bundle interval of the plurality of bundle intervals, each bundle interval of the plurality of bundle intervals having a respective starting time corresponding to a respective starting time of a respective available transmission time interval that occurs after an end of a respective preceding bundle interval of the plurality of bundle intervals, the second available transmission time interval being based at least in part on the unpaired spectrum operation transmission time interval format pattern.

2. The apparatus of claim 1, wherein:
   the respective starting time of the respective available transmission time interval is a starting time of a next available transmission time interval that occurs after an end of a preceding bundle interval of the plurality of bundle intervals.

3. The apparatus of claim 1, wherein the instructions are further executable by the one or more processors to cause the apparatus to:
   receive radio resource control signaling or downlink control information indicating a transmission time interval format configuration,
   wherein the respective available transmission time interval of each bundle interval of the plurality of bundle intervals are identified based at least in part on the transmission time interval format configuration.

4. The apparatus of claim 1, wherein:
   each bundle interval of the plurality of bundle intervals comprises two or more transmission time intervals over which transmission of multiple repetitions of the uplink channel satisfy a phase continuity condition.

5. The apparatus of claim 4, wherein:
   the phase continuity condition is satisfied based at least in part on the transmission of multiple repetitions of the uplink channel having a same modulation order, a same frequency allocation, a same transmission power level, a same transmit beam, or any combination thereof.

6. The apparatus of claim 4, wherein:
   the phase continuity condition is satisfied based at least in part on the transmission of multiple repetitions of the uplink channel being consecutive transmissions.

7. The apparatus of claim 4, wherein:
the phase continuity condition is satisfied based at least in part on the transmission of multiple repetitions of the uplink channel having a non-zero time gap between the multiple repetitions of the uplink channel, and wherein downlink reception is not scheduled in the non-zero time gap; or
the phase continuity condition is satisfied based at least in part on the transmission of multiple repetitions of the uplink channel having a zero time gap between the multiple repetitions of the uplink channel.

8. The apparatus of claim 1, wherein the instructions are further executable by the one or more processors to cause the apparatus to:
receive a control message indicating a paired spectrum operation mode for communications with the network device,
wherein the paired spectrum operation mode is associated with one or more uplink frequency ranges, one or more downlink transmission frequency ranges, or both, over a plurality of second transmission time intervals.

9. The apparatus of claim 1, wherein the instructions are further executable by the one or more processors to cause the apparatus to:
transmit, in the first bundle interval, a third repetition of the plurality of repetitions of the uplink channel having phase continuity with the first repetition.

10. The apparatus of claim 1, wherein the instructions are further executable by the one or more processors to cause the apparatus to:
transmit, in the second bundle interval, a fourth repetition of the plurality of repetitions of the uplink channel having phase continuity with the second repetition.

11. The apparatus of claim 1, wherein the instructions are further executable by the one or more processors to cause the apparatus to:
receive control signaling defining a bundle size applicable to each of the plurality of bundle intervals as a number of consecutive transmission time intervals per bundle interval.

12. The apparatus of claim 1, wherein:
a bundle size applicable to each of the plurality of bundle intervals is based at least in part on a quantity of the plurality of repetitions of the uplink channel, the bundle size defining a number of consecutive transmission time intervals per bundle interval.

13. The apparatus of claim 1, wherein:
a starting time of the first available transmission time interval of the first bundle interval is a starting time of an uplink transmission time interval that is scheduled for transmitting the first repetition.

14. The apparatus of claim 1, wherein:
a starting time of the first available transmission time interval of the first bundle interval is a starting time of a flexible transmission time interval that is configured for transmitting the first repetition.

15. The apparatus of claim 1, wherein:
a starting time of the second bundle interval is a starting time of a flexible transmission time interval or an uplink transmission time interval that is configured for transmitting a repetition of the plurality of repetitions of the uplink channel.

16. The apparatus of claim 1, wherein:
the respective starting times of the respective available transmission time intervals are each a starting time of a next available transmission time interval that occurs after a last available transmission time interval of a preceding bundle interval of the plurality of bundle intervals.

17. A method for wireless communication at a user equipment (UE), comprising:
receiving, from a network device, a first control message indicating an unpaired spectrum operation transmission time interval format pattern when operating in an unpaired spectrum operation mode,
wherein the unpaired spectrum operation transmission time interval format pattern indicates a pattern of one or more uplink transmission time intervals, one or more downlink transmission time intervals, or both, over a plurality of transmission time intervals;
receiving, from the network device, a second control message configuring the UE to transmit a plurality of repetitions of an uplink channel;
transmitting a first repetition of the plurality of repetitions of the uplink channel in a first available transmission time interval of a first bundle interval of a plurality of bundle intervals, the first available transmission time interval being based at least in part on the unpaired spectrum operation transmission time interval format pattern; and
transmitting a second repetition of the plurality of repetitions of the uplink channel in a second available transmission time interval of a second bundle interval of the plurality of bundle intervals, each bundle interval of the plurality of bundle intervals having a respective starting time corresponding to a respective starting time of a respective available transmission time interval that occurs after an end of a respective preceding bundle interval of the plurality of bundle intervals, the second available transmission time interval being based at least in part on the unpaired spectrum operation transmission time interval format pattern.

18. The method of claim 17, wherein:
the respective starting time of the respective available transmission time interval is a starting time of a next available transmission time interval that occurs after an end of a preceding bundle interval of the plurality of bundle intervals.

19. The method of claim 17, further comprising:
receiving radio resource control signaling or downlink control information indicating a transmission time interval format configuration,
wherein the respective available transmission time interval of each bundle interval of the plurality of bundle intervals are identified based at least in part on the transmission time interval format configuration.

20. The method of claim 17, wherein:
each bundle interval of the plurality of bundle intervals comprises two or more transmission time intervals over which transmission of multiple repetitions of the uplink channel satisfy a phase continuity condition.

21. The method of claim 17, further comprising:
receiving a control message indicating a paired spectrum operation mode for communications with the network device,
wherein the paired spectrum operation mode is associated with one or more uplink frequency ranges, one or more downlink transmission frequency ranges, or both, over a plurality of second transmission time intervals.

22. The method of claim 17, further comprising:
transmitting, in the first bundle interval, a third repetition of the plurality of repetitions of the uplink channel having phase continuity with the first repetition.

23. The method of claim 17, further comprising:

transmitting, in the second bundle interval, a fourth repetition of the plurality of repetitions of the uplink channel having phase continuity with the second repetition.

24. The method of claim 17, further comprising:

receiving control signaling defining a bundle size applicable to each of the plurality of bundle intervals as a number of consecutive transmission time intervals per bundle interval.

25. An apparatus for wireless communication at a network device, comprising:

one or more processors;

one or more memories coupled with the one or more processors; and instructions stored in the one or more memories and executable by the one or more processors to cause the apparatus to:

transmit, to a user equipment (UE), a first control message indicating an unpaired spectrum operation transmission time interval format pattern when operating in an unpaired spectrum operation mode, wherein the unpaired spectrum operation transmission time interval format pattern indicates a pattern of one or more uplink transmission time intervals, one or more downlink transmission time intervals, or both, over a plurality of transmission time intervals;

transmit, to the UE, a second control message configuring the UE to transmit a plurality of repetitions of an uplink channel;

receive a first repetition of the plurality of repetitions of the uplink channel in a first available transmission time interval of a first bundle interval of a plurality of bundle intervals, the first available transmission time interval being based at least in part on the unpaired spectrum operation transmission time interval format pattern; and receive a second repetition of the plurality of repetitions of the uplink channel in a second available transmission time interval of a second bundle interval of the plurality of bundle intervals, each bundle interval of the plurality of bundle intervals having a respective starting time corresponding to a respective starting time of a respective available transmission time interval that occurs after an end of a respective preceding bundle interval of the plurality of bundle intervals, the second available transmission time interval being based at least in part on the unpaired spectrum operation transmission time interval format pattern.

26. An apparatus for wireless communication at a user equipment (UE), comprising:

one or more processors;

one or more memories coupled with the one or more processors; and instructions stored in the one or more memories and executable by the one or more processors to cause the apparatus to:

receive, from a network device, a first control message indicating an unpaired spectrum operation transmission time interval format pattern when operating in an unpaired spectrum operation mode, wherein the unpaired spectrum operation transmission time interval format pattern indicates a pattern of one or more uplink transmission time intervals, one or more downlink transmission time intervals, or both, over a plurality of transmission time intervals;

receive, from the network device, a second control message configuring the UE to transmit a plurality of repetitions of an uplink channel over a carrier;

transmit, based at least in part on the second control message and a correspondence between a plurality of bundle intervals and uplink resources of the carrier, a first repetition of the plurality of repetitions of the uplink channel in a first bundle interval of the plurality of bundle intervals, wherein each bundle interval of the plurality of bundle intervals has a starting time corresponding to a next transmission time interval that occurs after an end of a preceding bundle interval of the plurality of bundle intervals, the first bundle interval being based at least in part on the unpaired spectrum operation transmission time interval format pattern; and transmit, based at least in part on the second control message and the correspondence between the plurality of bundle intervals and the uplink resources of the carrier, a second repetition of the plurality of repetitions of the uplink channel in a second bundle interval of the plurality of bundle intervals, the second bundle interval being based at least in part on the unpaired spectrum operation transmission time interval format pattern.

27. The apparatus of claim 26, wherein the instructions are further executable by the one or more processors to cause the apparatus to:

receive radio resource control signaling or downlink control information indicating a transmission time interval format configuration, wherein the first bundle interval and the second bundle interval are identified based at least in part on the transmission time interval format configuration.

28. The apparatus of claim 26, wherein:

each bundle interval of the plurality of bundle intervals comprises two or more transmission time intervals over which transmission of multiple repetitions of the uplink channel satisfy a phase continuity condition.

* * * * *